US007027597B1

(12) United States Patent
Stojancic et al.

(10) Patent No.: US 7,027,597 B1
(45) Date of Patent: Apr. 11, 2006

(54) PRE-COMPUTATION AND DUAL-PASS MODULAR ARITHMETIC OPERATION APPROACH TO IMPLEMENT ENCRYPTION PROTOCOLS EFFICIENTLY IN ELECTRONIC INTEGRATED CIRCUITS

(75) Inventors: Mihailo M. Stojancic, Cary, NC (US); Mahesh S. Maddury, Santa Clara, CA (US); Kenneth J. Tomei, Sunnyvale, CA (US)

(73) Assignee: Cisco Technologies, Inc., San Jose, CA (US)

( * ) Notice: Subject to any disclaimer, the term of this patent is extended or adjusted under 35 U.S.C. 154(b) by 743 days.

(21) Appl. No.: 09/955,902

(22) Filed: Sep. 18, 2001

(51) Int. Cl.
*H04K 1/00* (2006.01)
*H04L 9/00* (2006.01)

(52) U.S. Cl. .................. 380/28; 708/103; 708/135; 708/200; 708/490; 708/501; 708/502; 708/503; 708/504; 708/505; 708/523; 708/524; 713/174

(58) Field of Classification Search .............. 380/28; 713/200, 174; 708/135, 103, 200, 490, 501–505, 708/523–524
See application file for complete search history.

(56) References Cited

U.S. PATENT DOCUMENTS

| 5,928,315 | A | 7/1999 | Kobayashi et al. ......... 708/491 |
| 5,982,900 | A | 11/1999 | Ebihara et al. ............. 380/30 |
| 6,064,740 | A | 5/2000 | Curiger et al. ............. 380/265 |
| 2002/0039418 | A1* | 4/2002 | Dror et al. ................. 380/28 |
| 2003/0031316 | A1* | 2/2003 | Langston et al. ........... 380/28 |

OTHER PUBLICATIONS

Karl C. Posch "Modulo Reduction in Residue Number Systems" IEEE Transactions on Parallel and Distributed Systems, vol. 6, No. 5, May 1995.*
B. Schneier, "Applied Cryptography: Protocols, Algorithms, and Source Code in C", (New York: John Wiley & Sons), 2nd ed. 1996, pp. 246-250, pp. 466-474, pp. 483-494.
Cornell University, Computer Science Department, entitled "A Parallel Implementation of RSA", by David Pearson, dated Jul. 22, 1996, (pp. 1-10).

(Continued)

*Primary Examiner*—Ayaz Sheikh
*Assistant Examiner*—Longbit Chai
(74) *Attorney, Agent, or Firm*—Hickman Palermo Truong & Becker, LLP

(57) ABSTRACT

A pre-computation and dual-pass modular operation approach to implement encryption protocols efficiently in electronic integrated circuits is disclosed. An encrypted electronic message is received and another electronic message generated based on the encryption protocol. Two passes of Montgomery's method are used for a modular operation that is associated with the encryption protocol along with pre-computation of a constant based on a modulus. The modular operation may be a modular multiplication or a modular exponentiation. Modular arithmetic may be performed using the residue number system (RNS) and two RNS bases with conversions between the two RNS bases. A minimal number of register files are used for the computations along with an array of multiplier circuits and an array of modular reduction circuits. The approach described allows for high throughput for large encryption keys with a relatively small number of logical gates.

48 Claims, 28 Drawing Sheets

OTHER PUBLICATIONS

IEEE Transactions on Computers, vol. 47, No. 7, entitled "An RNS Montgomery Modular Multiplication Algorithm", by Jean-Claude Bajard, et al., © 1998 IEEE, dated Jul. 1998, (pp. 766-776).

IEEE Transactions on Parallel and Distributed Systems, vol. 6, No. 5, entitled "Modulo Reduction in Residue Number Systems", by Karl C. Posch, et al., © 1995 IEEE, dated May 1995, (pp. 449-454).

Swiss Federal Institute of Technology (ETH), Integrated Systems Laboratory, entitled "Efficient VLSI Implementation of Modulo ($2n \pm 1$) Addition and Multiplication", by Reto Zimmerman, undated, (10 pgs.).

RSA Laboratories, RSA Data Security, Inc., entitled "RSA Hardware Implementation", by Cetin Kaya Koc, Copyright © RSA Laboratories, Version 1.0, dated Aug. 1995,(pp. 1-28).

Electrical & Computer Engineering, Oregon State University, entitled "A Scalable Architecture for Montgomery Multiplication", by Alexandre F. Tenca and Cetin K. Koc, undated, (15 pgs.).

Proceedings of the $29^{th}$ Asilomar Conference on Signals, Systems and Computers, School of Electrical Engineering, University of Oklahoma, entitled "A Table-Lookup Scheme for Residue-to-Binary Conversion", by Chad C. Lamb and L.S. DeBrunner, © 1996 IEEE, (pp. 214-217).

TIMA Laboratory, entitled "Hardware for Computing Modular Multiplication Algorithm", by Alvaro Bernal and Alain Guyot, undated, (4 pgs).

Dept. Electrical & Electronic Eng., University of Adelaide and Electronic Engineering Division, Cardiff University, entitled "Implementing 1,024-bit RSA Exponentiation on a 32-bit Processor Core", by B.J. Phillips and N. Burgess, © 2000 IEEE, (11 pgs).

LIM-URA CNRS 1787, CMI, Universite de Provence, France and Dept. of Math and Computer Science, University of Odense, Denmark, entitled "An RNS Montgomery Modular Multiplication Algorithm", by Jean-Claude Bajard, et al., © 1997 IEEE, (pp. 234-239).

LIRMM, Montpellier, France, Universite de Bretagne Occidentale, Brest, France, and SDU/Odense University, Denmark, entitled "Montgomery Modular Multiplication in Residue Arithmetic", by Jean-Claude Bajard, et al., dated Nov. 1, 2000, (pp. 1-11).

LIRMM, Montpellier, France, Universite de Bretagne Occidentale, Brest, France, and SDU/Odense University, Denmark, entitled "Modular Multiplication and Base Extensions in Residue Number Systems", by Jean-Claude Bajard, et al., undated, (7 pgs).

Digital Equipment Corp., Paris Research Laboratory (PRL), entitled "Fast Implementations of RSA Cryptography", by M. Shand, et al., undated, (9 pgs).

Thesis of Tolga Acar, Electrical & Computer Engineering, Oregon State University, entitled "High-Speed Algorithms & Architectures For Number-Theoretic Cryptosystems", by Tolga Acar, dated Dec. 4, 1997 © Tolga Acar 1997, (92 pgs).

* cited by examiner

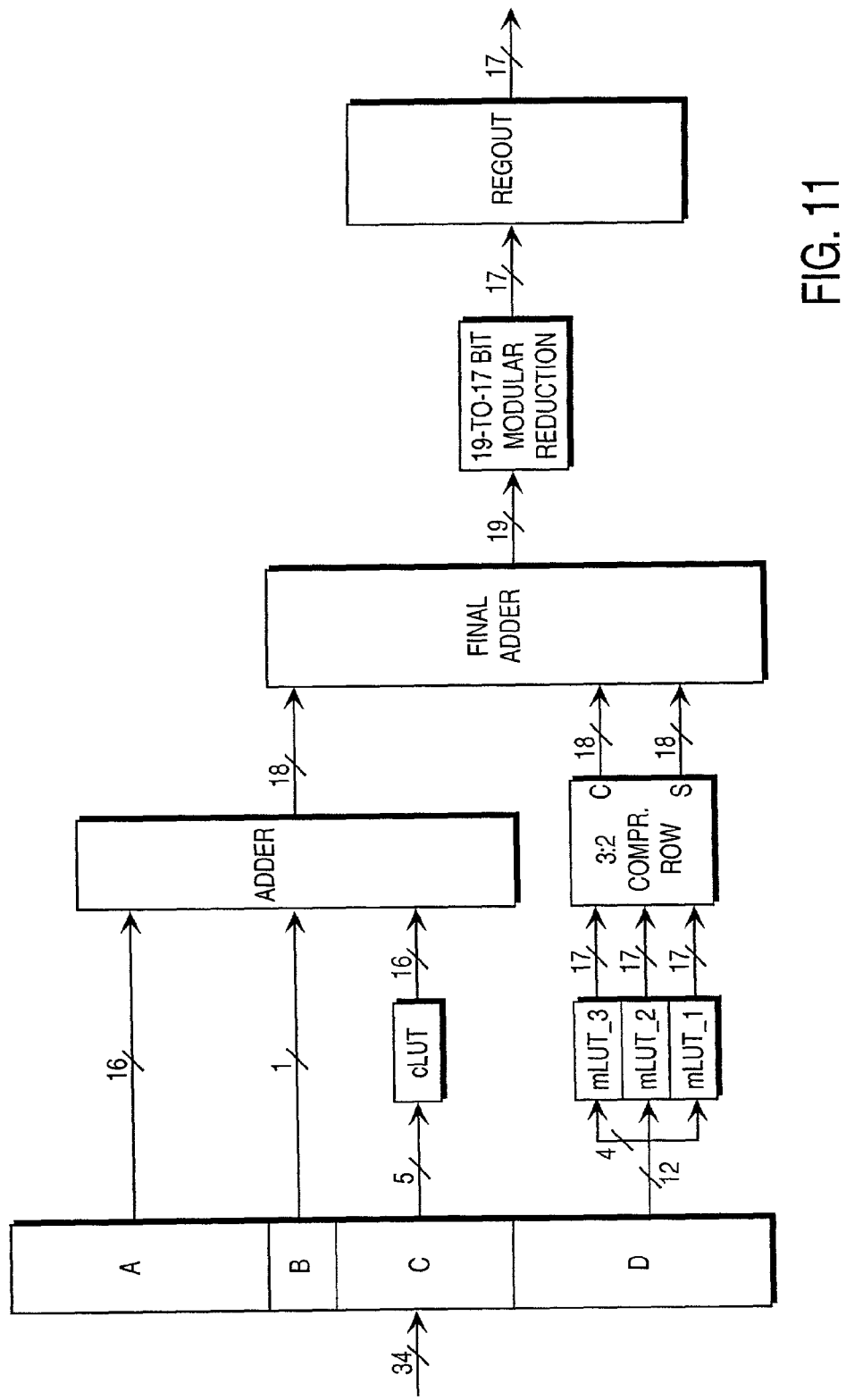

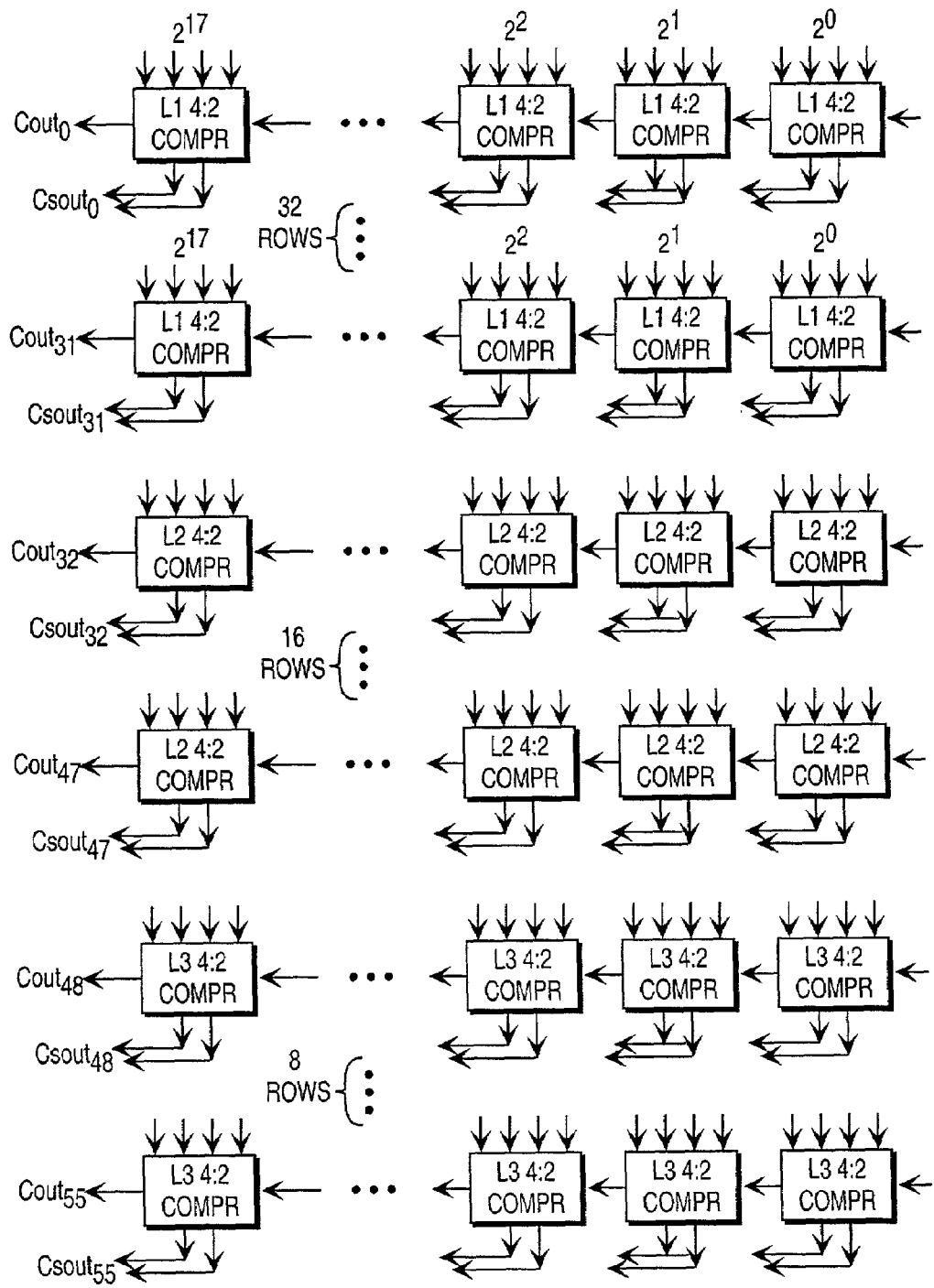
FIG. 20A    CONTINUED ON FIG. 20B

PRE-COMPUTATION AND DUAL-PASS MODULAR ARITHMETIC OPERATION APPROACH TO IMPLEMENT ENCRYPTION PROTOCOLS EFFICIENTLY IN ELECTRONIC INTEGRATED CIRCUITS

FIELD OF THE INVENTION

The present invention relates to encryption of electronic messages, and more specifically, to a method and apparatus for using pre-computation and dual-pass modular arithmetic operations to implement encryption protocols efficiently in electronic hardware such as integrated circuits.

BACKGROUND OF THE INVENTION

Some encryption protocols for electronic messages are based on modular mathematics, such as the Diffie-Hellman protocol and the Rivest-Shamir-Adleman (RSA) protocol. As an example of modular math, consider the expression X mod M=Z, where X is the operand, M is the modulus, and Z is the remainder. The value for the remainder, Z, is the same as the remainder from integer division of the operand, X, by the modulus, M. As a numerical example, consider 27 mod 10=7. The remainder, 7, is what is left after the operand 27 is divided by the modulus 10. The remainder 7 may also be referred to as the modular reduction of 27 modulo 10.

Modular arithmetic includes a variety of modular operations, including but not limited to, modular addition, modular subtraction, modular multiplication, modular division, and modular exponentiation. For example, XY mod M=Z is an example of modular multiplication in which Z is the modular reduction of the result of multiplying X by Y. As another example, $X^Y$ mod M=Z is an example of modular exponentiation in which Z is the modular reduction of the result of raising X to the power Y.

Many encryption protocols rely on numerical "keys" that are used to encrypt and decrypt messages. Some protocols use private keys that are kept secret except from the parties exchanging the encrypted messages, while other protocols use a combination of private and public keys in which the public keys are freely distributed to the public at large while the private keys are kept secret.

Generally, the longer the key size used in a particular encryption protocol, the better the level of security that can be achieved. However, some encryption protocols involve modular operations, such as modular multiplication and modular exponentiation, which are computationally intensive, particularly for large operands that are associated with using longer keys. For example, for 2048 bit keys, a typical hardware implementation of the RSA protocol involves millions of logic gates and very high clock frequencies, which makes such hardware implementations impractical for widespread use. Therefore, hardware implementations of the RSA and other encryption protocols are generally limited to shorter keys to reduce computational requirements, but such shorter keys provide less security than longer keys.

One approach for performing modular operations for large operands is based on Montgomery's method, which is a modular operation algorithm where one modular reduction is performed at each iteration of the modular operation by a shift instead of a division. For example, given two operands, X and Y, and a modulus, M, the modular multiplication operation for computing the result, Z, of X Y mod M based on Montgomery's method may be found by evaluating the expressions:

$S=XY$ $Q=M'S$ mod $W$ $Z=(S+QM)/W$ where
$W=2^N$
$W \geq 4$ M
M' is chosen such that M' M=−1 mod W Using Montgomery's method in a hardware encryption device can reduce the complexity of the device. However, a drawback of this approach is that the result, Z, is not the exact result desired for X Y mod M; rather, the result, Z, is a scaled result. In order to efficiently scale the result (i.e. reduce the scaling operation to a bit shift in binary numerical calculations), W must be chosen to be a power of two (i.e., N must be an integer), which limits the possible values of W for a given modulus, M. In addition, the approach presented above requires three sequential multiplication operations with very large operands (X and Y, represented in binary form, may have more than 1024 bits each, producing multiplication result with 2048 or more bits) which are very time consuming operation on a general purpose digital computer systems.

Based on the foregoing, it is desirable to provide improved techniques for encryption. It is also desirable to have improved techniques for implementations of encryption protocols that achieve acceptable performance for longer keys, in a hardware device that has a practical gate structure.

SUMMARY OF THE INVENTION

The foregoing needs, and other needs and objects that will become apparent for the following description, are achieved in the present invention, which comprises, in one aspect, a method for encryption and decryption of electronic messages based on an encryption protocol using a pre-computation and dual-pass modular operation approach to implement the encryption protocol efficiently in electronic integrated circuits. A message that is encrypted according to the encryption protocol is received. At least one part of another message is generated based on the received message and a modular operation. The modular operation is based on two applications of Montgomery's method with a constant chosen not to be a power of two number, two operands, and a modulus. The second electronic message is created by pre-computing another constant based on the modulus. An intermediate result is determined and stored in memory based on a first application of Montgomery's method for the modular operation, one operand, and the pre-computed constant. A final result is determined based on a second application of Montgomery's method for the modular operation, the intermediate result, and the other operand.

According to other aspects, the encryption protocol may include, but is not limited to, Rivest-Shamir-Adleman (RSA), Diffie-Hellman, and digital signature algorithm (DSA) protocols. The modular operations include, but are not limited to, modular multiplication and modular exponentiation. The modular arithmetic may be performed based on a residue number system (RNS) using RNS representations in two bases, with the RNS bases chosen such that one base extends the other to a total of a larger base RNS system, and using conversions between the primary and extended RNS bases. For modular multiplication, two registers files may be used, and for modular exponentiation, four register files may be used. An array of multiplier circuits and an array of modular reduction circuits may be used for both modular multiplication and modular exponentiation.

According to other aspects, additional methods, apparatuses, and computer-readable media that implement the approaches above are described.

BRIEF DESCRIPTION OF THE DRAWINGS

The present invention is depicted by way of example, and not by way of limitation, in the figures of the accompanying drawings and in which like reference numerals refer to similar elements and in which:

FIG. 11 is a block diagram that depicts a modular reduction circuit, according to an embodiment;

FIGS. 20A–20B are a diagram of an array of 6 levels of 4:2 compressors, according to an embodiment;

DETAILED DESCRIPTION OF THE INVENTION

Figure 1:
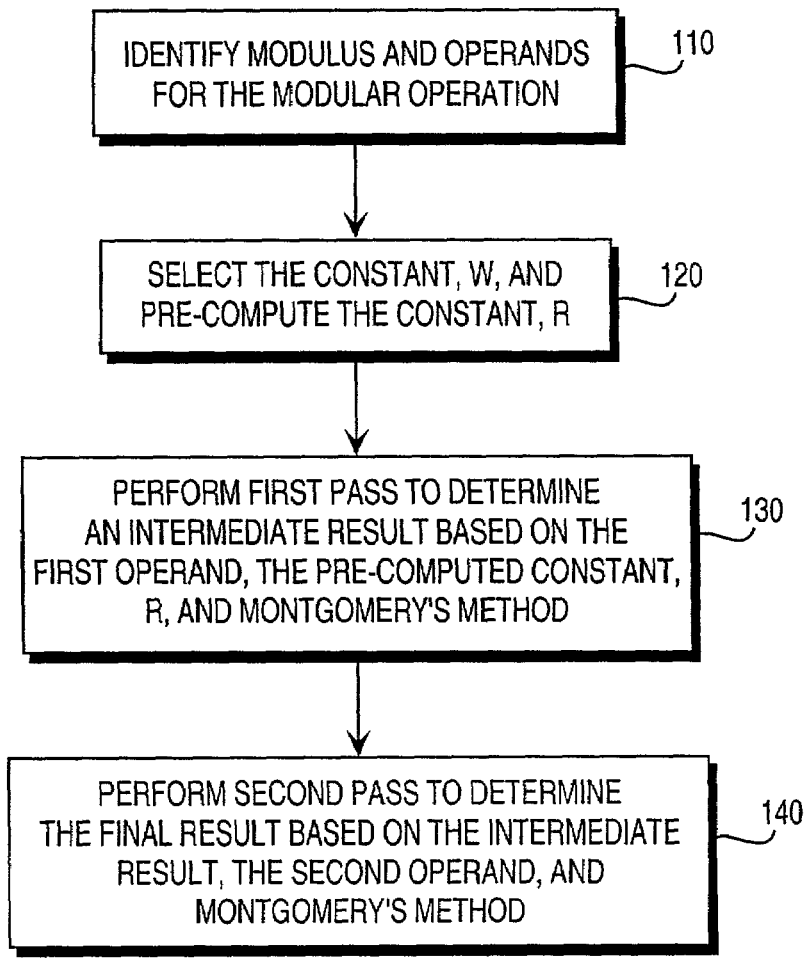
FIG. 1 is a flow diagram that depicts an approach for using a pre-computed constant and dual-pass modular operations, according to an embodiment.

A method and apparatus for pre-computation and dual-pass modular operation approach to implement encryption protocols efficiently in electronic integrated circuits is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. Functional Overview
   A. Example Method for Modular Multiplication
   B. Example Method for Modular Exponentiation
   C. Residual Number System Implementation
II. Structural Overview
   A. Example Apparatus for Modular Multiplication
   B. Example Apparatus for Modular Exponentiation
III. Acronyms
IV. Review of IPSec and IKE Processing
   A. IPSec Packet Processing Procedures
   B. Introduction to IKE Processing
   C. IKE Phase 1 Overview
   D. IKE Phase 2 Overview
V. RSA Protocol
   A. RSA Key Generation
   B. RSA Signature Generation and Verification for Authentication
   C. RSA Encryption/Decryption Introduction
   D. RSA Encryption/Decryption Using Single-Radix Conversion
   E. RSA Encryption/Decryption Using Mixed-Radix Conversion
VI. Digital Signature Algorithm (DSA) Protocol
   A. DSA Key Generation
   B. DSA Signature Generation and Verification
VII. DIFFIE-HELLMAN Protocol
VIII. IKEON ASIC Architecture
   A. IKEON High Level Block Diagram
   B. IKEON Modular Arithmetic Processor
   C. Modular Arithmetic Processor Instructions
IX. Modular ALU Architecture
   A. Preliminary Definitions
   B. Dual-Pass Montgomery Multiplication with Pre-computation
   C. General Montgomery Exponentiation
   D. Dual-Pass Montgomery Exponentiation with Pre-computation
X. Computations in the Residue Number System (RNS)
   A. Introduction to RNS
   B. Modular Multiplication in RNS
   C. Modular Exponentiation in RNS D. RNS Base Extension and Conversion from One RNS Base to Another RNS Base
XI. Modular Reduction for RNS Conversions
XII. Modular Reduction for Modular Exponentiation LOOP
XIII. Final Binary Result Computation
XIV. Additional Architectural CONSIDERATIONS
XV. Hardware Overview
XVI. Extensions and Alternatives I. Functional Overview Techniques are provided for a method of using pre-computation and dual-pass modular operations to implement encryption protocols efficiently in electronic hardware. According to one embodiment, a modular operation is performed using pre-computed constant and a dual-pass implementation based on Montgomery's method with a another constant that is selected to not be a power of two integer number. The pre-computed constant provides for the correct final result at the end of the second pass instead of a scaled final result. The first pass is based on the first operand and the pre-computed constant and provides an intermediate result. The second pass is based on the intermediate result and the second operand and provides the final result.

A. Example Method for Modular Multiplication

FIG. 1 is a flow diagram that depicts an approach for using a pre-computed constant and dual-pass modular operations, according to an embodiment. Assume that the modular operation is a modular multiplication of the two operands, X and Y, based on a modulus, M, which can be expressed as X Y mod M. In block 110, the two operands and the modulus are identified. For example, the operands X and Y may be determined according to a decryption step of the encryption protocol being used to decrypt an encrypted message, and the modulus was selected for the message prior to generating the encrypted message.

In block 120, a constant, W, is selected and another constant, R, is pre-computed. For example, the constant, W, is chosen such that $W \geq 4M$. The pre-computed constant, R, is determined by the expression $R=W^2 \mod M$. Other constant values that are required in subsequent steps may be determined prior to the first pass of the dual passes. For example, a negative multiplicative inverse of the modulus M, denoted by M', may be selected such that $M' M = -1 \mod W$.

In block 130, the first pass of the dual-pass approach is performed to determine the intermediate result is performed based on the first operand, the pre-computed constant, and Montgomery's method. For example, if the modular operation is a modular multiplication, the intermediate result, S, is determined using Montgomery's method according to the following expressions:

$Z=XR$ $U=ZM' \mod W$ $S=(Z+UM)/W$

In block 140, the second pass of the dual-pass approach is performed to determine the final result is performed based on the intermediate result, the second operand, the selected constant, and Montgomery's method. For example, if the modular operation is a modular multiplication, the final result, F, is determined using Montgomery's method according to the following expressions:

$Z=YS$ $U=ZM' \mod W$ $F=(Z+UM)/W$

The final result, F, is the desired result from the modular operation, such as X Y mod M in this example.

The application of Montgomery's method may be expressed as Mont(A,B,C) that is defined to include the following expressions:

$D=AB$ $E=DM' \mod W$ $C=(D+EM)/W.$

Based on the definition above for Mont(A,B,C), the dual-pass approach for modular multiplication may be expressed as:

Mont(X,R,S)

Mont(S,Y,F).

B. Example Method for Modular Exponentiation

As another example, assume that the modular operation is a modular exponentiation such as $X^Y \mod M$ for a modulus M. The two operands and the modulus are identified, as discussed above with regard to block 110, and the constants W, R, and M' are determined as discussed above with respect to block 120.

For block 130, the first pass of the dual-pass approach to determine the intermediate result, S, for modular exponentiation is determined using Montgomery's method according to the following expressions:

$Z=XR$ $U=ZM' \mod W$ $S=(Z+UM)/W$

For block 140, the second pass of the dual-pass approach to determine the final result, F, for modular exponentiation is determined using Montgomery's method according to the following expressions, wherein Y is an n-digit binary number and Yi denotes the i-th digit of Y:

```
F = 1
for i = 1 to n,
    if Yi = 1 then
        Z = SF
        U = ZM' mod W
        F = (Z + UM)/W
    endif
    Z = SS
    U = ZM' mod W
    S = (Z + UM)/W
end loop
```

The final result, F, is the desired result from $X^Y \mod M$.

Using the Mont(A,B,C) nomenclature above, the dual-pass approach for modular exponentiation may be expressed shown below using binary-H and bit indexing approach in which the binary value 1011 (e.g., decimal 11) has "i" values of 0123, other implementations may employ other approaches. For example, an implementation may use binary-L and a bit indexing approach in which the binary value 1011 has "i" values of 4321.

```
Mont(X,R,S)
F = S
for i=1 to n
    Mont(F,F,F)
    if Yi = 1, then Mont(S,F,F)
end loop
```

While the expressions above are based on using binary-H and bit indexing approach in which the binary value 1011 (e.g., decimal 11) has "i" values of 0123, other implementations may employ other approaches. For example, an implementation may use binary-L and a bit indexing approach in which the binary value 1011 has "i" values of 4321, and the dual-pass approach for modular exponentiation may be expressed as:

```
F = 1
Mont(X,R,S)
for i=1 to n
    if Yi = 1, then Mont(S,F,F)
    Mont(S,S,S)
end loop
```

C. Residual Number System Implementation

According to another embodiment, the modular operations are performed using the residue number system (RNS) wherein the operands, constants, results, and other quantities are represented in at least one RNS base and frequently both RNS bases of a set of two RNS bases. Mathematical operations are performed based on the RNS representations, and conversions from one RNS base to the other RNS base are made between specified steps in the computations for a modular operation.

To create an RNS representation, an RNS base, V, is generated. The RNS base, V, is a set of numbers, $v_i$ for i=1 to n, that satisfy the expressions:

$$V = v_1 * v_2 * \ldots * v_{n-1} * v_n \text{ and}$$

$$gcd(v_i, v_j) = 1 \text{ for } i \neq j$$

where "gcd" denotes the greatest common devisor. The set of integers $v_i$, form the base of the RNS. Because the greatest common divisor for any two different pairs $v_i, v_j$ is 1, the integers $v_i$ in the RNS base V are referred to as being relatively prime to one another.

Given the RNS base, V, the RNS representation of a value, X, is:

$$X = (x_1, x_2, \ldots, x_{n-1}, n_n)$$

where $$x_i = X \mod v_i$$

The values in the RNS representation of X, $x_i$, are called the residues of X. Any integer X may be represented by such an RNS representation provided that X<V. If an integer number larger than V needs to be represented by its residues, the RNS base V can be extended with an RNS base W, provided that all base elements, in both V and W, are relatively prime. Thus a number X, VW>X>V, can be represented in extended RNS base W. This property of the RNS representation will be exploited in the approach described later. An RNS representation in one base may be converted into an RNS representation in another base as described and used later herein.

Figure 2:
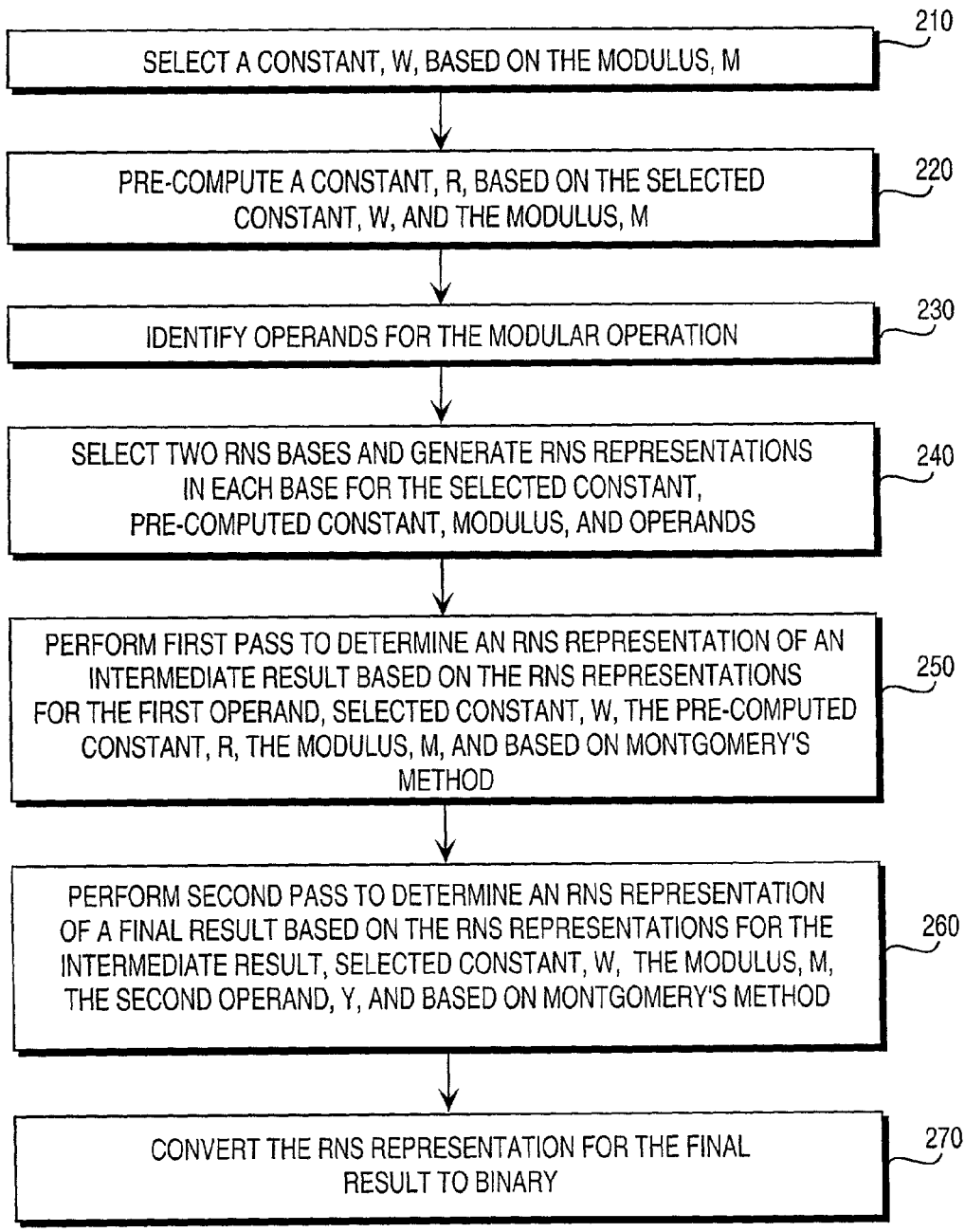
FIG. 2 is a flow diagram that depicts an approach for using a pre-computed constant and dual-pass modular operations with RNS representations, according to an embodiment.

FIG. 2 is a flow diagram that depicts an approach for using a pre-computed constant and dual-pass modular operations with RNS representations, according to an embodiment. In block 210, a constant, W, is selected based on the modulus, M. For example, W is chosen such that W≧4 M.

In block 220, another constant, R, is pre-computed. For example, pre-computed constant, R, is determined by the expression $R = W^2 \mod M$. Other constant values that are required in subsequent steps may be determined prior to the first pass of the dual passes. For example, a "negative" multiplicative inverse of the modulus M, denoted by M', may be selected such that M' M=−1 mod W.

In block 230, operands for the modular operation are identified. For example, if the modular operation is a modular multiplication of the form X Y mod M, the X and Y are identified as the operands for the modular multiplication operations.

In block 240, two RNS bases are selected and RNS representations are generated in one or both RNS bases for the selected constant, pre-computed constant, modulus, and operands. An example of an RNS base is the RNS base V shown above. An example of an RNS representation is the RNS representation for the operand X in the RNS base V as shown above. RNS representations of other quantities may be determined, in addition to those listed, such as for the "negative" multiplicative inverse of the modulus, M'.

In block 250, the first pass of the dual-pass approach is performed in RNS arithmetic to determine an intermediate result, S, expressed in an RNS representation, based on the RNS representations of the first operand, X, the selected constant, W, and the pre-computed constant, R, and also based on Montgomery's method. For example, as discussed later herein, an RNS form of the expressions discussed above with respect to block 130 for modular multiplication and modular exponentiation may be used. In addition to the RNS form of such expressions, additional conversion steps are included to convert values from one RNS base to between selected steps.

In block 260, the second pass of the dual-pass approach is performed in RNS arithmetic to determine a final result, expressed in an RNS representation, based on the second operand, Y, and on the RNS representations of the intermediate result, S, and the selected constant, W, and also based on Montgomery's method. For example, as discussed later herein, an RNS form of the expressions discussed above with respect to block 140 for modular multiplication and modular exponentiation may be used. In addition to the RNS form of such expressions, additional conversion steps are included to convert values from one RNS base to another RNS base between selected steps.

In block 270, the RNS representation for the final result is converted to a binary representation.

According to other aspects, the residues in each RNS base are seventeen-bit residues, there are 64 residues in each RNS base, and the residues in each base are selected from a range of $2^{16}$ to $2^{17}$.

II. Structural Overview

Techniques are provided for an apparatus that uses pre-computation and dual-pass modular operations to implement encryption protocols efficiently in electronic hardware. According to one embodiment, an apparatus for performing both modular multiplication and modular exponentiation includes the array of modular reduction circuits, and set of register files. For example, if the apparatus performs modular multiplication, the apparatus may include an array of multiplier circuits, an array of modular reduction circuits, and two register files. As another example, if the apparatus performs modular exponentiation, the apparatus may include an array of multiplier circuits, an array of modular reduction circuits, and four register files.

A. Example Apparatus for Modular Multiplication

Figure 3A:
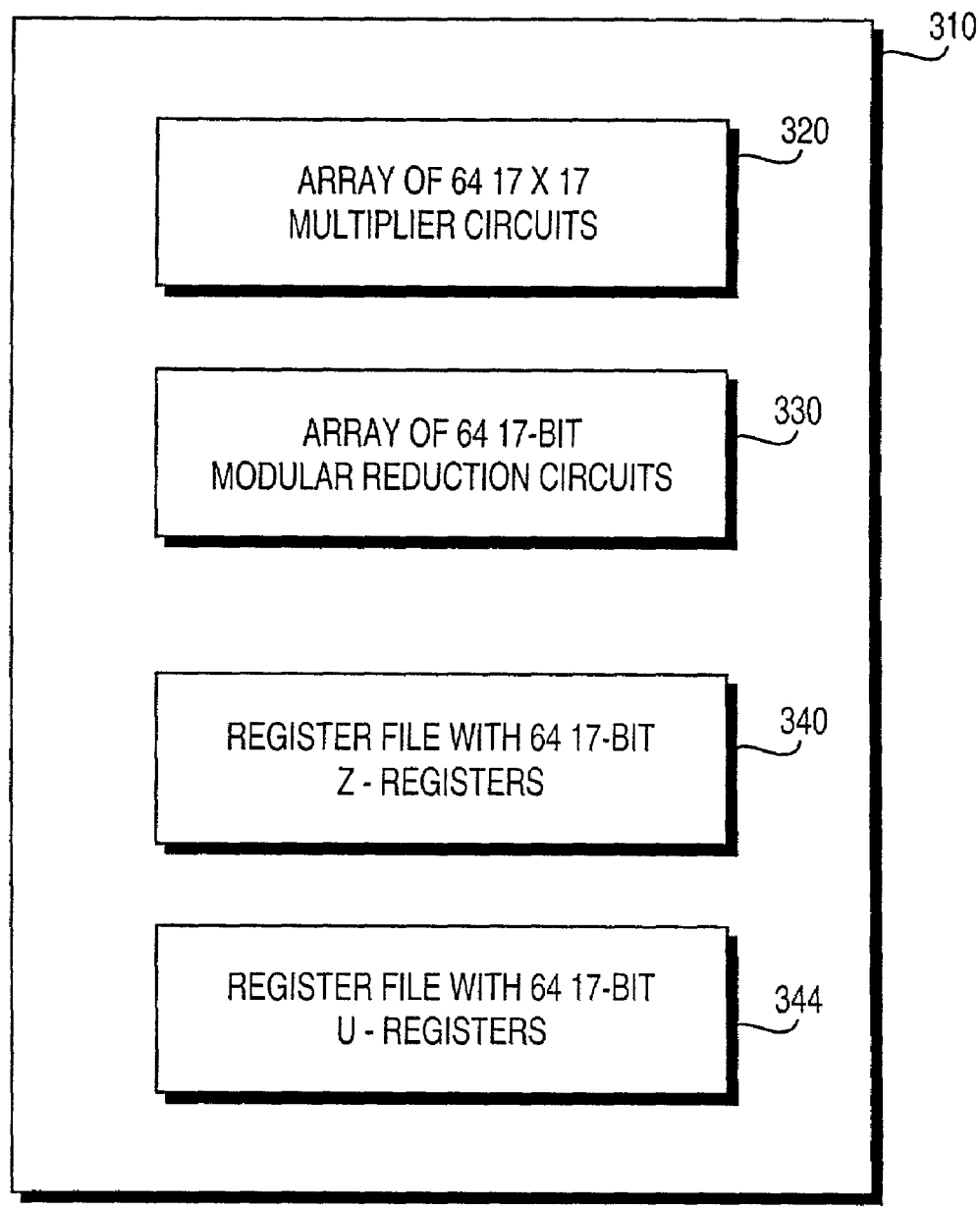
FIG. 3A is a block diagram depicting an example of part of an apparatus for performing modular multiplication, according to an embodiment.

FIG. 3A is a block diagram depicting an example of part of an apparatus 310 for performing modular multiplication, according to an embodiment. The example of FIG. 3A is based on having 64 17-bit residues with RNS representations, although a different number of residues of different lengths may be used. Apparatus 310 includes a multiplier circuit array 320, a modular reduction circuit array 330, and register files 340, 350.

Multiplier circuit array 320 is depicted in FIG. 3A as an array of 64 17×17 multiplier circuits for performing multiplication operations. Multiplier circuit array 320 may be implemented using an array of 4:2 compressors organized into three levels such that can be executed in one clock cycle. Multiplier circuit array 320 may also be implemented with a final adder module, a set of 64 34-to-17-bit modular reduction circuits, such as modular reduction circuit array 330 described below, and a register file, such as register file 340 or register file 350 described below, which can be executed in one clock cycle. Therefore, the multiplication operations performed by multiplier circuit array 320 may be completed in two clock cycles.

Modular reduction array 330 is depicted in FIG. 3A as an array of 64 17-bit modular reduction circuits. Modular reduction circuit array 330 receives 34-bit values as input, such as from the final adder module of modular multiplier array 320 discussed above, and produces 17-bit values as output to the appropriate file register.

Register file 340 is depicted in FIG. 3A as having 64 17-bit Z-registers, and register file 344 is depicted in FIG. 3A as having 64 17-bit U-registers. Thus, one Z-register and one U-register are provided for each of the 64 residues in the RNS base. As described later herein, the data flow for apparatus 310 is arranged such that the same set of Z-registers and U-registers are used for each of the two passes represented by blocks 130 and 140.

B. Example Apparatus for Modular Exponentiation

Figure 3B:
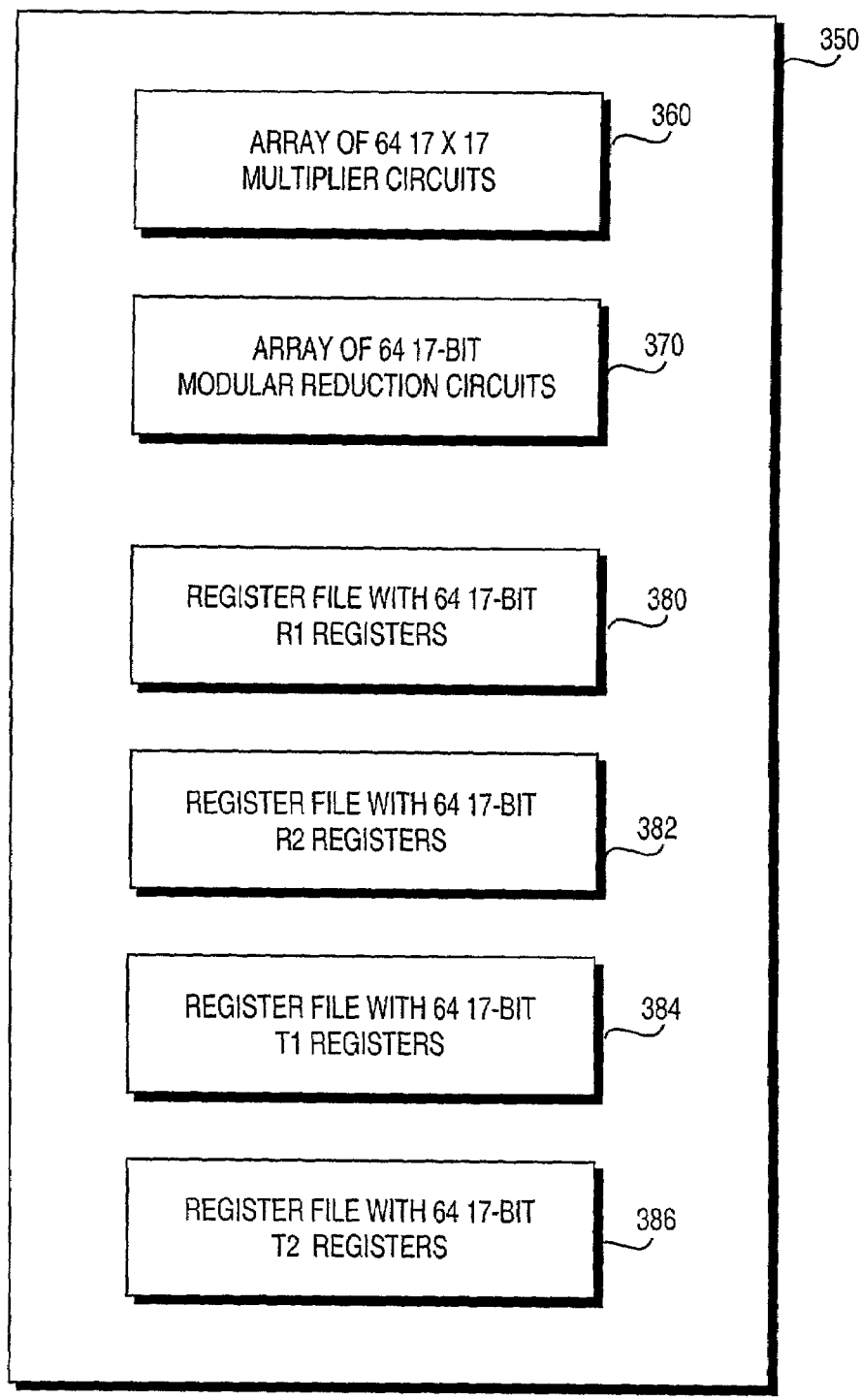
FIG. 3B is a block diagram depicting an example of part of an apparatus for performing modular exponentiation, according to an embodiment.

FIG. 3B is a block diagram depicting an example of part of an apparatus 350 for performing modular exponentiation, according to an embodiment. The example of FIG. 3B is based on having 64 17-bit residues, although a different number of residues of different lengths may be used. Apparatus 350 includes a multiplier circuit array 360, a modular reduction circuit array 370, and register files 380, 382, 384, and 386.

Multiplier circuit array 360 and modular reduction circuit array 370 may be implemented in the same manner as multiplier circuit array 320 and modular reduction circuit array 330 discussed above, and therefore will not be discussed further here.

Register file 380 is depicted in FIG. 3B as having 64 17-bit R1-registers, register file 382 as having 64 17-bit R2-registers, register file 384 as having 64 17-bit T1-registers, and register file 386 as having 64 17-bit T2-registers.

Thus, one R1-register, one R2-register, one T1-register, and one T2-register are provided for each of the 64 residues in the RNS base. As described later herein, the data flow of apparatus 310 is arranged such that only the set of R1-registers and the set of R2-registers are used in the first pass of the dual passes as represented by block 130 in FIG. 1, while all four register files are used for the second pass of the dual passes as represented by block 140.

III. Acronyms

Acronyms used herein have the following meanings:

| | |
|---|---|
| IKEON | Security processor for IKE acceleration with accompanied crypto transform functions |
| IKE | Refers to the Internet Key Exchange according to the RFC-2409. |
| NP | Refers to the Toaster Network Processor |
| TMC | Core VLIW engine in NP ASIC |
| RMC | Reduced NP (TMC) Micro-Controller; core VLIW engine in NP ASIC |
| ASIC | Application Specific Integrated Circuit |
| DES | Data Encryption Standard; Symmetric Encryption based on 56 bit Key |
| 3DES | Triple DES, such as using 3x56 bit keys |
| MD5 | Message Digest 5; Asymmetric Encryption |
| SHA-1 | Secure Hash Algorithm-1; Asymmetric Encryption |
| AES | Advance Encryption Standard |
| SA | Security Association |
| SAD | Security Association Data Base |
| SPD | Security Policy Data Base |
| IPSec | Internet Protocol Security |
| AH | Authentication Header |
| ESP | Encapsulated Security Payload |
| RNS | Residue Number System |
| RNR | Redundant Number Representation |
| Ra, Rb | Source Data Registers |
| Rd | Destination Data Register |
| Rm | Modulus register |
| CRT | Chinese Remainder Theorem |
| GCD | Greatest Common Divisor |
| RND | Random Number Generator |
| RSA | Rivest/Shamir/Adleman Encryption Algorithm |
| DSA | Digital Signature Algorithm |

IV. Review of IPSec and IKE Processing

The Internet Protocol Security (IPSec) packet processing complex consists of a set of components that include: MIPS(RP) processor, NP ultra-fast forwarding engine, a feeder chip and the IKEON processor. In addition to standard, packet header mode of operation, the full packet mode engages the processing complex in IPSec packet processing. The following are some of the scenarios pertaining to the IPSec packet mode of operation: an IP packet that is IPSec encrypted is detected and it is directed to the processor complex for decryption; a line card receives a plain IP packet (i.e. not encrypted) and the forward decision determines that the packet should be forwarded to an outgoing interface that requires the packet to be IPSec encrypted; the RP generates a management packet (during the SA negotiation process) that needs to be IPSec encrypted, etc.

The outbound IPSec traffic requires SPD lookup to be performed for policy determination. Then the packet is encrypted accordingly (after the SA is established) and delivered to the forwarding engine.

The following steps are made during the outbound IPSec packet processing:
Retrieve IP source/destination address
Retrieve IP source/destination port
Retrieve L4 protocol id The above values form the selectors used as search keys for the SPD lookup. The policy found will determine whether IPSec encryption is permitted or denied to the packet. If denied, a special SA tag will be added to the packet header so that the packet will be passed without encryption taking place. If the policy mandates encryption, further verification is performed to determine if a SA has been negotiated. If SA already exists, the SA handle will be returned and added to the packet header. If not, the message will be sent to the RP to start IKEON program for IKE-SA negotiation.

The other case of a new SA negotiation is related to the SA life time. A lifetime timer associated with each negotiated SA may expire, in which case a new SA will be negotiated to replace this existing one. The RP and NP complex will be responsible to manage the SA lifetime timer and should send a message to the IKEON to initiate SA re-negotiation before timer expiration.

The inbound IPSec processing extracts a set of parameters from the packet headers as IPSec protocol ID and Security Parameter Index (SPI). These two parameters form the search key for the SA data base. If the search fails, the packet is discarded and relevant statistics is updated. If the search succeeds, a SA handle is returned which is appended to the packet to be queued and transmitted to the NP complex.

The RP and NP will be microcoded to implement the inbound and outbound IPSec data path functionality. The NP contains crypto engines that can process DES/3DES encryption/decryption combined with HMAC SHA-1/MD-5 at OC-48 and higher rates.

Before an IPSec packet is sent to NP a control header will be added that carries all the control information (such as encryption, decryption or authentication keys, offsets, modes, and etc.) required by NP to encrypt, decrypt and/or authenticate the packet.

A. IPSec Packet Processing Procedures

The following is a short overview of the inbound/outbound IPSec packet processing procedures.

For the inbound IPSec data path:
IPSec protocol processor (first cluster TMC) does SAD lookup;
Pass the packet to next cluster TMC for decryption;
IKE message is always directed to the RP;
Decrypted packet is passed to the RP for other processing; and
Processed packet is queued in the feeder chip to be sent to the outgoing port.

Figure 4:
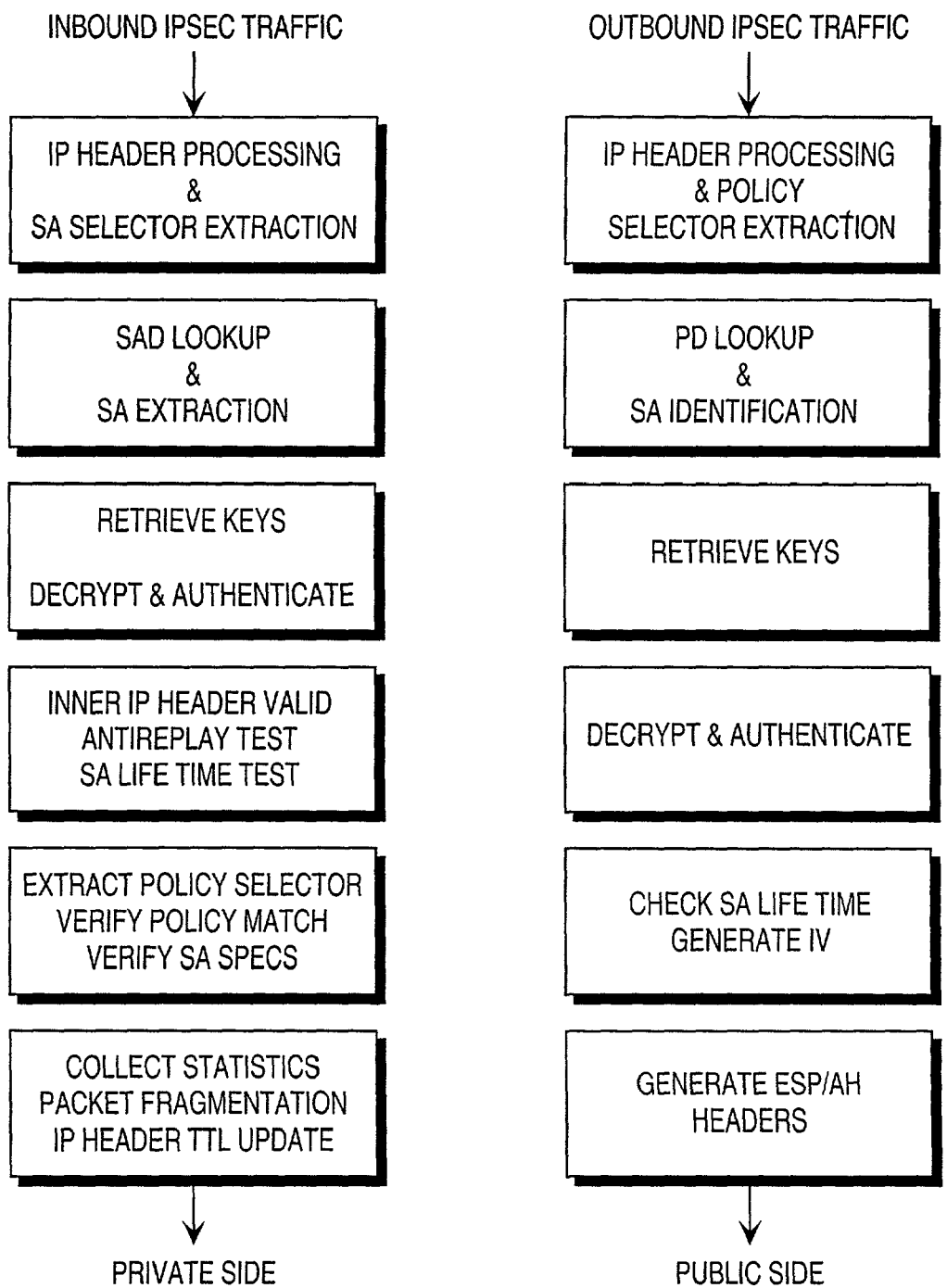
FIG. 4 is a flow diagram that depicts the inbound and outbound IPSec processing procedures.

For the outbound IPSec data path:
IPSec processor (first cluster TMC) performs SPD lookup;
If SA available, pass the packet to the next cluster TMC for encryption;
Packet with no SA available is directed to the feeder (RP);
RP starts SA negotiation through the IKEON; and
IKEON negotiates keys.
Processed packet is queued in the feeder to be sent out.
FIG. 4 is a flow diagram that depicts the inbound and outbound IPSec packet processing procedures.

B. Introduction to IKE Processing

Internet Key Exchange (IKE), as defined in RFC-2409, is the protocol used to establish security associations that are needed to generate and refresh keys used in IPSec packet processing. IKE was originally called ISAKMP/Oakley—Internet Security Association and Key Management Protocol (ISAKMP), defined in RFC 2408. It provided a framework to establish security associations and cryptographic keys. IKE still uses ISAKMP as its framework but incorporates Oakley and SKEME as its key exchange protocol. IKE is made up of two phases as defined in the ISAKMP framework, and within these phases Oakley defines a number of modes that can be used.

Phase 1 is the process where the ISAKMP security association must be established. It assumes that no secure channel currently exists and subsequently one is established to protect the ISAKMP messages. Two modes are available for use in Phase 1: main mode and aggressive mode. Support for main mode is a mandatory requirement for IKE, while aggressive mode is optional. Main mode has the advantage of being able to protect the identities of the parties trying to establish the SA, while aggressive mode has the advantage of being able to use three rather than six message flows to establish the ISAKMP SA.

Phase 2 is where subsequent security associations required by the IPSec services are negotiated.

The IPSec protocols AH and ESP require that shared secrets are known to all participating parties that require either manual key entry or out-of-band key distribution. The Internet Key Exchange (IKE) protocol has been designed to meet the stringent requirements of the IPSec protocol. It is based on the Internet Security Associations and Key Management Protocol (ISAKMP) framework and the Oakley key distribution protocol.

IKE offers the following features:
Key generation and identity authentication procedures
Automatic key refresh
Perfect forward security (PFS)
Two-phased approach
Phase 1—Establish keys and SA for key exchanges
Phase 2—Establish SAs for data transfer
Implemented as application over UDP
Supports host-oriented (IP address) and user-oriented (long-term identity) certificates
Uses strong authentication for ISAKMP exchanges
No actual keys are shared, only a token used to create keying material
Digital signatures (using either DSS or RSA methods)
Public key encryption (RSA and revised RSA)

Figure 5:
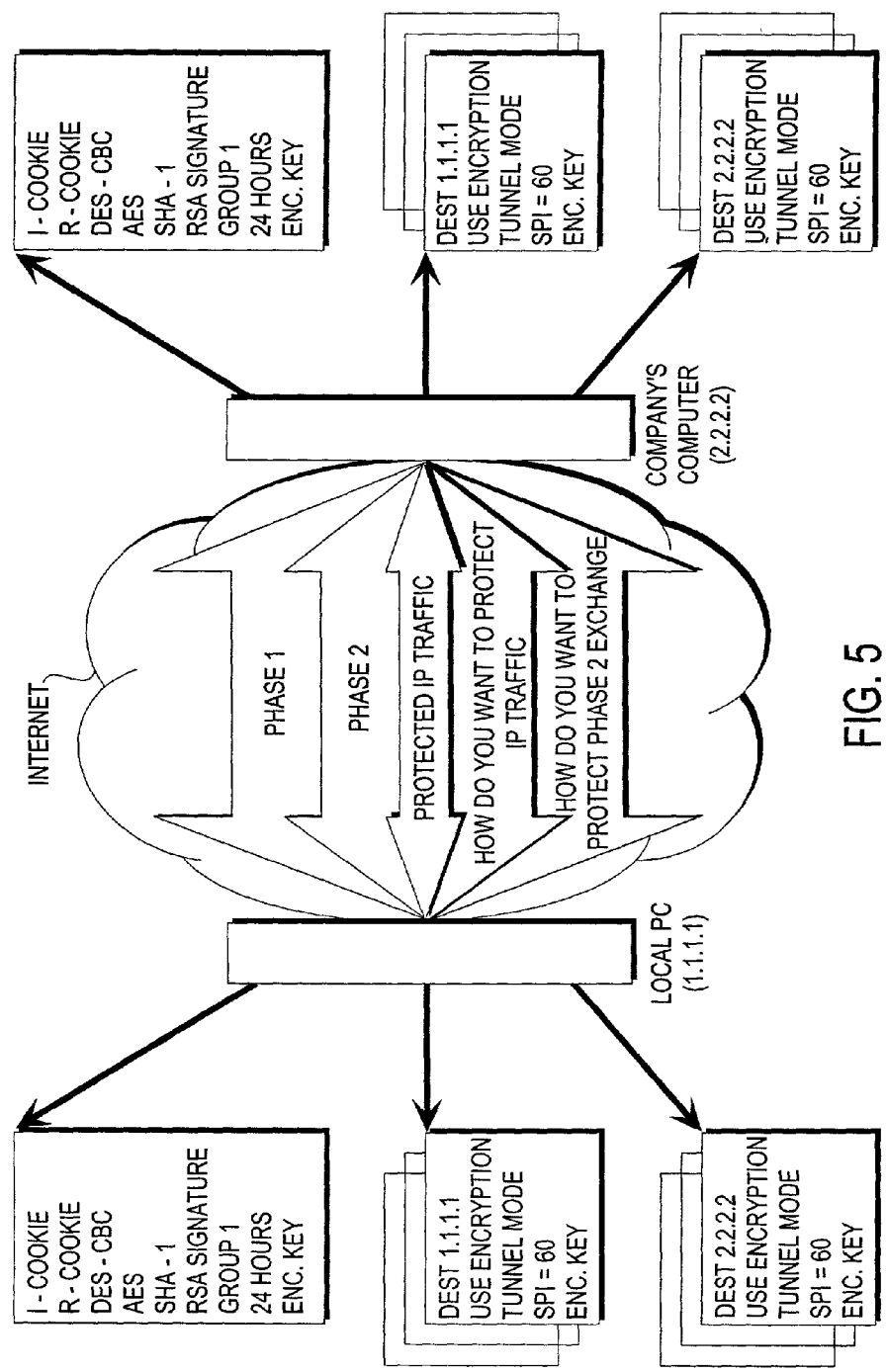
FIG. 5 is a diagram that depicts an overview of IKE Phases 1 and 2.

The following sections present an overview of IKE Phases 1 and 2. FIG. 5 is a diagram that depicts an overview of IKE Phases 1 and 2.

C. IKE Phase 1 Overview

During Phase 1, the partners exchange proposals for the ISAKMP SA and agree on one. This contains specifications of authentication methods, hash functions and encryption algorithms to be used to protect the key exchanges. The partners then exchange information for generating a shared master secret:
Cookies that also serve as SPIs for the ISAKMP SA
Diffie-Hellman values
Nonces (random numbers)
Optionally exchange IDs when public key authentication is used Both parties then generate keying material and shared secrets before exchanging additional authentication information.

D. IKE Phase 2 Overview

During Phase 2, the partners exchange proposals for protocol SAs and agree on one. This contains specifications of authentication methods, hash functions and encryption algorithms to be used to protect packets using AH and/or ESP. To generate keys, both parties use the keying material from a previous Phase 1 exchange and they can optionally perform an additional Diffie-Hellman exchange for PFS.

The Phase 2 exchange is protected by the keys that have been generated during Phase 1, which effectively ties a Phase 2 to a particular Phase 1.

V. RSA Protocol

The message space and ciphertext space for the RSA public key encryption are both Z/mZ, m=1, ..., 2048. The modulus m=pq is the product of two randomly chosen distinct prime numbers p and q, both of 1024 bits. m is in public knowledge.

A. RSA Key Generation

Keys for the RSA protocol are generated as follows:
1. Generate two distinct random prime numbers, p and q, of similar size (both with 1024 bits).
2. Compute m=pq and u=(p-1)(q-1).
3. Select a random public exponent e (recommended value e=3 or $2^{16}+1$), 1<e<u, such that gcd(e, u)=1.
4. Compute integer d from de=1 (mod u).
5. Broadcast public key (m, e).
6. Keep private key d and primes p,q secret.

B. RSA Signature Generation and Verification for Authentication

From the original "Text" the "source" generates and signs a message M, and then the "destination" verifies signature and recovers the message M.

RSA signature generation is performed as follows:
(1) Compute M=transf(Text), for a given transform function "transf( )".
(2) Compute S=$M^e$ mod m.
(3) S is the signature from the source.

RSA signature verification is performed as follows:
(1) Get public key (m, e).
(2) Compute and verify M=$S^d$ mod m.
(3) Recover Text=$transf^{-1}$(M).

C. RSA Encryption/Decryption Introduction

From the original "Text" the source generates and encrypts a message M.

Encryption is performed as follows:
(1) Compute M=transf(Text), for a given transform function "transf( )".
(2) Compute C=$M^e$ mod m.
(3) C is the encrypted message.

Decryption is performed as follows:
(1) Compute M=$c^d$ mod m.
(2) Recover Text=$transf^{-1}$(M).

If m=pq is a 2048 bit RSA modulus where p and q are 1024 bit primes, computing C=$M^d$ mod m (or S=$M^d$ mod m) for a message M can be made more efficient by using the CRT decomposition into residues based on p and q. Since the p,q pair is known, compute $S_1$=$M^d$ mod p and $S_2$=$M^d$ mod q and then determine S by using the CRT. This process, as presented below, allows for two 1024 bit modular ALUs to operate in parallel to produce 2048 bit result.

D. RSA Encryption/Decryption Using Single-Radix Conversion

Given the following: p, q—1024 bit primes; C—2048 bit cipher text; M—2048 bit message to be deciphered; and d—2048 bit exponent; the single-radix conversion (SRC) for RSA encryption/decryption is performed as follows:
(1) Compute $d_p$=d (mod p-1); $d_q$=d (mod q-1)
(2) Compute $C_p$=C (mod p); $C_q$=C (mod q)
(3) Compute $M_p$=$C_p^{d_p}$ (mod p); $M_q$=$C_q^{d_q}$ (mod q)
(4) Compute M=($M_p q(q^{-1}$ mod p)+$M_q p(p^{-1}$ mod q)) (mod m)
(5) Recover Text=$transf^{-1}$ (M).

Note: this SRC approach relies on 2048 bit arithmetic, whereas the MRC approach below only relies on 1024 bit arithmetic.

E. RSA Encryption/Decryption Using Mixed-Radix Conversion

Given the following: p, q—1024 bit primes; C—2048 bit cipher text; M—2048 bit message to be deciphered; and d—2048 bit exponent; the mixed-radix conversion (MRC) for RSA encryption/decryption is performed as follows:
(1) Compute $d_p$=d (mod p-1); $d_q$=d (mod q-1)
(2) Compute $C_p$=C (mod p); $C_q$=C (mod q)
(3) Compute $M_p$=$C_p^{d_p}$ (mod p); $M_q$=$C_q^{d_q}$ (mod q)
(4) Compute $M_{q-p}$=$M_q$-$M_p$
(5) Compute M=$M_p$+[($M_{q-p}(p^{-1}$ mod q)) (mod q)] p
(6) Recover Text=$transf^{-1}$ (M).

The MRC approach described above is used to decompose 2048 bit exponentiation problem into two 1024 bit exponentiation problems. The $M_p$=$C_p^{d_p}$ (mod p) and $Mq$=$C_q^{d_q}$ (mod q) as well as modular reductions are computed in parallel on two separate modular arithmetic ALUs with 1024 bit operands. The final recombination and recovery of 2048 bit result will be done based on the MRC algorithm as described above.

VI. Digital Signature Algorithm (DSA) Protocol

The digital signature algorithm (DSA) is a U.S. Federal Information Processing Standard (FIPS 186) called the Digital Signature Standard (DSS). The signature mechanism here requires a hash function based on the SHA-1 algorithm.

A. DSA Key Generation

From the original "Text" the "source" generates and signs a message M, and the "destination" verifies signature and recovers the message M, according to the following:
(1) Select a prime number q such that $2^{159}$<q<$2^{160}$.
(2) Select a prime number $2^{511+64a}$<p<$2^{512+64a}$ with a∈[0, 8] such that q divides (p-1).
(3) Select an integer g and compute h=$g^{(p-1)/q}$ mod p such that h !=1.
(4) Select a random integer b such that 1<=b<=q-1.
(5) Compute y=$h^b$ mod p.
(6) The public key is represented by (p, q, h, y) while b is the private key.

B. DSA Signature Generalization and Verification

DSA signature generation is performed as follows:
(1) Select a random secret integer 0<k<q.
(2) Compute t=($h^k$ mod p) mod q.
(3) Compute $k^{-1}$ mod q (4) Compute s=k$^{-1}$ [SHA1(M)+bt] mod q.
(5) The signature for M is (s, t).
DSA signature verification is performed as follows:
(1) Get (p, q, h, y).
(2) Verify 0<s,t<q; if not, then reject the signature.
(3) Compute w=s$^{-1}$ mod q and SHA1(M).
(4) Compute u$_1$=wSHA1(M) mod q and u$_2$=tw mod q.
(5) Compute v=(h$^{u1}$y$^{u2}$ mod p) mod q.
(6) If v=r, signature verified.

The size of q is fixed at 160 bits, while the size of p can be any multiple of 64 between 512 and 1024 bits inclusive. FIPS 186 does not permit primes p larger than 1024 bits. Signature generation requires one modular exponentiation (1024 bit key), one modular inverse with a 160-bit modulus, two 160-bit modular multiplications, and one addition. The 160-bit operations are relatively minor compared to the exponentiation. DSA has the advantage that the exponentiation can be precomputed and need not be done at the time of signature generation. By comparison, no precomputation is possible with the RSA signature scheme. The major portion of the work for signature verification is two exponentiations modulo p, each to 160-bit exponents.

VII. Diffie-Hellman Protocol

In the Basic Diffie-Hellman key agreement protocol, two parties 'A' and 'B' exchange initial messages over an open channel. Both 'A' and 'B' compute identical secret K. An appropriate prime p and generator 2<=h<=p−2 are agreed upon and published.

The following procedure illustrates the process:
(1) 'A' chooses a random number x, such that 1<=x<=p−2, and sends out a=h$^x$ mod p while x remains private.
(2) 'B' chooses a random number y, such that 1<=y<=p−2, and sends out b=h$^y$ mod p while y remains private.
(3) 'B' computes the shared key K: K=a$^y$ mod p.
(4) 'A' computes the shared key K: K=b$^x$ mod p.

VIII. IKEON ASIC Architecture

According to one embodiment, an IKEON ASIC provides a VLIW engine for standard IKE protocol processing (32/64 bit non-modular operations) and master control operations in addition to a set of IPSec transform functions (DES, 3DES, MD5, SHA-1) and modular arithmetic on large data operands (up to 2048) for encryption protocols such as RSA, DSA, and Diffie-Hellman protocols, as implemented in hardware. The transform functions and modular arithmetic processors are implemented as coprocessors appended to the main ALU within the master execution unit of the VLIW RMC Core engine. Both 32- and 64-bit operations are supported as well as byte-enabled writes.

A. IKEON High Level Block Diagram

Figure 6:
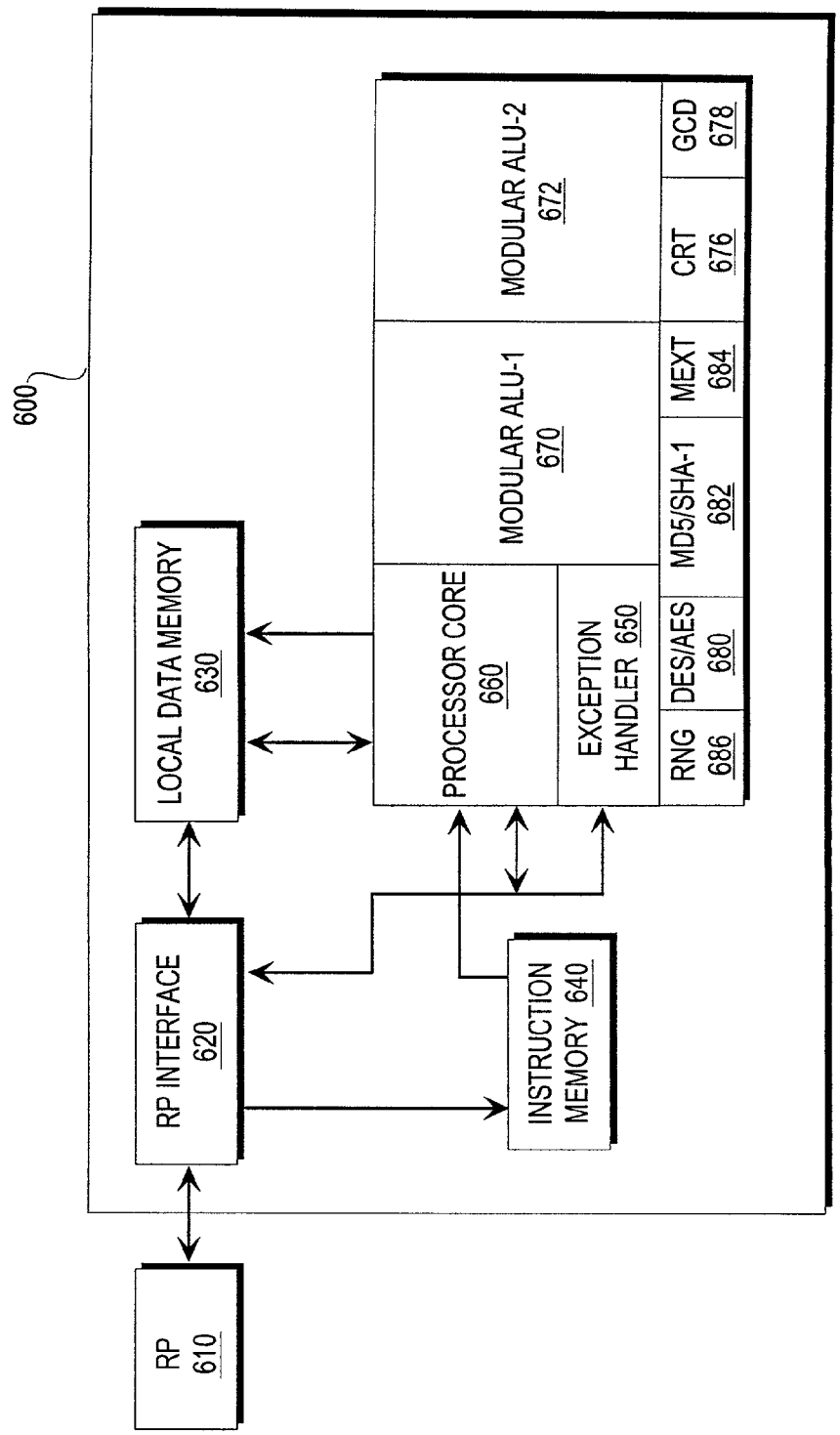
FIG. 6 is a block diagram of an IKEON processor, according to an embodiment.

FIG. 6 is a block diagram of an IKEON processor 600, according to an embodiment. FIG. 6 depicts IKEON processor 600 communicatively coupled to an external routing processor (RP) 610. IKEON processor 600 includes an RP interface 620, a local data memory 630, an instruction memory 640, an exception handler 650, a processor core 660, and a set of coprocessors that may be used for encryption protocol computations, such as for the RSA, DSA, and Diffie-Hellman protocols.

RP interface 620 provides communications with the external RP 610. Local data memory 630 is shared between the RP and RMC processors, and local data memory 630 may include 24 KB of local data SRAM. Instruction memory 640 is accessible by the external RP processor and may include 16 KW of RMC instruction memory. Processor core 660 may be implemented as a VLIW engine with double, non-modular, 32/64 bit execution units.

The set of coprocessors include the following: a modular ALU-1 670, a modular ALU-2 672, a CRT module 676, a GCD module 678, a DES/AES module 680, a MD5/SHA-1 module 682, a MEXT module 684, and a RNG module 686.

Modular ALU-1 670 and modular ALU-2 672 are arithmetic logic units (ALUs) that perform modular arithmetic on operands. For example, modular ALU-1 670 and modular ALU-2 672 may be 1024 bit wide ALU's that perform modular arithmetic on 1024 bit operands. As explained above, for an encryption protocol that uses a 2048 bit key, the 2048 bit modular operations may be decomposed into two 1024 bit modular operations and performed in parallel, such as on ALU-1 670 and modular ALU-2 672.

CRT module 676 is a Chinese Remainder Theorem module that reduces a larger operand into two smaller operand and later recombines smaller operands into a larger operand. For example, for an encryption protocol that uses a 2048 bit key, CRT module 676 reduces the 2048 bit operands into two 1024 bit operands, and later recombines 1024 bit operands into a 2048 bit operand.

GCD module 678 performs multiplicative inverse computations (i.e., greatest common divisor or GCD). For example, GCD module 678 may be used to find an integer Z such that AZ=1 mod (M) for a modulus M. Z is called the multiplicative inverse of A modulo M.

DES/AES module 680 performs computations according to the symmetric encryption standard (DES) based on a 3×56 bit key and according to the advanced encryption standard (AES).

MD5/SHA-1 module 682 performs computations according to the Message Digest 5 (MD5) program and the Secure Hash Algorithm-1 (SHA-1) program.

MEXT module 684 performs non-modular 32/64 bit multiplication/division.

RNG module 686 performs random number generation (RNG).

B. IKEON Modular Arithmetic Processor

The IKEON modular arithmetic processor implements modular arithmetic, including modular exponentiation, on up to 2048 bit operands. For maximum efficiency two ALUs, 1024 bits wide, are provided that operate in parallel on either the original 1024 bit cipher text, or on one of the two 1024 bit operands obtained by CRT residue decomposition of 2048 bit cipher text; this is based on the 2048 bit key decomposition into two 1024 bit prime factors–modulus m=pq, where p and q are 1024 bit wide. This mechanism will be explained in detail in a later section.

Figure 7:
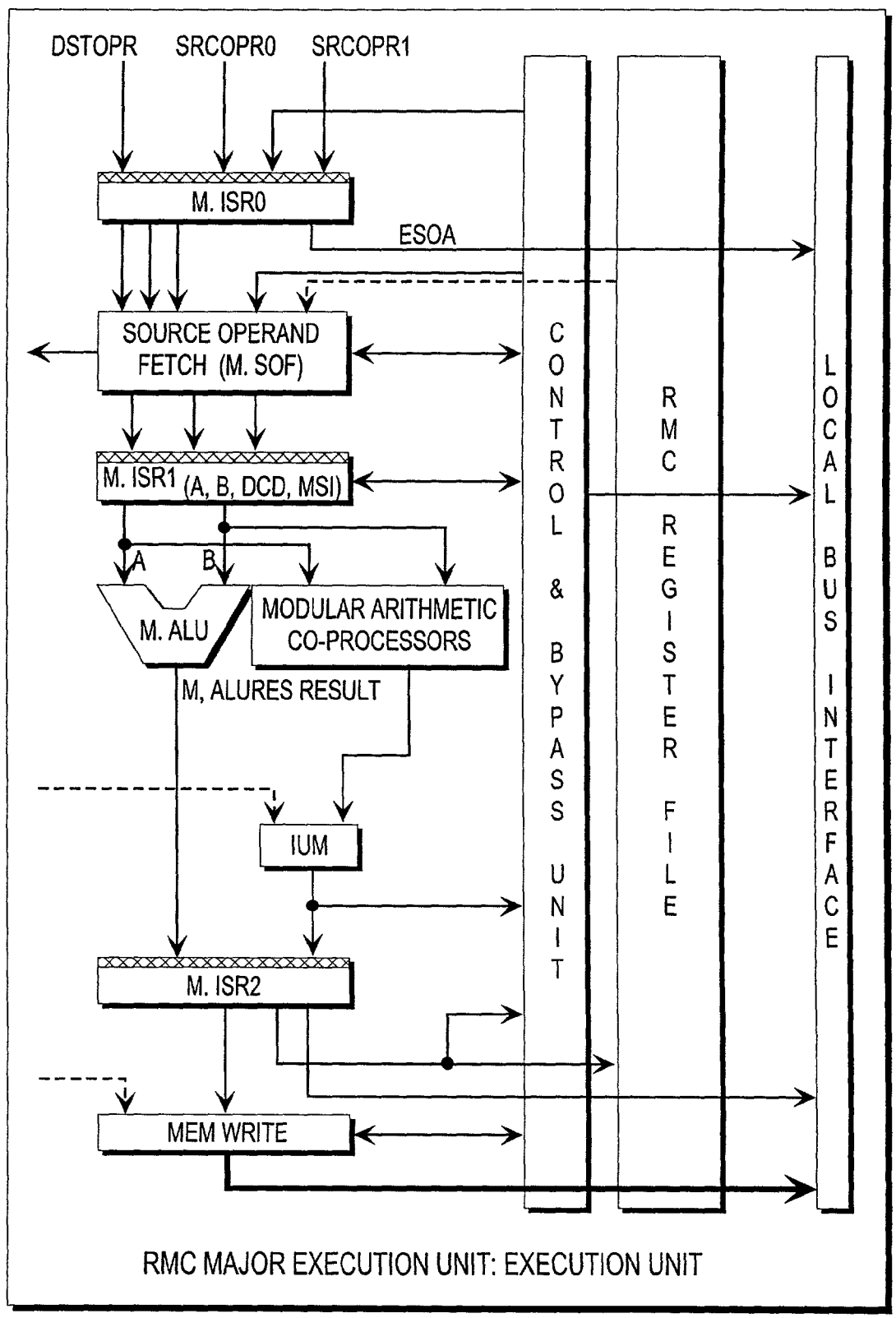
FIG. 7 is a diagram that depicts how a modular ALU is attached to the processor's execution unit of the Reduced-Toaster Micro Controller (RMC) core engine.

Modular ALUs perform the following operations:
(1) Modular addition
(2) Modular subtraction
(3) Modular reduction
(4) Modular multiplication
(5) Modular exponentiation FIG. 7 is a diagram that depicts how a modular ALU is attached to the processor's execution unit of the Reduced-Toaster Micro Controller (RMC) core engine.

C. Modular Arithmetic Processor Instructions

The following instructions will be included in the RMC instruction set to support modular and large operand arithmetic operations (the sample instruction set below operates on up to 2048 bit operands):
(1) ModAdd: Rd=(Ra+Rb) mod Rm
(2) ModSub: Rd=(Ra−Rb) mod Rm
(3) ModRed: Rd=Ra mod Rm
(4) ModMult: Rd=Ra×Rb mod Rm
(5) ModExp: Rd=Ra$^{Rb}$ mod Rm

IX. Modular ALU Architecture

The following presents the algorithmic aspect of the modular ALU architecture, according to one embodiment. The basic arithmetic operations of addition, subtraction, and multiplication are performed in Z/Zm, the integers modulo m (m is a large positive integer, not necessaraly a prime). The encryption protocols, such as RSA, DSA and Diffie-Hellman, require algorithms for performing multiplication and exponentiation in Z/mZ. Techniques described here are directly mapped into hardware structures of the IKE-ALU unit.

A. Preliminary Definitions

Multiple-precision modular operations are performed in Z/mZ, and the integers are modulo m, where m is a multiple-precision positive integer. For example, $m=(m_0, \ldots, m_{n-1})$,
$x=(x_0, \ldots, x_{n-1})$, and
$y=(y_0, \ldots, y_{n-1})$ are non-negative integers in radix 2 representation such that x,y<m. Methods for computing x+y (mod m), x−y (mod m), x*y (mod m), x$^{-1}$ (mod m) are described below.

For the bit indexing approach used in the representations above, the bits (e.g., $m_i$, $x_i$, and $y_i$) are numbered from 0 to n from left to right. For example, the binary value 1011 (e.g., decimal 11) has "i" values of "0123." However, other implementations may use other bit indexing approaches. For example, the bits may be numbered from 1 to n from right to left, such that the binary value 1011 has "i" values of 4321.

If z is any integer, then z (mod m) is called modular reduction of z with respect to modulus m.

B. Dual-Pass Montgomery Multiplication with Precomputation

According to one embodiment, dual-step Montgomery multiplication with precomputation to provide the exact (i.e., unscaled) output is based on the input:

x,y,m,w where
x,y<m,
w>=4m
m'm=−1(mod w);
and precomputing the constant, R, as follows:

$R=w^2(mod\ m)$ to provide the following output:

$r=xy(mod\ m)$ based on the following steps:
(1) z=xR
(2) u=zm' (mod w)
(3) r=(z+um)/w
(4) z=yr
(5) u=zm' (mod w)
(6) r=(z+um)/w.

If Mont(x,y,r) denotes one-pass Montgomery multiplication, then the steps in the multiplication approach above can be written as:
(1) Mont(x,R,r)
(2) Assign: x<==r
(3) Mont(x,y,r).
where x,y are inputs to each pass of the dual passes, respectively, and r,r are the outputs of each of the dual passes, respectively

C. General Montgomery Exponentiation

According to one embodiment, general Montgomery exponentiation is performed in a loop based on the inputs:

x,y,m,w where
x,y<m,
w>=4m
m'm=−1(mod w);
to provide the following output:

$t=x^y(mod\ m)$ based on the following steps:
(1) t<=1, r<=x
(2) for (i=1 to n),
    if ($y_i$=1) then {t<=tr (mod m)}
$r<=r^2(mod\ m)$ If Mont(x,y,r) denotes one-pass Montgomery multiplication, then the steps in the general exponentiation approach above can be written in binary-H form and using the bit indexing approach in which the binary value 1011 has "i" values of 0123 as:
(1) t<=1, r<=x
(2) for (i=1 to n),
    Mont(t,t,t)
    if ($y_i$=1) then {Mont(r,t,t)}
Other approaches may be used as well. For example, using binary-L and a bit indexing approach in which the binary value 1011 has "i" values of 4321, the above steps may be expressed as:
(1) t<=1, r<=x
(2) for (i=1 to n),
    if ($y_i$=1) then {Mont(r,t,t)}
    Mont(r,r,r)

D. Dual-Pass Montgomery Exponentiation with Precomputation

Dual-Pass Montgomery exponentiation is performed in a loop based on the inputs:

x,y,m,w where
x,y<m,
w>=4m
m'm =−1 (mod w);
and precomputing the constant, R, as follows:

$R=w^2(mod\ m)$ to provide the following output:

$t = x^y \pmod{m}$ based on the following steps:
  (1.0) t=1,
    (1.1) z=xR
    (1.2) u=zm' (mod w)
    (1.3) r=(z+um)/w
  (2.0) for ($y_i$=1 to n)
    (2.1) if ($y_i$=1) then
      (2.1.1) z=rt
      (2.1.2) u=zm' (mod w)
      (2.1.3) t=(z+um)/w
    endif
    (2.2) z=rr
    (2.3) u=zm' (mod w)
    (2.4) r=(z+um)/w
    (2.5) Return.

X. Computations in the Residue Number System (RNS)

A. Introduction to RNS

Given:

moduli $m_1, \ldots, m_n$ such that:
$m = m_1 * m_2 * * * m_{n-1} * m_n$, and
$\gcd(m_i, m_j) = 1$ for $i \neq j$,
an integer x that satisfies:

$x < m$ has a modular representation or mixed-radix representation of:

$x = (x_1, \ldots, x_n)$ where:
  $x_i = x \pmod{m_i}$.

The set of modular representations for all integers x in the range x<m is called a residue number system (RNS).

B. Modular Multiplication in RNS

According to one embodiment, modular multiplication in RNS is performed in a loop based on the inputs:

x,y,m,w,v;

and based on the RNS representations:

$W = w_1 * w_2 * * * w_{n-1} * w_n$, $V = v_1 * v_2 * * * v_{n-1} * v_n$, $x_w = (x_{w1}, \ldots, x_{wn})$, $y_w = (y_{w1}, \ldots, y_{wn})$, $x_v = (x_{v1}, \ldots, x_{vn})$, $y_v = (y_{v1}, \ldots, y_{vn})$ where
  gcd(W,V)=1;
  gcd($w_i, w_j$)=1, for i !=j;
  gcd($v_i, v_j$)=1, for i !=j; and
  w>=4m.
to obtain the output:

xy(mod m)

by precomputing the following constant:

$R = W^2 \pmod{m}$, and by precomputing the following RNS representations and constants:

$x_{wi}, y_{wi}, x_{vi}, m'_{wi}, m'_{vi}$, $w^{-1}_{vi}$ from $w^{-1}_{vi} w = 1 \pmod{v_i}$ $R_{wi}, R_{vi}$, $N_i^w$ from $N_i^w (W/w_i) = 1 \pmod{w_i}$ for all i=(1, ..., n)

$N_i^v$ from $N_i^v (V/v_i) = 1 \pmod{v_i}$ for all i=(1, ..., n).

based on the following steps:
  (1) $z_{wi} = x_{wi} R_{wi} \pmod{w_i}$
     $z_{vi} = x_{vi} R_{vi} \pmod{v_i}$
  (2) $u_{wi} = z_{wi} m'_{wi} \pmod{w_i}$
  (3) $(u_{v1}, \ldots, u_{vn}) \Leftarrow (u_{w1}, \ldots, u_{wn})$; RNSbaseW conversion into RNSbaseV
  (4) $r_{vi} = (z_{vi} + u_{vi} m_{vi}) w^{-1}_{vi} \pmod{v_i}$
  (5) $(r_{w1}, \ldots, r_{wn}) \Leftarrow (r_{v1}, \ldots, r_{vn})$; RNSbaseV conversion into RNSbaseW
  (6) $z_{wi} = y_{wi} r_{wi} \pmod{w_i}$
     $z_{vi} = y_{vi} r_{vi} \pmod{v_i}$
  (7) $u_{wi} = z_{wi} m'_{wi} \pmod{w_i}$
  (8) $(u_{v1}, \ldots, u_{vn}) \Leftarrow (u_{w1}, \ldots, u_{wn})$; RNSbaseW conversion into RNSbaseV
  (9) $r_{vi} = (z_{vi} + u_{vi} m_{vi}) w^{-1}_{vi} \pmod{v_i}$
  (10) Compute $r_v \pmod{v} = xy \pmod{m}$.

Figure 8A:
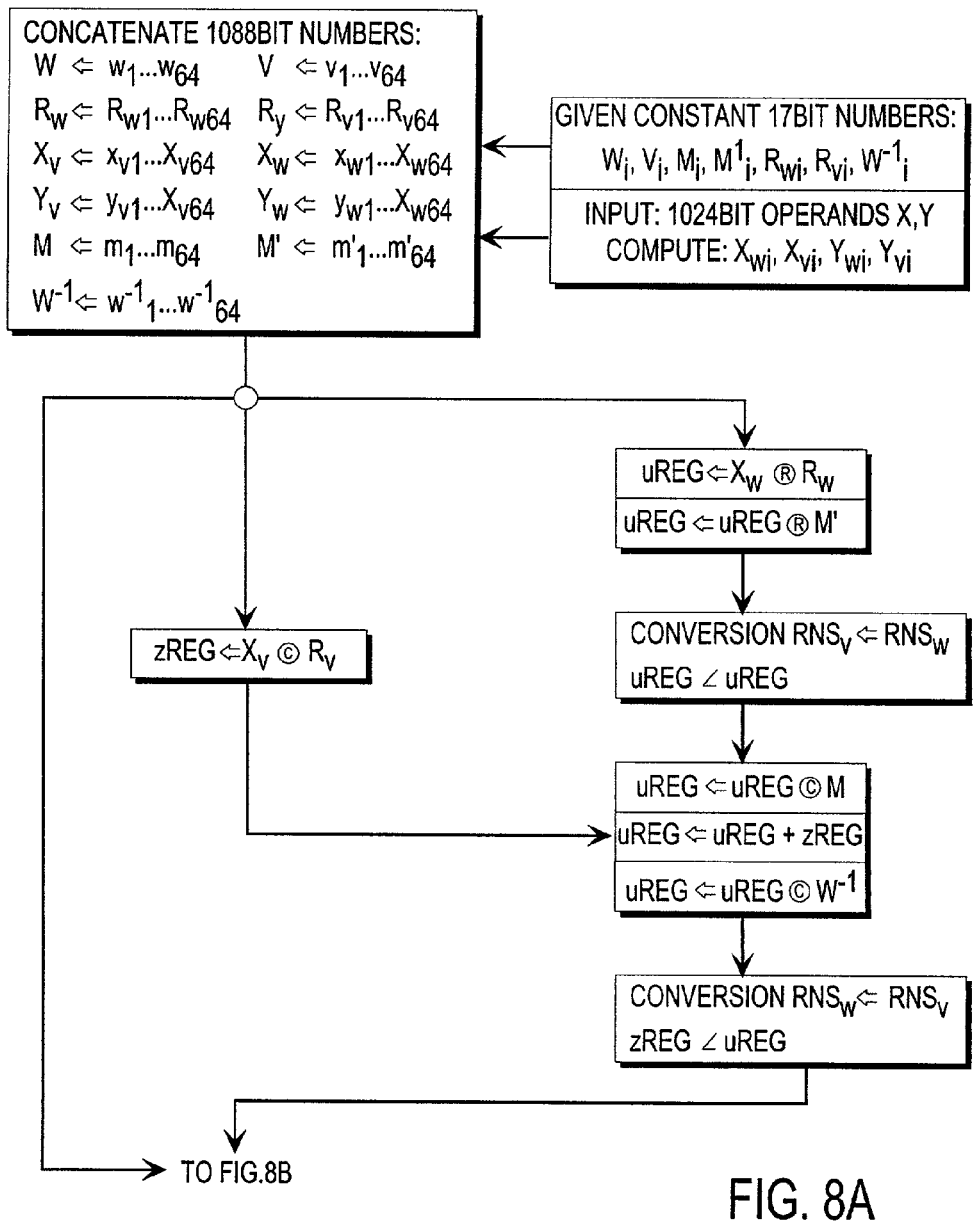
FIG. 8 is a flow diagram that depicts the control flow for modular multiplication in RNS, according to an embodiment.
Figure 8B:
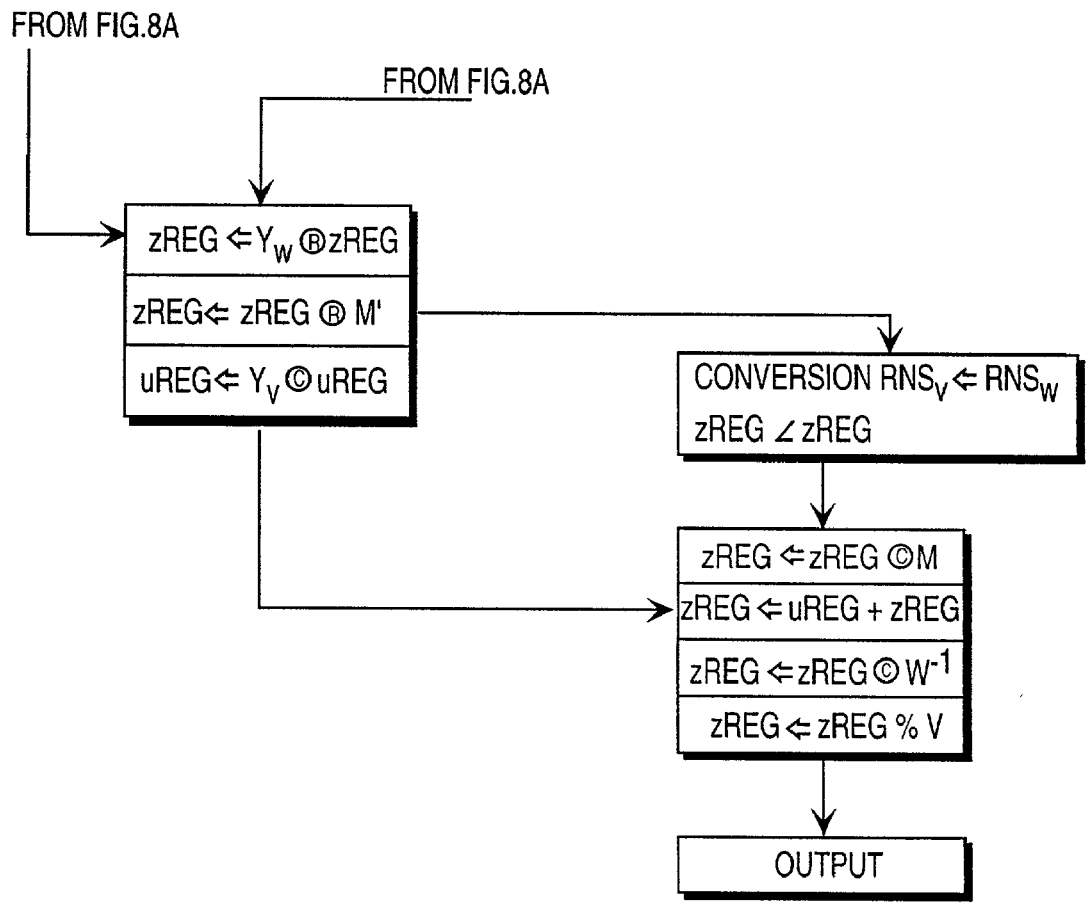

FIGS. 8A–8B are a flow diagram that depicts the control flow for modular multiplication in RNS, according to an embodiment. In FIGS. 8A–8B, rectangular blocks on the same horizontal level overlap execution times.

Figure 9:
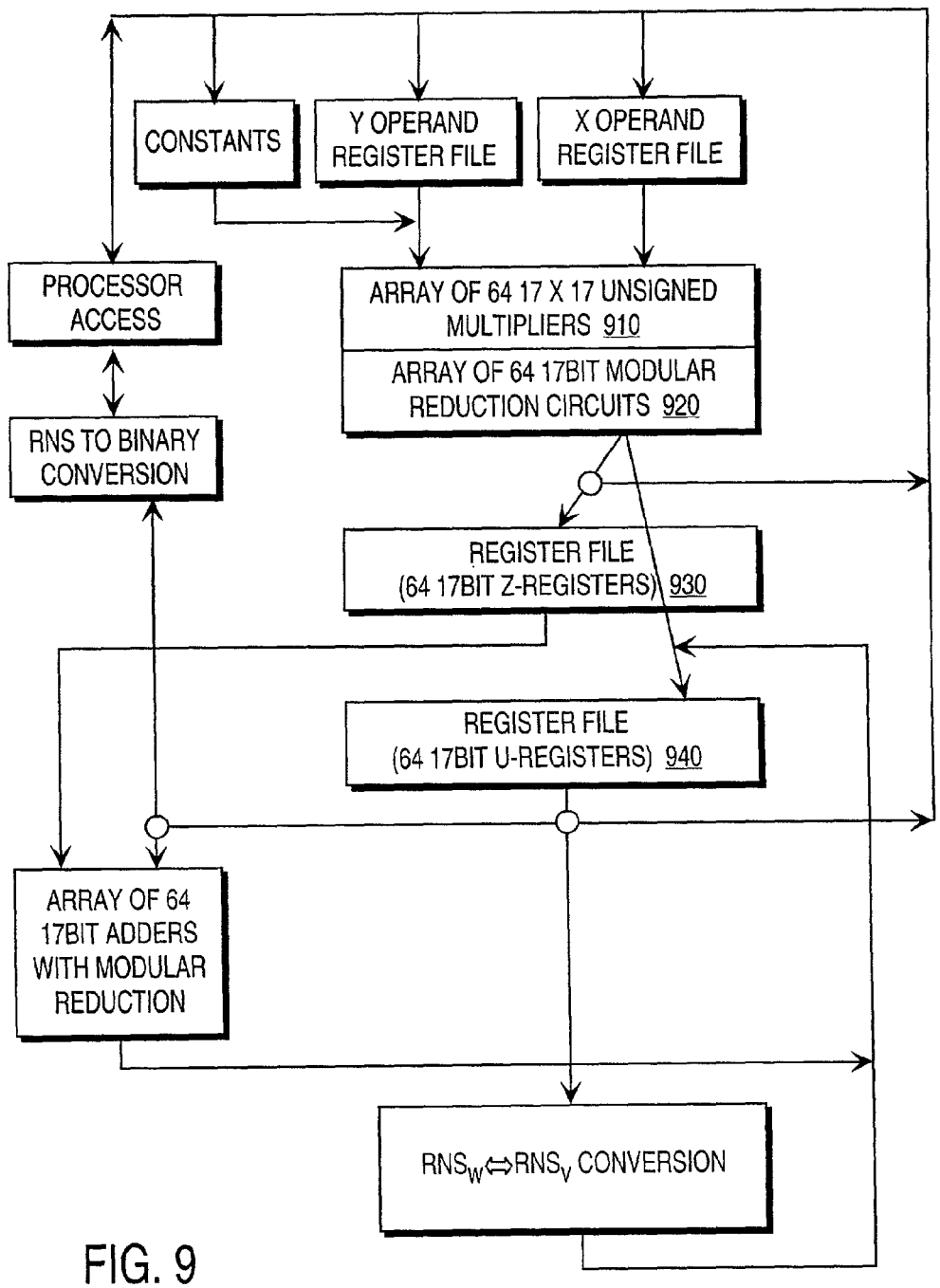
FIG. 9 is a flow diagram that depicts the data flow for modular multiplication in RNS, according to an embodiment.

FIG. 9 is a flow diagram that depicts the data flow for modular multiplication in RNS, according to an embodiment. FIG. 9 includes an array 910 that has 64 17×17 multiplier circuits, an array 920 that has 64 17-bit modular reduction circuits, a register file 930 that has 64 17-bit z-registers, and a register file 940 that has 64 17-bit u-registers.

Figure 10:
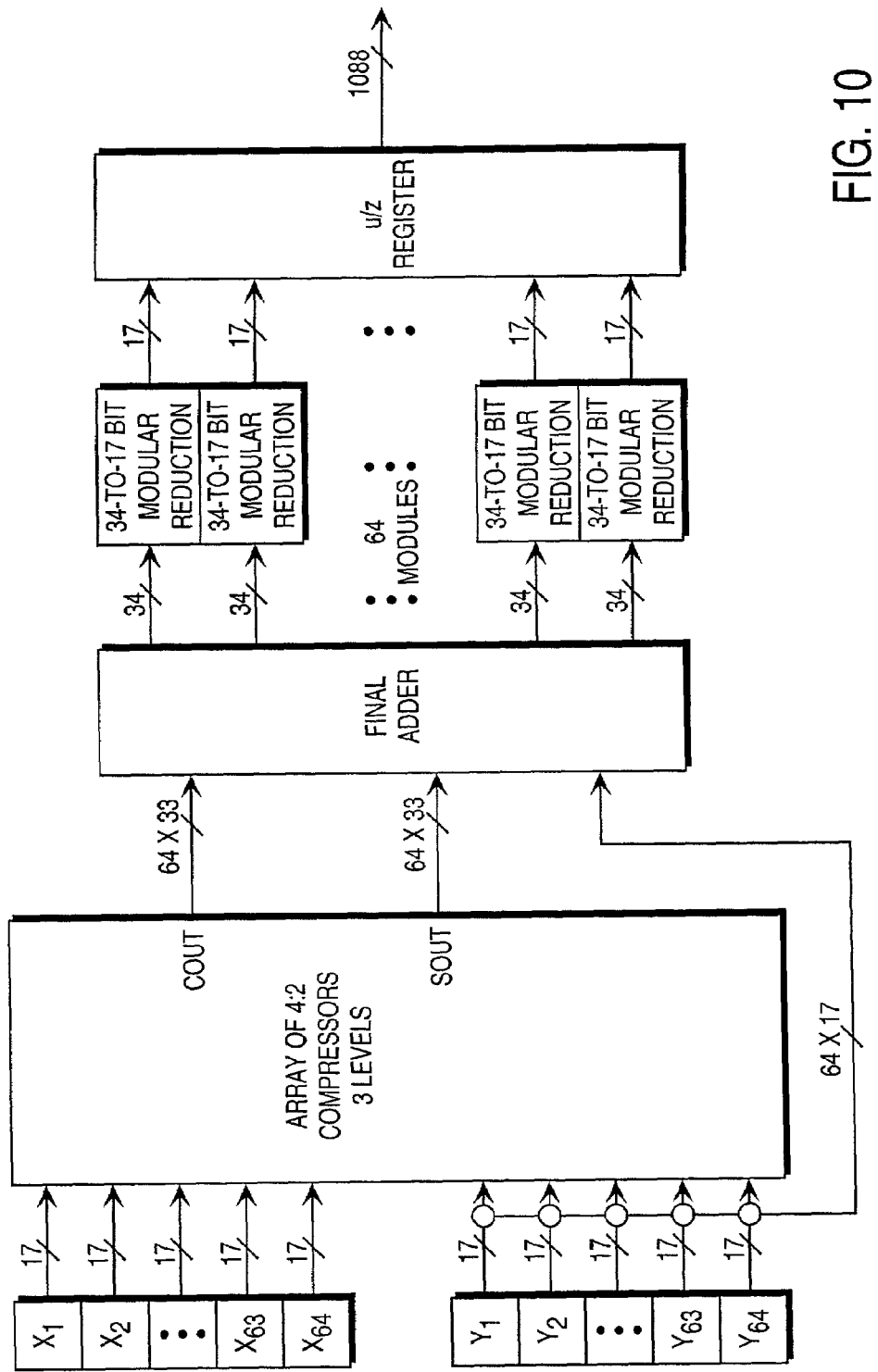
FIG. 10 is a block diagram that depicts a modular multiplier circuit, according to an embodiment.

FIG. 10 is a block diagram that depicts a modular multiplier circuit, according to an embodiment. For example, the modular multiplier circuit may be used for array 910. As shown in FIG. 10, the modular multiplier circuit includes several 34-to-17 bit modular reduction circuits.

FIG. 11 is a block diagram that depicts a modular reduction circuit, according to an embodiment. For example, the modular reduction circuit may be used for array 920 and as the modular multiplier circuit included in the modular multiplier circuit depicted in FIG. 10.

While the example shown in FIGS. 8–11 use 17-bit numbers, 1024-bit operands x and y, arrays of 64 multiplier circuits and modular reduction circuits, and other details as shown, other implementations may differ. For example, 2048 bit operands x and y may be used or 512 bit operands x and y. Numbers of another bit size may be used, and arrays of differing numbers of multiplier circuits and modular reduction circuits may be used.

C. Modular Exponentiation in RNS

According to one embodiment, modular exponentiation in RNS is performed in a loop based on the inputs:

x, y, m, w, v that are all s-bit,
and based on the RNS representations:

$$W = w_1 * w_2 * * * w_{n-1} * w_n$$

$$V = v_1 * v_2 * * * v_{n-1} * v_n,$$

$$x_w = (x_{w1}, \ldots, x_{wn}),$$

$$x_v = (x_{v1}, \ldots, x_{vn}),$$

where
  $gcd(W,V)=1$;
  $gcd(w_i,w_j)=1$, for i !=j;
  $gcd(v_i,v_j)=1$, for i !=j; and
  $w >= 4m$.
to obtain the output:

$$t = x^y (mod\ m)$$

by precomputing the following constant:

$$R = W^2 (mod\ m),$$

and by precomputing the following RNS representations and constants:

$x_{wi}, x_{vi}, m'_{wi}, m'_{vi},$ $w^{-1}_{vi}$ from $w^{-1}_{vi} w = 1\ (mod\ v_i)$ $R_{wi}, R_{vi},$ $N_i^v$ from $N_i^v (W/w_i) = 1\ (mod\ w_i)$ for all i=(1, ... ,n)

$N_i^v$ from $N_i^v (V/v_i) = 1 (mod\ v_i)$ for all i=(1, ... ,n)

$t_w = (1, \ldots, 1), t_v = (1, \ldots, 1)$ based on the following steps:
  (1) $z_{wi} = x_{wi} R_{wi}\ (mod\ w_i)$
      $z_{vi} = x_{vi} R_{vi}\ (mod\ v_i)$
  (2) $u_{wi} = z_{wi} m'_{wi}\ (mod\ w_i)$
  (3) $(u_{v1}, \ldots, u_{vn}) <== (u_{w1}, \ldots, u_{wn})$; RNSbaseW conversion into RNSbaseV
  (4) $r_{vi} = (z_{vi} + u_{vi} m_{vi}) w^{-1}_{vi}\ (mod\ v_i)$
  (5) $(r_{w1}, \ldots, r_{wn}) <== (r_{v1}, \ldots, r_{vn})$; RNSbaseV conversion into RNSbaseW
  (6) for $(y_i = 1$ to s)
      (6.1) if $(y_i = 1)$ then
          (6.1.1) $z_{wi} = t_{wi} r_{wi}\ (mod\ w_i)$
          (6.1.2) $z_{vi} = t_{vi} r_{vi}\ (mod\ v_i)$
          (6.1.3) $u_{wi} = z_{wi} m'_{wi}\ (mod\ w_i)$
          (6.1.4) $(u_{v1}, \ldots, u_{vn}) <== (u_{w1}, \ldots, u_{wn})$; RNS conversion
          (6.1.5) $t_{vi} = (z_{vi} + u_{vi} m_{vi}) w^{-1}_{vi}\ (mod\ v_i)$
          (6.1.6) $(t_{w1}, \ldots, t_{wn}) <== (t_{v1}, \ldots, t_{vn})$; RNS conversion
          endif
      (6.2) $z_{wi} = r_{wi} r_{wi}\ (mod\ w_i)$
      (6.3) $z_{vi} = r_{vi} r_{vi}\ (mod\ v_i)$
      (6.4) $u_{wi} = z_{wi} m'_{wi}\ (mod\ w_i)$
      (6.5) $(u_{v1}, \ldots, u_{vn}) <== (u_{w1}, \ldots, u_{wn})$; RNS conversion
      (6.6) $r_{vi} = (z_{vi} + u_{vi} m_{vi}) w^{-1}_{vi}\ (mod\ v_i)$
      (6.7) $(r_{w1}, \ldots, r_{wn}) <== (r_{v1}, \ldots, r_{vn})$; RNS conversion
      (6.8) Return
  (7) Compute $t_w\ (mod\ w) = x^y\ (mod\ m)$.

Figure 12A:
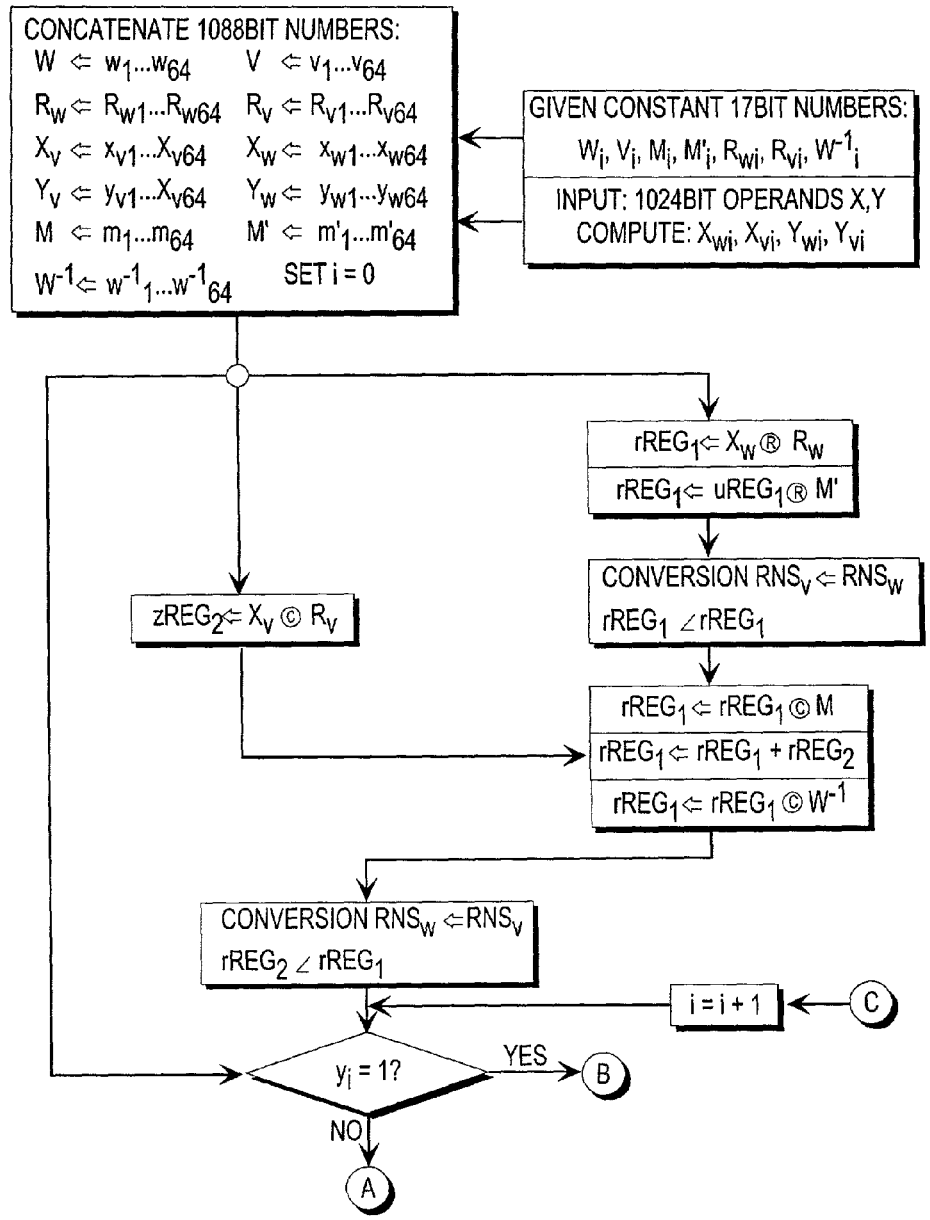
FIGS. 12A–12B are a flow diagram that depicts the control flow for modular exponentiation in RNS, according to an embodiment.
Figure 12B:
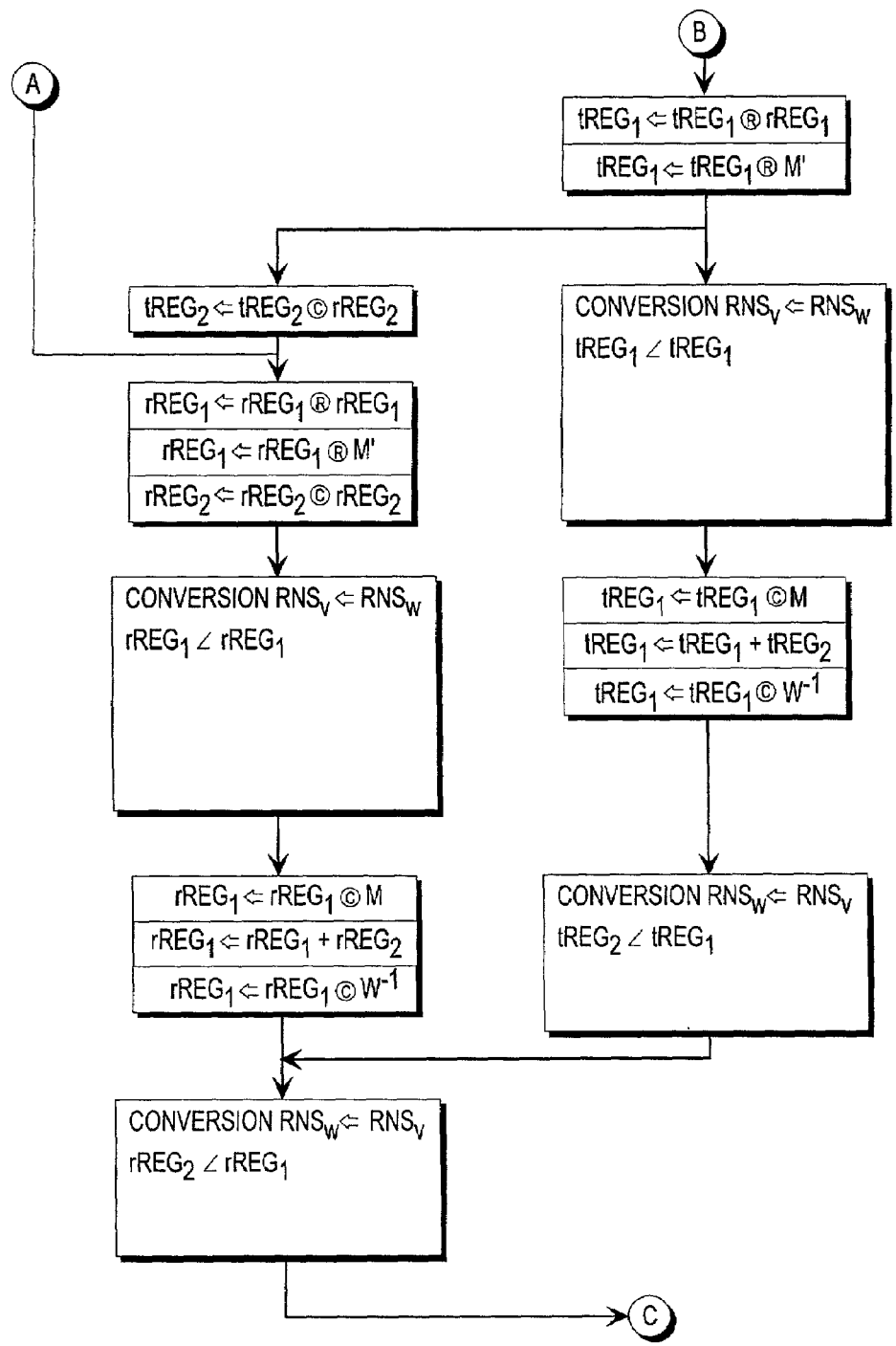

FIGS. 12A–12B are a flow diagram that depicts the control flow for modular multiplication in RNS, according to an embodiment. In FIG. 12, rectangular blocks on the same horizontal level overlap execution times.

Figure 13:
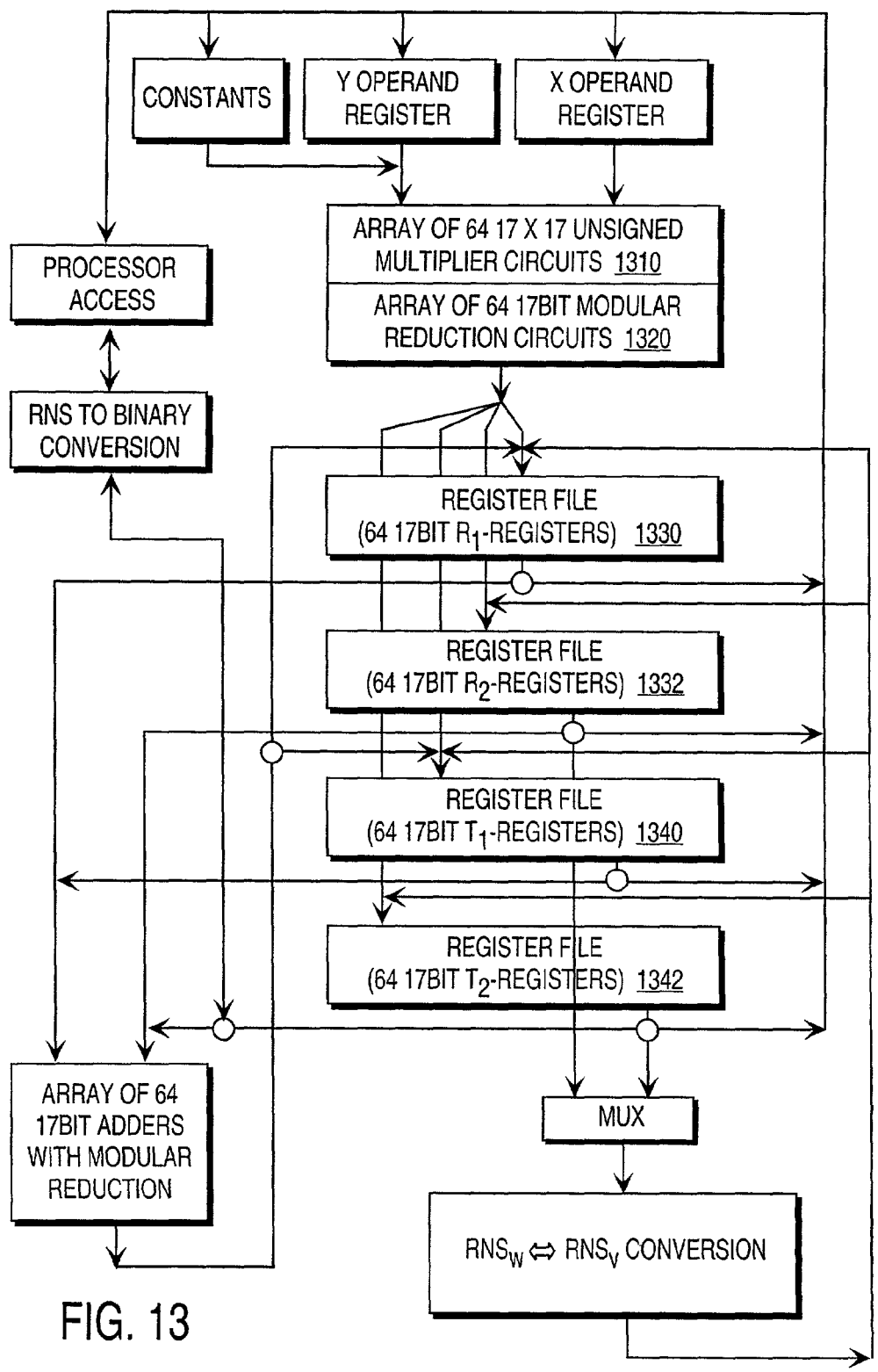
FIG. 13 is a flow diagram that depicts the data flow for modular exponentiation in RNS, according to an embodiment.

FIG. 13 is a flow diagram that depicts the data flow for modular multiplication in RNS, according to an embodiment. FIG. 13 includes an array 1310 that has 64 17×17 multiplier circuits, an array 1320 that has 64 17-bit modular reduction circuits, a register file 1330 that has 64 17-bit r1-registers, a register file 1332 that has 64 17-bit r2-registers, a register file 1340 that has 64 17-bit t1-registers, and a register file 1342 that has 64 17-bit t2-registers.

The modular multiplier circuit depicted in FIG. 10 may be used for array 1310. The modular reduction circuit depicted in FIG. 11 may be used for array 1320.

While the example shown in FIGS. 10–13 use 17-bit numbers, 1024-bit operands x and y, arrays of 64 multiplier circuits and modular reduction circuits, and other details as shown, other implementations may differ. For example, 2048 bit operands x and y may be used or 512 bit operands x and y. Numbers of another bit size may be used, and arrays of differing numbers of multiplier circuits and modular reduction circuits may be used.

D. RNS Base Extension and Conversion from One RNS Base to Another RNS Base

Given an RNS base V:

$$V = v_1 * v_2 * * * v_{n-1} * v_n,$$

and an RNS representation of a s-bit binary number r in base V:

$$r_v = (r_{v1}, \ldots, r_{vn}),$$

the goal of the conversion from the first RNS base V to a second RNS base W:

$$W = w_1 * w_2 * * * w_{n-1} * w_n$$

is the s-bit binary number r in base W:

$$r_w = (r_{w1}, \ldots, r_{wn}).$$

The bases W and V have the following properties:
$gcd(W,V) = 1$,
$gcd(w_i, w_j) = 1$ for all i !=j, and
$gcd(v_i, v_j) = 1$, for all i !=j.
According to the CRT, $r_v$ can be written as:

$$r_v = (c_{v1} * r_{v1} + \ldots + c_{vn} * r_{vn})(mod\ V)$$

where $c_{vi}$ can be computed according to:

$$c_{vi} = (V/v_i) N_i^v.$$

The constant $N_i^v$ is computed according to:

$$N_i^v (V/v_i) = 1 (mod\ v_i).$$

It can be proven that, for a given number of bits of $r_v$ and V in binary representation, the expression:

$$int[(c_{v1} * r_{v1} + \ldots + c_{vn} * r_{vn})/V]$$

produces a binary number with an upper bound with respect to size (number of bits in binary representation). This upper bound is equal to sum of the number of bits of the largest modulus $v_i$ and the log of the number of moduli in given $RNS_n$.

Proof: Since $r_{vi} < v_i => (c_{v1} * r_{v1} + \ldots c_{vn} * r_{vn}) < (c_{v1} * v_1 + \ldots c_{vn} * v_n)$. From this, since $c_{vi} = (V/v_i) N_i^v, (c_{v1} * v_1 + \ldots + c_{vn} * v_n) < V(N_1^v + \ldots + N_n^v)$. On the other hand $N_i^v < v_i$, and $V(N_1^v + \ldots + N_n^v) < V(v_1 + \ldots + v_n)$. From this we finally obtain $(c_{v1} * r_{v1} + \ldots + c_{vn} * r_{vn})/V < (v_1 + \ldots + v_n)$. The value $(v_1 + \ldots + v_n)$ has a bound in size (number of bits in binary representation) equal to the sum of bits in the largest $v_i$ and $log(n)$#.

For example, in case of 16 bit moduli and $RNS_{64}$, we have a maximum of 22 bits in:

$$int[(c_{v1}*r_{v1}+ \ldots +c_{vn}*r_{v64})V].$$

The conversion of r from RNS base V to RNS base W can be expressed as:

$$(r_{w1}, \ldots, r_{wn}) \Leftarrow (r_{v1}, \ldots, r_{vn}).$$

In order to perform the conversion of r from base V to base W, in principle, we need to compute:

$$r_v = (c_{v1}*r_{v1}+ \ldots +c_{vn}*r_{vn}) - V*int[(c_{v1}*r_{v1}+ \ldots +c_{vn}*r_{vn})/V],$$

and then perform a set of reductions:

$$r_{wi} = r_v (mod\ w_i),\ for\ i=1, \ldots, n.$$

For conversions between two bases in each direction:

$$(r_{w1}, \ldots, r_{wn}) \Leftarrow (r_{v1}, \ldots, r_{vn}),\ and$$

$$(r_{v1}, \ldots, r_{vn}) \Leftarrow (r_{w1}, \ldots, r_{wn}),$$

compute:

$$r_{wj} = r_v (mod\ w_j)$$

$$r_{wj} = (c_{v1}*r_{v1}+ \ldots +c_{vn}*r_{vn})(mod\ w_j) - (V*a_v)(mod\ w_j);\ j=1, \ldots, n$$

and $$r_{vj} = r_v (mod\ v_j)$$

$$r_{vj} = (c_{w1}*r_{w1}+ \ldots +c_{wn}*r_{wn})(mod\ v_j) - (W*a_w)(mod\ v_j);\ j=1, \ldots, n$$

where $$a_v = int[(c_{v1}*r_{v1}+ \ldots +c_{vn}*r_{vn})/V]$$
$$a_w = int[(c_{w1}*r_{w1}+ \ldots +c_{wn}*r_{wn})/W].$$

The expressions:

$$d_{wj} = (V*a_v)(mod\ w_j)$$

$$d_{wj} = ((V(mod\ w_j))*(a_v(mod\ w_j)))(mod\ w_j),\ for\ j=1, \ldots, n$$

and $$d_{vj} = (W*a_w)(mod\ v_j)$$

$$d_{vj} = ((W(mod\ v_j))*(a_w(mod\ v_j)))(mod\ v_j),\ for\ j=1, \ldots, n$$

have constant multipliers:

$V(mod\ w_j)$ and $W(mod\ v_j)$ and can be precomputed and stored.
The expressions $a_v\ (mod\ w_j)$ and $a_w (mod\ v_j)$ require n modular reductions on binary numbers $a_v$ and $a_w$. These modular reductions may be done on separate hardware as described below, and in parallel with evaluations of the rest of expressions for $r_{wj}$, $r_{vj}$.

With the computed pair $(d_{wj}, d_{vj})$ the expressions for $r_{wj}$, $r_{vj}$ take the following form:

$$r_{wj} = (c_{v1}(mod\ w_j)*r_{v1}+ \ldots +c_{vn}(mod\ w_j)*r_{vn})(mod\ w_j) - d_{wj};\ j=1, \ldots, n.$$

$$r_{vj} = (c_{w1}(mod\ v_j)*r_{w1}+ \ldots +c_{wn}(mod\ v_j)*r_{wn})(mod\ v_j) - d_{vj};\ j=1, \ldots, n.$$

The constants $e_{ij}$, either:

$$e_{ij} = c_{vi}(mod\ w_j),\ i=1, \ldots, n;\ j=1, \ldots, n\ and$$

$$e_{ij} = c_{wi}(mod\ v_j),\ i=1, \ldots, n;\ j=1, \ldots, n;$$

can also be precomputed. They form two matrices of size n×n. An example of such a matrix is shown in the equation below.

$$\begin{bmatrix} r_{w_1} \\ r_{w_2} \\ \emptyset \\ \emptyset \\ \emptyset \\ r_{w_{n-1}} \\ r_{w_n} \end{bmatrix} = [mod\ w_1\ \ldots\ mod\ w_n] \begin{bmatrix} e_{11} & e_{21} & \ldots & e_{(n-1)1} & e_{n1} \\ e_{12} & e_{22} & \ldots & e_{(n-1)2} & e_{n2} \\ \emptyset & \emptyset & \ldots & \emptyset & \emptyset \\ \emptyset & \emptyset & \ldots & \emptyset & \emptyset \\ \emptyset & \emptyset & \ldots & \emptyset & \emptyset \\ e_{1(n-1)} & e_{2(n-1)} & \ldots & e_{(n-1)(n-1)} & e_{n(n-1)} \\ e_{1n} & e_{2n} & \ldots & e_{(n-1)n} & e_{nn} \end{bmatrix} \begin{bmatrix} r_{v_1} \\ r_{v_2} \\ \emptyset \\ \emptyset \\ \emptyset \\ r_{v_{n-1}} \\ r_{v_n} \end{bmatrix} - \begin{bmatrix} d_{w_1} \\ d_{w_2} \\ \emptyset \\ \emptyset \\ \emptyset \\ d_{w_{n-1}} \\ d_{w_n} \end{bmatrix}$$

The method described above, with $RNS_{64}$, requires 4096 unpartitioned LUTs for $RNS_v \rightarrow RNS_w$ and another 4096 unpartitioned LUTs of the same size for $RNS_w \rightarrow RNS_v$ conversion. The LUTs can be made smaller by partitioning the address space into 4 (4bit and 5bit) spaces and then performing 4 partial product additions. For this case the LUTs are of size 16×17 and 32×17 bits and would grow in number to 4×4096=16K for one direction conversion. The total size of LUTs is (16K+16K)*32Bytes=512KB+512KB=1MBytes of ROM.

Figure 14:
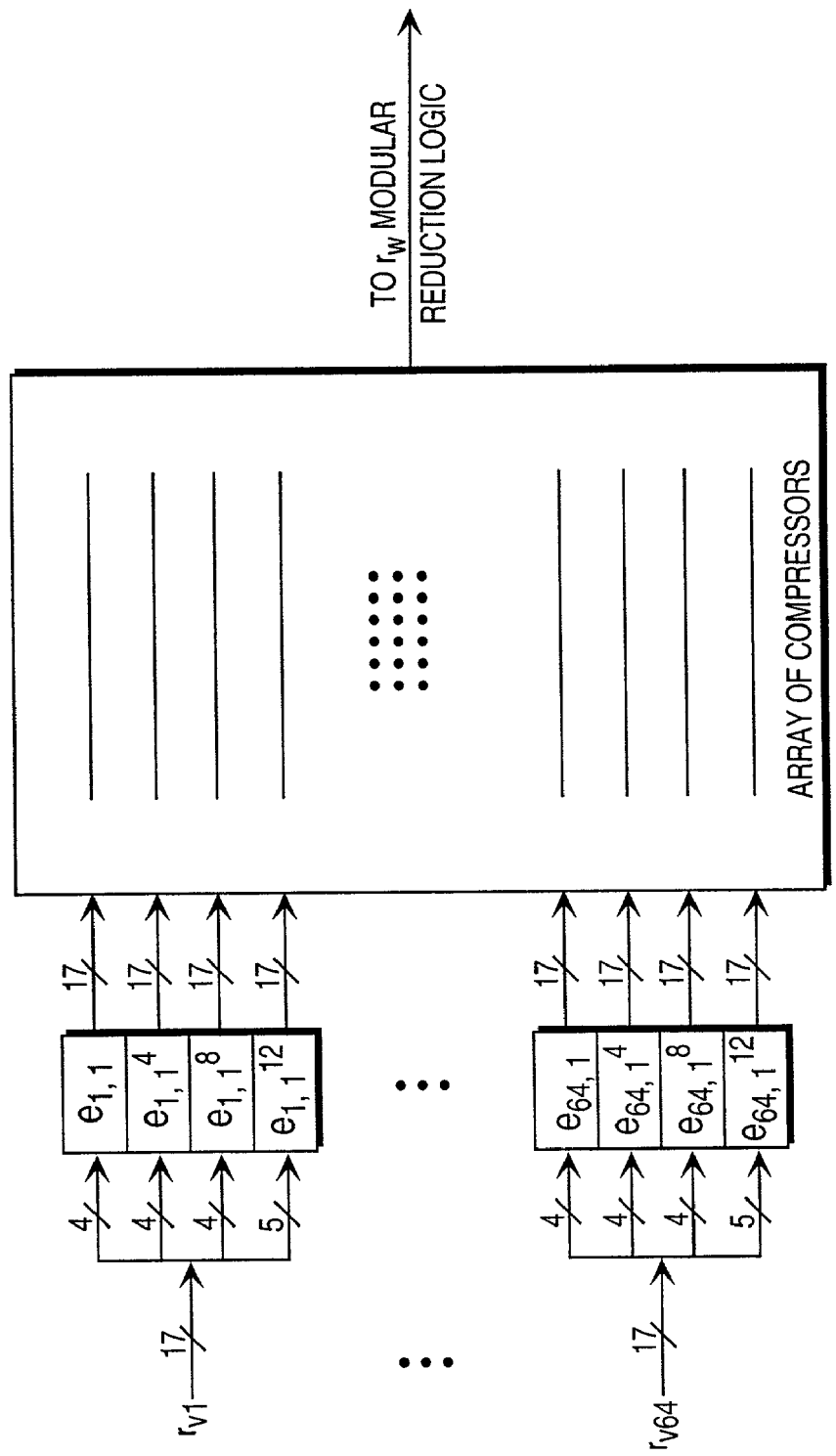
FIG. 14 is a diagram of a single raw architecture for RNS base conversion, according to an embodiment.

FIG. 14 is a diagram of a single raw architecture for RNS base conversion, according to an embodiment. The structure shown in FIG. 14 follows from the matrix equation above.

Figure 15:
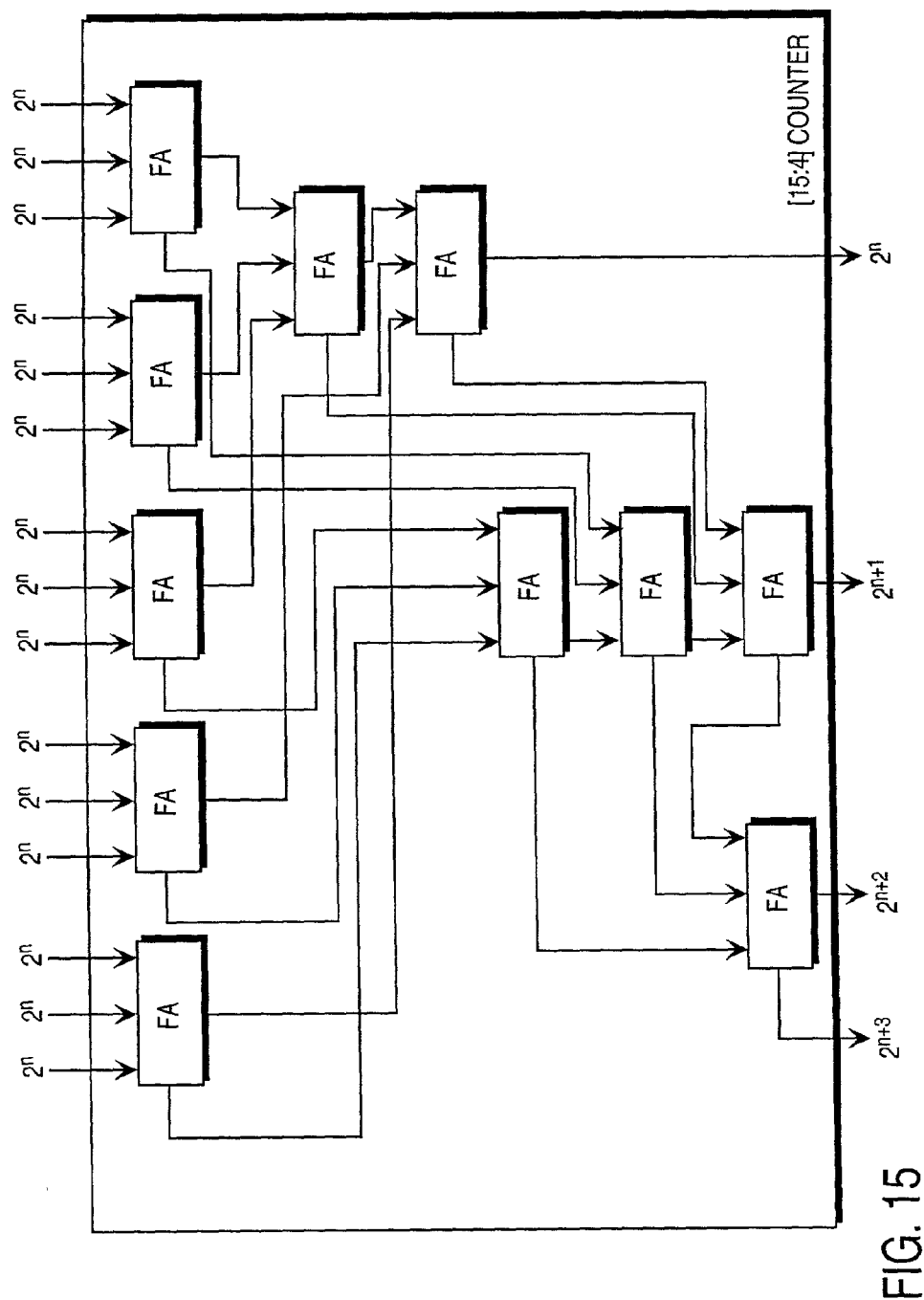
FIG. 15 is a diagram that depicts an example of a counter/compressor structure.
Figure 16:
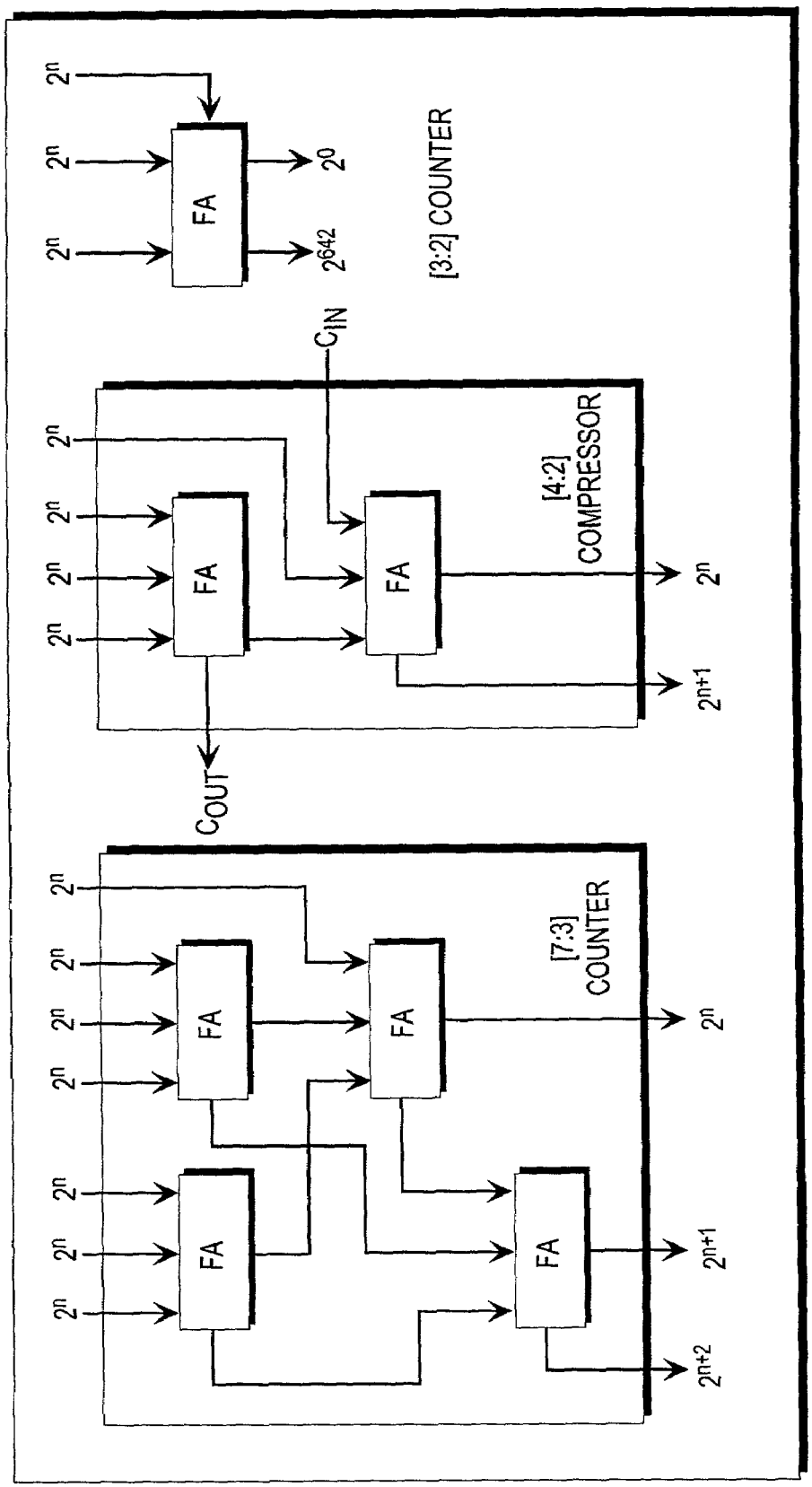
FIG. 16 is a diagram that depicts another example of a counter/compressor structure.
Figure 17:
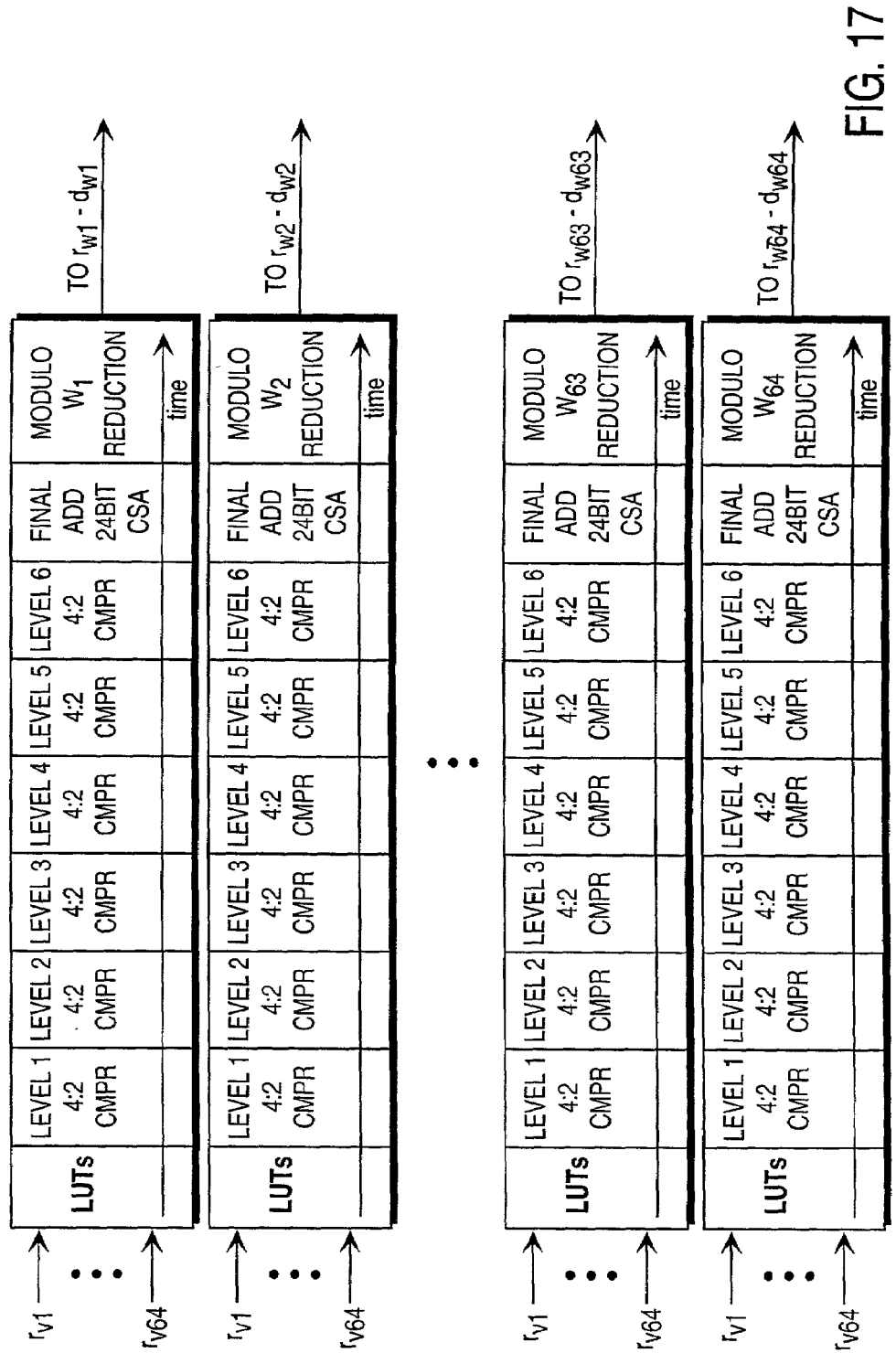
FIG. 17 is a diagram that depicts an array structure that uses only 4:2 compressors, according to an embodiment.

FIGS. 15 and 16 are diagrams that depict examples of counter/compressor structures.

The method described above, with $RNS_{64}$, requires 4096 unpartitioned LUTs for $RNS_v\to RNS_w$ and another 4096 unpartitioned LUTs of the same size for $RNS_w\to RNS_v$ conversion. The LUTs can be made smaller by partitioning the address space into 4 (4bit and 5bit) spaces and then performing 4 partial product additions. For this case the LUTs are of size 16×17 and 32×17 bits and would grow in number to 4×4096=16K for one direction conversion. The total size of LUTs is (16K+16K)*32Bytes=512KB+512KB=1MBytes of ROM.

Figure 19:
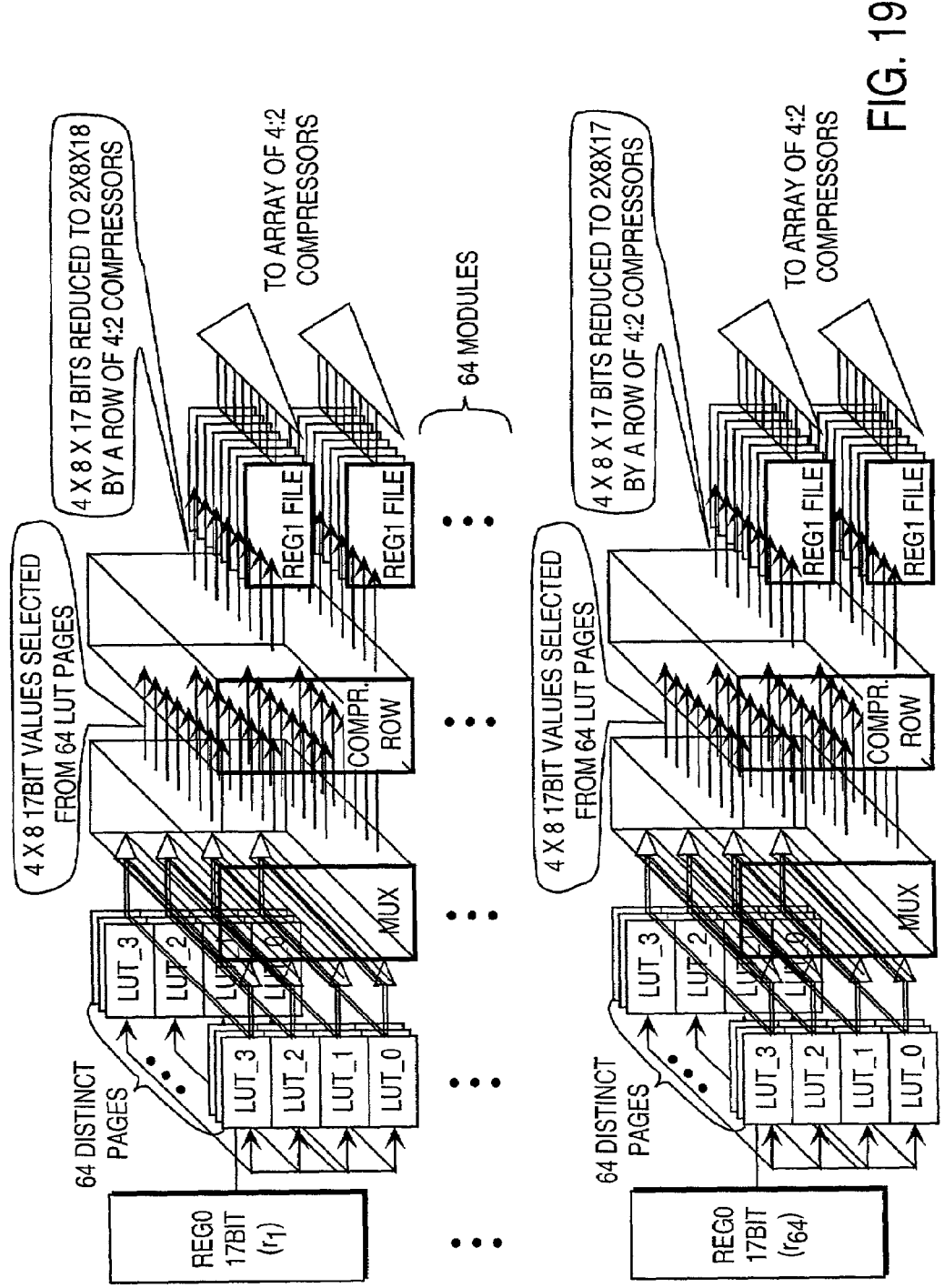
FIG. 19 is a diagram of an RNS conversion pipeline that provides input to an array of 4:2 compressors, according to an embodiment.

FIG. 19 is a diagram of an RNS conversion pipeline that provides input to an array of 4:2 compressors, according to an embodiment.

Figure 20B:
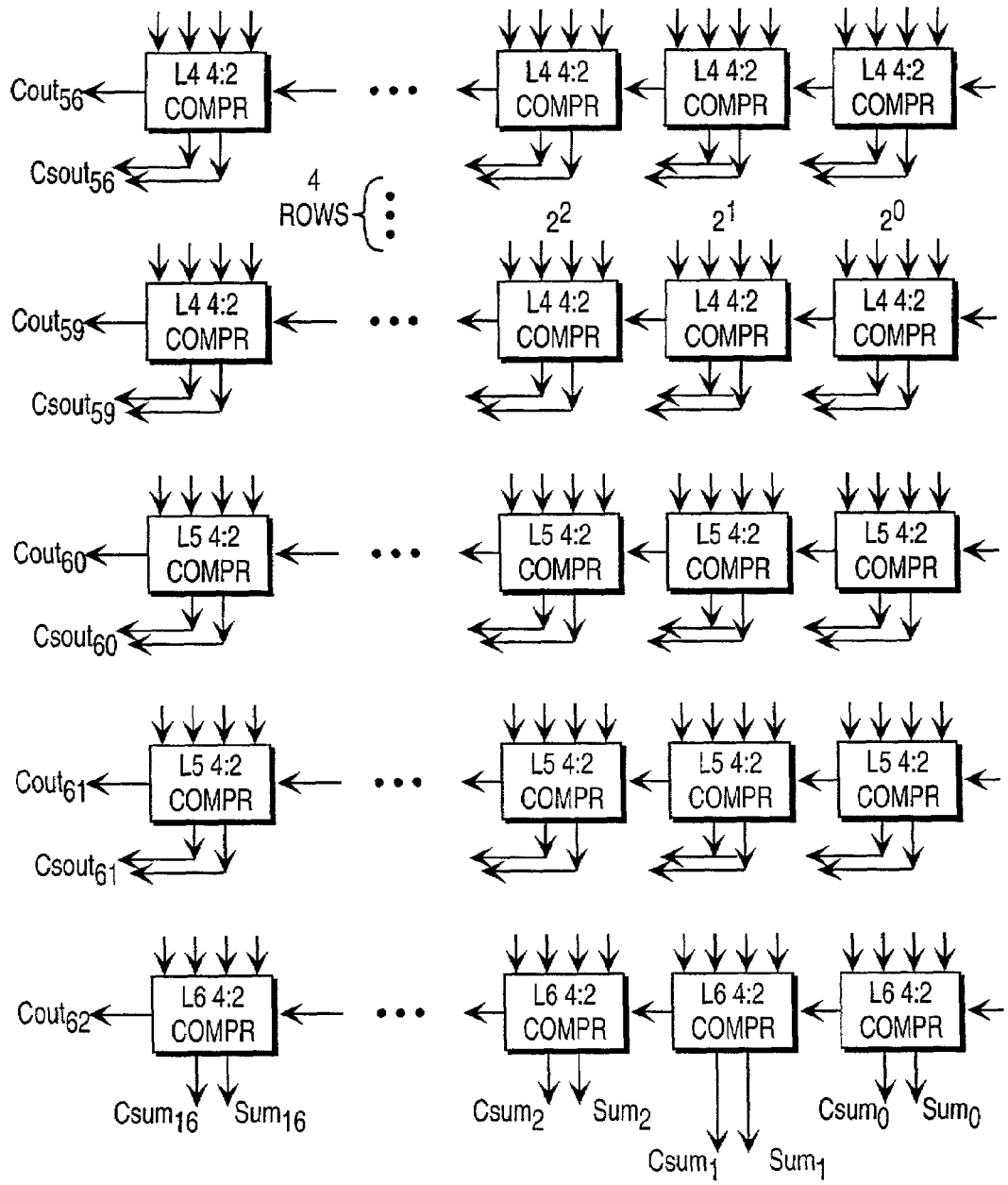

FIGS. 20A–20B are a diagram of an array of 6 levels of 4:2 compressors organized into six levels, according to an embodiment.

Figure 21:
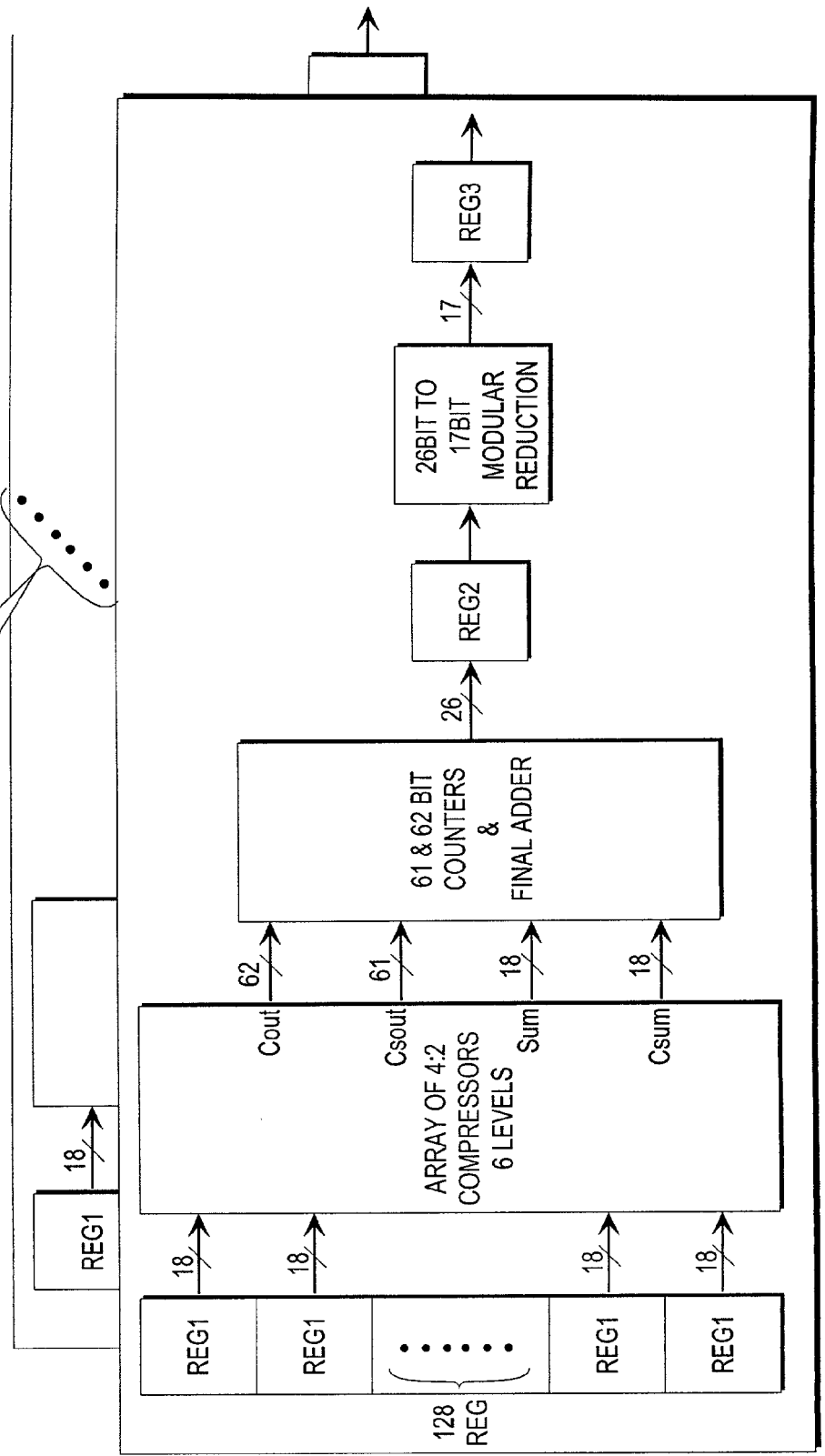
FIG. 21 is a diagram of eight planes of pipelined hardware for simultaneous execution, according to an embodiment.

FIG. 21 is a diagram of eight planes of pipelined hardware for simultaneous execution, according to an embodiment.

Figure 22A:
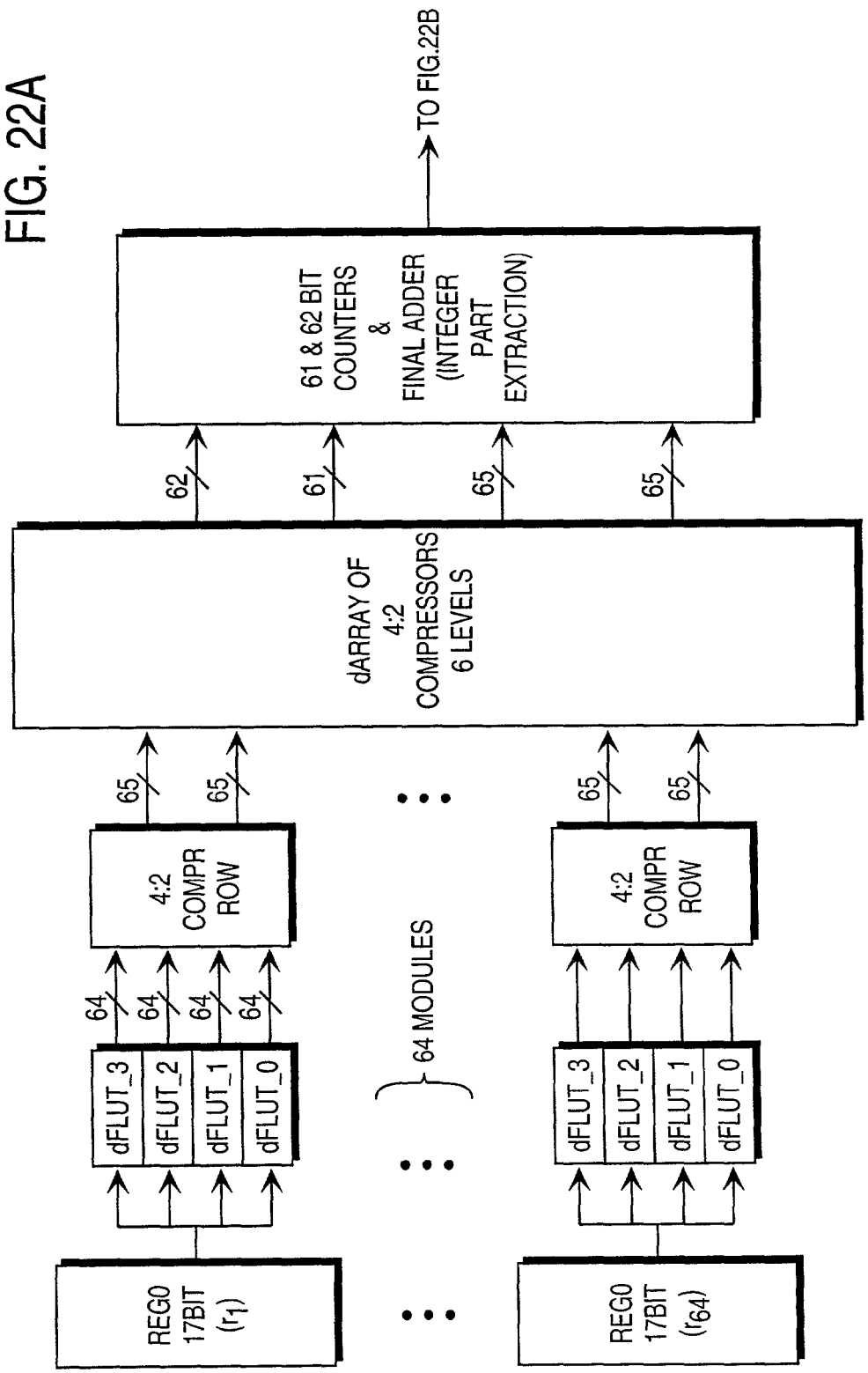
FIGS. 22A–22B are a diagram of vector $d_{w/v}$ computations, according to an embodiment.
Figure 22B:
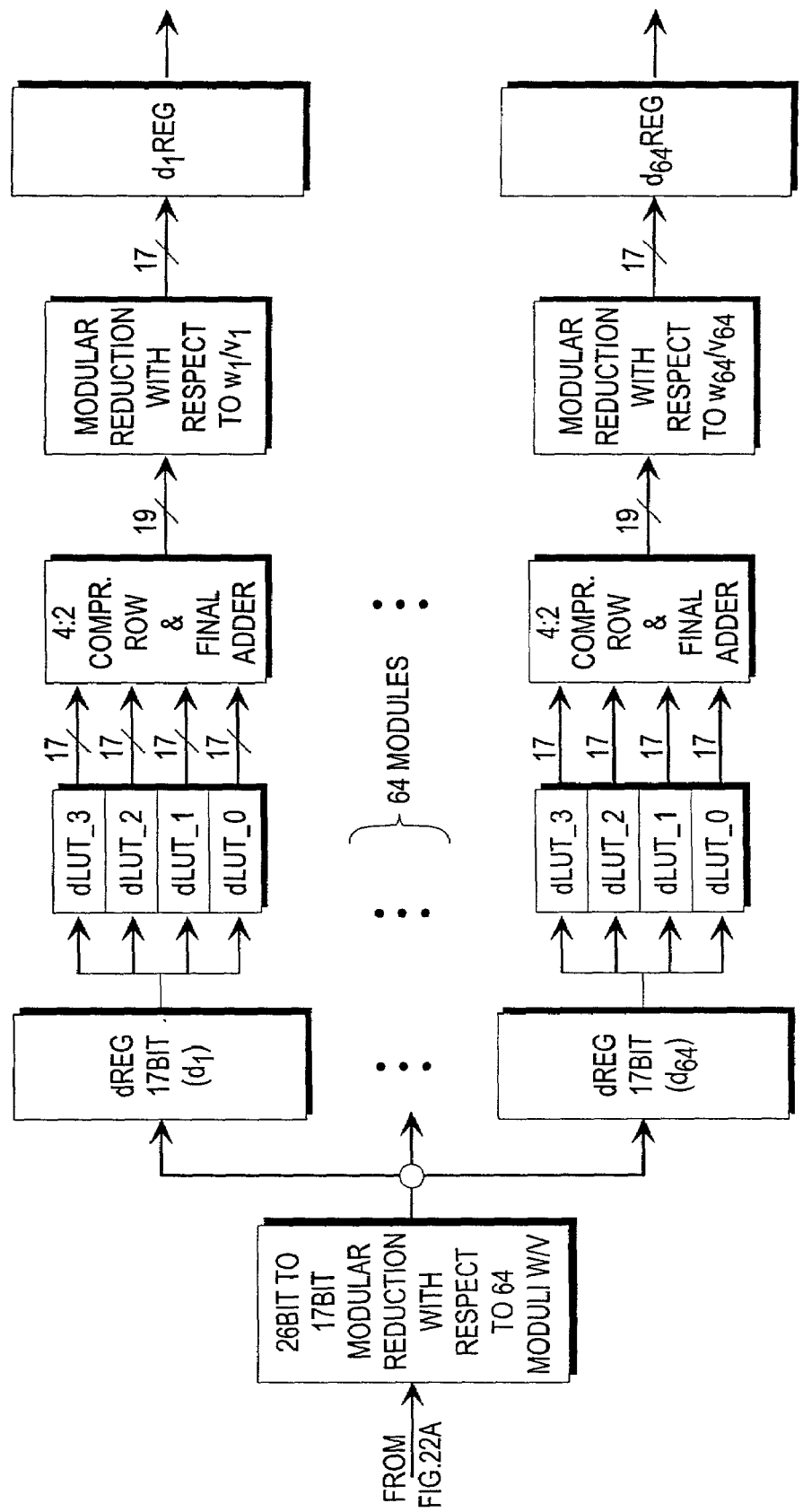

FIGS. 22A–22B are a diagram of vector $d_{w/v}$ computations, according to an embodiment.

Gate count estimate for the $RNS_{v64}\Leftrightarrow RNS_{w64}$ conversions are determined as follows:

~512KB+~512KB of LUTs (ROM).

Or 1M of 4-to-17 decoders, whatever is smaller.

6 levels of 4:2 compressors×17 bit positions=256×17 FAs=~20K gates.

Final Add+Modulo Reduction: ~1K gates.

The $d_{wi}$ and $r_{wi}-d_{wi}$ calculations: ~1K gates.

Total gate count for this module: 22K×8=176K gates.

XII. Modular Reduction for RNS Conversions

According to one embodiment, the expected operand size, out of the array of compressors, is 24 bits. However, the approach described herein is valid for an arbirtrary number of bits, and can be used for 34 bit reductions in the main exponentiation loop.

The partitioning of an operand, r, may be expressed as:

$$r(\bmod\ m)=(A+B2^{16}+C2^{17}+D2^{22})(\bmod\ m)$$

where m is the modulus that satisfies $$2^{16}<m<2^{17}\ \text{and}$$

where A is a 16 bit value, B is single bit value, C is a 5 bit value, and D is a 2 bit value or a 12 bit value.

The modulus m can be written as:

$$m=2^{17}-g$$

where g can take on any value between 1 and $2^{16}$. For example, assume that g is selected be an 11 bit number:

$$1<g<2^{11}.$$

Since:

$$2^{17}=m+g$$

then:

$$r(\bmod\ m)=(A+B2^{16}+C(m+g)+D2^{22})(\bmod\ m)$$

$$r(\bmod\ m)=(A+B2^{16}+Cg+D2^{22})(\bmod\ m)$$

$$r(\bmod\ m)=(A+Cg+B2^{16}+D2^{22})(\bmod\ m).$$

Since it can be shown that $$A+Cg<m$$

the above expression reduces to evaluating $$(B2^{16}+D2^{22})(\bmod\ m)=(B2^{16}+D((2^{22})(\bmod\ m)))(\bmod\ m.)$$

A simple combinatorial circuit can be used to evaluate this expression. The expression $A+Cg$ requires a 5×11 bit multiplier and a 16 bit adder.

XII. Modular Reduction for Modular Exponentiation Loop

According to one embodiment, the modular reductions (mod $w_i$) and (mod $v_i$) are performed on the structure described above, except that the D is of size 12 bits.

The expected operand size, out of the array of multipliers, is 34 bits. As above, the operand r can be partitioned according to FIG. 18 as:

$$z(\bmod\ m)=(A+B2^{16}+C2^{17}+D2^{22})(\bmod\ m)$$

where m is the modulus that satisfies $$2^{16}<m<2^{17}$$

and where A is a 16 bit value, B is single bit value, C is a 5 bit value, and D is a 12 bit value.

As above, modulus m can be written as:

$$m=2^{17}-g$$

where g can take on any value between 1 and $2^{16}$. For example, assume that g is selected to be an 11 bit number:

$$1<g<2^{11}.$$

Since:

$$2^{17}=m+g$$

then:

$$z(\bmod\ m)=(A+Cg+B2^{16}+D2^{22})(\bmod\ m).$$

Since it can be shown that $A+Cg<m$, the above expression reduces to evaluating:

$$(B2^{16}+D2^{22})(\bmod\ m)=(B2^{16}+D((2^{22})(\bmod\ m)))(\bmod\ m)$$

Again, a combinatorial circuit can be used to evaluate this expression. The expression $A+Cg$ requires a 5×11 bit multiplier and a 16 bit adder.

XIII. Final Binary Result Computation

The final binary result computation is the final step in the modular exponentiation approach (i.e., the RNS representation to binary representation conversion).

Given an RNS representation of a s-bit binary number t:

$$t_w=(t_{w1},\ldots,t_{wn})$$

in base W:

$$W=w_1 * w_2 * * * w_{n-1} * w_n,$$

the goal is to compute the binary representation of $t_w$. According to the CRT $t_w$ can be written as:

$$t_w=(c_{w1} * t_{w1}+\ldots+c_{wn} * t_{wn})(\bmod\ W),$$

where $c_{wi}$ can be computed according to:

$$c_{wi}=(W/w_i)N_i^w.$$

The $N_i^w$ is computed according to:

$$N_i^w(W/w_i) = 1 (mod\ w_i).$$

To obtain:

$$t_w(mod\ W)$$

compute:

$$t_w = (c_{w1}*t_{w1} + \ldots + c_{wn}*t_{wn}) - W*int[(c_{w1}*t_{w1} + \ldots + c_{wn}*t_{wn})/w],$$

For $RNS_{64}$, the expression $$a = int[(c_{w1}*t_{w1} + \ldots + c_{wn}*t_{wn})/W]$$

is computed from:

$$a = int[(N_1^w/w_1)t_{w1} + \ldots + (N_{64}^w/w_{64})t_{w64}].$$

This computation may be performed on an array of integer/fractional multiply-add structures (with constant multiplicand) described before in the context of $RNS_v \Leftrightarrow RNS_w$ conversions. The existing structure can be re-used.

The expression:

$$(W*a)$$

is evaluated on a constant-multiplicand multiplier of size 1024×22, again in a mixed form structure, lookup tables and partial product adders.

The expression:

$$b = (c_{w1}*t_{w1} + \ldots + c_{w64}*t_{w64})$$

is evaluated in parallel/series on a structure that represents a combination of lookup tables and constant-multiplicand multiplier of size 1024×17. This expression can also be evaluated, in microcode, on the RMC core.

The three operations for computing a, (w*a) and b, are performed over multiple clock cycles. Since this RNS representation to binary representation conversion is done only once, at the end of modular exponentiation computation, the use of multiple clock cycles does not affect the overall throughput.

As before, for infrequent occasions, when the evaluation of a fails, a hardware module for precise, direct evaluation of b/w is engaged.

Figure 18:
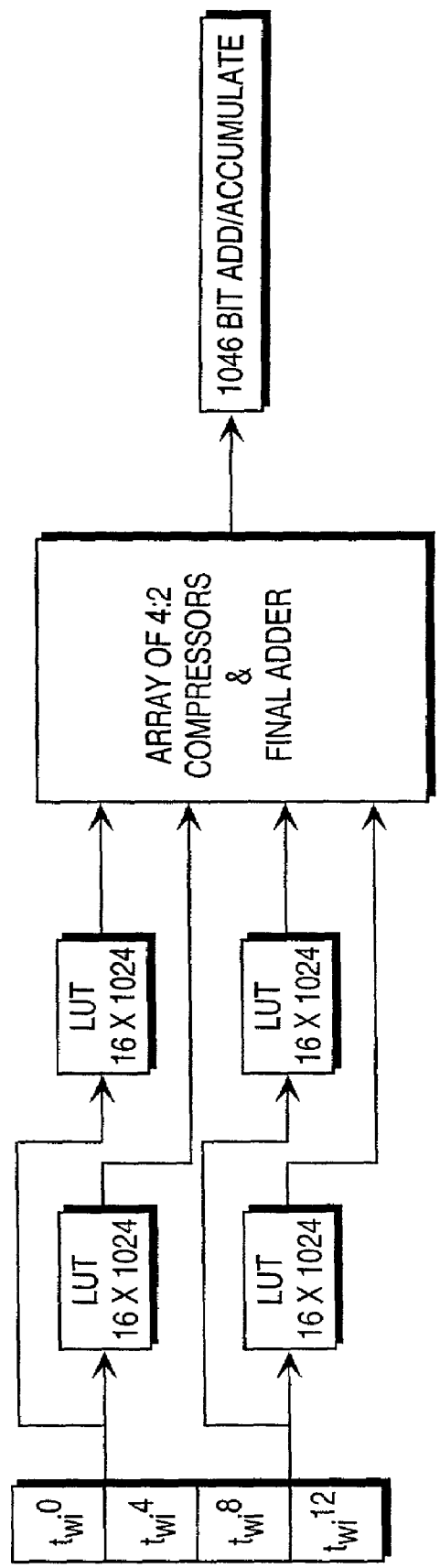
FIG. 18 is a diagram that depicts an implementation of RNS to binary conversion, according to an embodiment.

FIG. 18 is a diagram that depicts an implementation of RNS to binary conversion, according to an embodiment. FIG. 18 depicts the implementation of $c_{wi}*t_{wi}$ multiplication with a combination of LUTs and an array of 4:2 compressors. The final adder and the accumulator can be made as fast as necessary, and the total gate count depends on such implementation. One estimate is ~30K gates are used. The accumulation is performed 64 times in a loop. Total ROM memory required is 512KB.

A hardware size estimate for the $RNS_{64}$-to-Binary conversion module is as follows:
"a" value calculation unit: the existing module reused;
(W*a) value calculation unit-->5 LUTs+reused adders from the above circuit-b value calculation;
"b" value calculation unit-->512KB LUTs+~30K gates; and
estimated gate count for the correction unit-->20K gates.
The total equivalent NAND-gate count estimate for the $RNS_{64}$-to-binary conversion is ~50K gates and ~524KB LUTs (or equivalent decoders).

XIV. Additional Architectural Considerations

The 64 moduli $w_i$ and $v_i$ (not necessarily prime) are selected as follows;

$$W = w_1*w_2***w_{63}*w_{64}, and$$

$$V = v_1*v_2***v_{63}*v_{64}$$

such that
gcd(W,V)=1,
gcd($w_i,w_j$)=1, for all i !=j, and
gcd($v_i,v_j$)=1, for all i !=j.
One example of the set of $w_i$ and $v_i$ in the range $$2^{16} < w_i, v_i < 2^{17}$$

is given in Table 1, wherein the first 64 values are for one base and the second 64 values are for the second base.

TABLE 1

| | | | | | | | | | |
|---|---|---|---|---|---|---|---|---|---|
| 129527 | 129529 | 129533 | 129539 | 129553 | 129581 | 129587 | 129589 | 129593 | 129607 |
| 129629 | 129631 | 129641 | 129643 | 129671 | 129707 | 129719 | 129733 | 129737 | 129749 |
| 129757 | 129763 | 129769 | 129793 | 129803 | 129841 | 129853 | 129887 | 129893 | 129901 |
| 129917 | 129919 | 129937 | 129953 | 129959 | 129967 | 129971 | 130003 | 130021 | 130027 |
| 130043 | 130051 | 130057 | 130069 | 130073 | 130079 | 130087 | 130099 | 130121 | 130127 |
| 130147 | 130171 | 130183 | 130199 | 130201 | 130211 | 130223 | 130241 | 130253 | 130259 |
| 130261 | 130267 | 130279 | 130303 | 130307 | 130337 | 130343 | 130349 | 130363 | 130367 |
| 130369 | 130379 | 130399 | 130409 | 130411 | 130423 | 130439 | 130447 | 130457 | 130469 |
| 130477 | 130483 | 130489 | 130513 | 130517 | 130523 | 130531 | 130547 | 130553 | 130579 |
| 130589 | 130619 | 130621 | 130631 | 130633 | 130639 | 130643 | 130649 | 130651 | 130657 |
| 130681 | 130687 | 130693 | 130699 | 130729 | 130769 | 130783 | 130787 | 130807 | 130811 |
| 130817 | 130829 | 130841 | 130843 | 130859 | 130873 | 130927 | 130957 | 130969 | 130973 |
| 130981 | 130987 | 131009 | 131011 | 131023 | 131041 | 131059 | 131063 | | |

Assume that the modulus m is a large number of 2048 bits in radix 2 weighted number representation. Therefore, modulo m in encryption protocol computations, such as RSA, is a product of two large primes, p and q: m=pq. According to the CRT all modulo computations can be performed separately, relative to p,q (for selected maximum key size of 2048, p and q are both 1024 bit, radix 2, numbers), and then the final result is recombined. As a result, the modular arithmetic is built around two identical 1024 bit ALUs. Thus the RNS decompositions are performed on 1024 bit numbers.

According to one embodiment, RNS multiplications are performed in parallel on 17 bit operands for all non-constant multiplications. Two independent arrays of multipliers, for 17×17 bit integer multiplication and 17×32 bit (constant multiplicand) fractional multiplication, form the multiplier complex with estimated gate count of 300K gates.

In addition to the multiplier array for RNS conversion, an array of 63~18 bit adders is created that produces the array multiplier final sum. Similar configuration of adders is formed for the array of fractional multipliers. Total allocation of gates for two adder arrays is ~20K gates.

The modular reduction of 34 bit operands is handled on the array of 64 modular reduction circuits as presented above.

The exceptional case, when the result of fractional operations is too close to an integer, is handled either by the RMC processor core or by specialized hardware that will compute precise quotient. The additional hardware unit for this function can be based on the exact modulus determination of CRT recombined numbers. It will be operating on different time schedule (be considerable slower that regular RNS conversion).

The estimate of the total gate count for a single 1024 bit ALU is ~450K gates of random logic. This number needs to be doubled, to ~900K gates (including the exception hendling hardware) for two ALUs running in parallel to produce 2048 bit results.

Based on the above description of this particular implementation the following will provide time estimate for the most critical operations in an RSA decryption implementation using modular exponentiation on 2048 bit operands (both base and exponent), according to an embodiment.

For the timing estimate purposes consider the approach above for modular exponentiation with particular architectural and design data.

Since m=pq, for p,q prime each 1024 bit in radix 2 representation, modular exponentiation is performed based on either p or q by using 1024 bit arithmetic.

The x,y in radix 2 representation are:

$$x=(x_1, \ldots, x_{1024}),$$

$$y=(y_1, \ldots, y_{1024}).$$

Assume that the operand x is represented in two RNS bases, W and V, with 64 residues, $RNS_{64}$. Therefore, the two RNS representations of x are:

$$x_w=(x_{w1}, \ldots, x_{w64}), \text{ and}$$

$$x_v=(x_{v1}, \ldots, x_{v64}).$$

In $RNS_{64}$ all precomputed constants are 17 bit. Moduli $w_i$ and $v_i$ are determined to be 17 bit numbers.

The timing analysis of one embodiment, including time overlap, is as follows:

| | |
|---|---|
| 3 clks | (1) $z_{wi} = x_{wi}R_{wi}(\text{mod } w_i); z_{vi} = x_{vi}R_{vi}(\text{mod } v_i)$ |
| 3 clks | (2) $u_{wi} = z_{wi}m'_{wi}(\text{mod } w_i)$ |
| 10 clks | (3) $(u_{vi}, \ldots, u_{vn}) <== (u_{w1}, \ldots, u_{wn})$ |
| 4 clks | (4) $r_{vi} = (z_{vi} + u_{vi}m_{vi})w^{-1}_{vi}(\text{mod } v_i)$ |
| 10 clks | (5) $(r_{w1}, \ldots, r_{wn}) <== (r_{vi}, \ldots, r_{vn})$ |
| | (6) for(s = 1 to 1024) { |
| | (7) if($y_i$ = 1) then { |
| overlap (10) | (7.1) $z_{wi} = t_{wi}r_{wi}(\text{mod } w_i); z_{vi} = t_{vi}r_{vi}(\text{mod } v_i)$. |
| 3 clks | (7.2) $u_{wi} = z_{wi}m'_{wi}(\text{mod } w_i)$ |
| 6 clks, overlap (11) | (7.3) $(u_{v1}, \ldots, u_{vn}) <== (u_{w1}, \ldots, u_{wn})$ |
| overlap (12) | (7.4) $t_{vi} = (z_{vi} + u_{vi}m_{vi})w^{-1}_{vi}(\text{mod } v_i)$ |
| 10 clks | (7.5) $(t_{w1}, \ldots, t_{wn}) <== (t_{v1}, \ldots, t_{vn})$. |
| | } |
| 3 clks | (8) $z_{wi} = r_{wi}r_{wi}(\text{mod } w_i); z_{vi} = r_{vi}r_{vi}(\text{mod } v_i)$ |
| 3 clks | (9) $u_{wi} = z_{wi}m'_{wi}(\text{mod } w_i)$ |
| 10 clks | (10) $(u_{v1}, \ldots, u_{vn}) <== (u_{w1}, \ldots, u_{wn})$ |
| 4 clks | (11) $r_{vi} = (z_{vi} + u_{vi}m_{vi})w^{-1}_{vi}(\text{mod } v_i)$ |
| 10 clks | (12) $(r_{w1}, \ldots, r_{wn}), <== (r_{v1}, \ldots, r_{vn})$ |
| | } |
| 6 clks | (13) Compute $t_w$ (mod w). |

The total number of cycles, assuming an average of 50% 0 bit distribution in the exponent radix 2 representation is:

$$30+19*512+30*1024+6 \sim 40,000 \text{ cycles.}$$

For a 200 MHz clock, the time is computed as:

$$40,000*5=200,000 \text{ ns}=0.2 \text{ ms}$$

or ~5,000 RSA calculations per second, according to one embodiment.

XV. Hardware Overview

Figure 23:
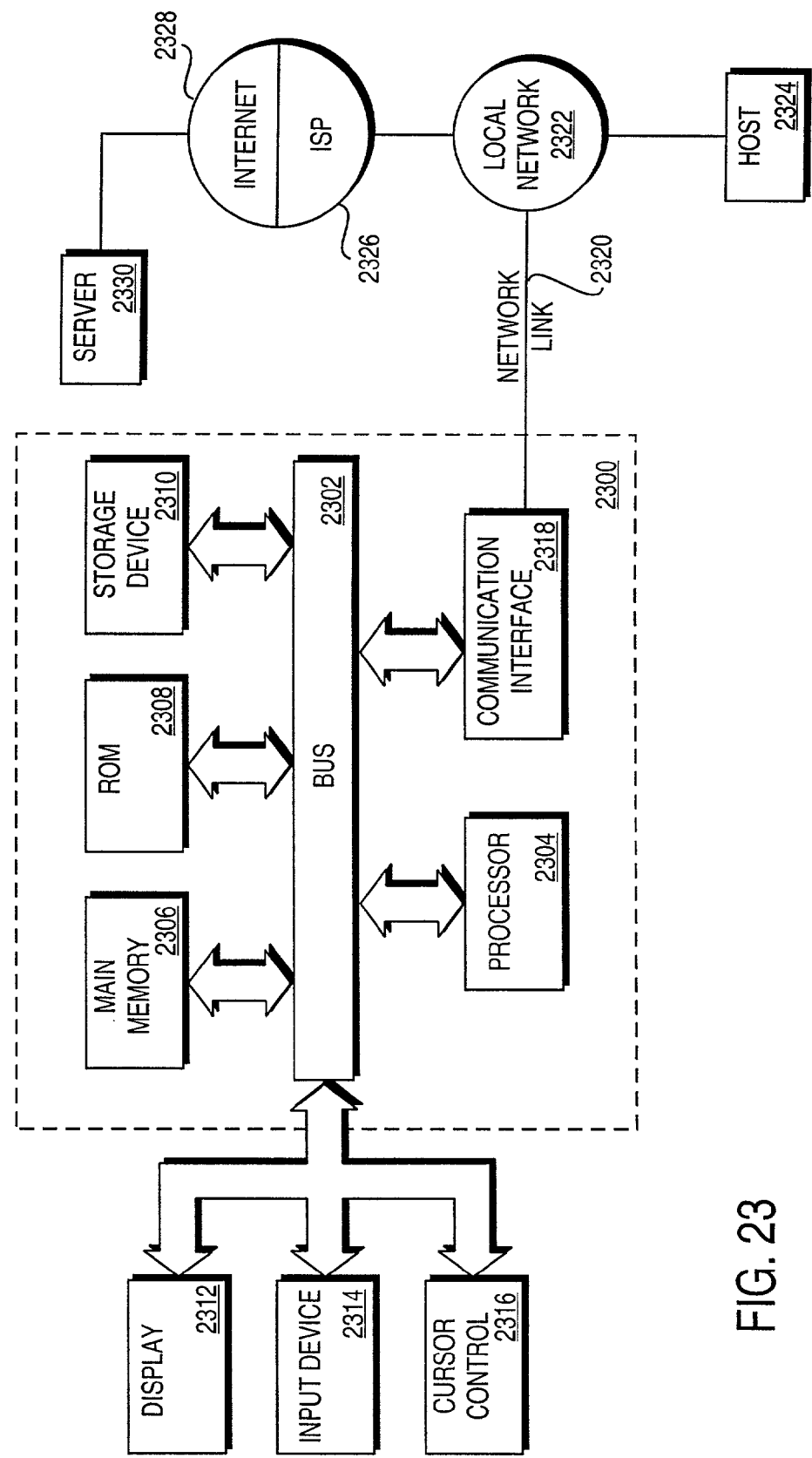
FIG. 23 is a block diagram that depicts a computer system upon which embodiments of the invention may be implemented.

FIG. 23 is a block diagram that depicts a computer system 2300 upon which an embodiment of the invention may be implemented. Computer system 2300 includes a bus 2302 or other communication mechanism for communicating information, and a processor 2304 coupled with bus 2302 for processing information. Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

The invention is related to the use of computer system 2300 for using pre-computation and dual-pass modular operations to implement encryption protocols efficiently in electronic hardware. According to one embodiment of the invention, using pre-computation and dual-pass modular operations to implement encryption protocols efficiently in electronic hardware is provided by computer system 2300 in response to processor 2304 executing one or more sequences of one or more instructions contained in main memory 2306. Such instructions may be read into main memory 2306 from another computer-readable medium, such as storage device 2310. Execution of the sequences of instructions contained in main memory 2306 causes processor 2304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2304 for execution. Such a medium may take many forms, including but not limited to, non-volatile media, volatile media, and transmission media. Non-volatile media includes, for example, optical or magnetic disks, such as storage device 2310. Volatile media includes dynamic memory, such as main memory 2306. Transmission media includes coaxial cables, copper wire and fiber optics, including the wires that comprise bus 2302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2304 for execution. For example, the instructions may initially be carried on a magnetic disk of a remote computer. The remote computer can load the instructions into its dynamic memory and send the instructions over a telephone line using a modem. A modem local to computer system 2300 can receive the data on the telephone line and use an infra-red transmitter to convert the data to an infra-red signal. An infra-red detector can receive the data carried in the infra-red signal and appropriate circuitry can place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are exemplary forms of carrier waves transporting the information.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318.

The received code may be executed by processor 2304 as it is received, and/or stored in storage device 2310, or other non-volatile storage for later execution. In this manner, computer system 2300 may obtain application code in the form of a carrier wave.

XVI. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for encryption and decryption of electronic messages based on an encryption protocol, the method comprising the computer-implemented steps of:

receiving a first electronic message that is encrypted according to the encryption protocol;

generating at least one part of a second electronic message, based on at least the first electronic message, a modular operation that is based on two applications of Montgomery's method, a first operand, a second operand, a modulus, and a modular reduction using a negative multiplicative inverse of the modulus, and wherein the step of generating the second electronic message includes the computer-implemented steps of:

generating a first constant (R) based on the modulus (M) by selecting a second constant (W) such that $W \geq 4M$ and determining the first constant (R) according to the expression $R=W^2 \pmod{M}$;

in a first application of Montgomery's method, determining an intermediate result based on at least Montgomery's method for the modular operation, the first operand, and the first constant; and in a second application of Montgomery's method, determining and storing in memory a final result that comprises the at least one part of the second electronic message, based on at least Montgomery's method for the modular operation, the intermediate result, and the second operand.

2. The method of claim 1, wherein the second constant (W) is not a power of two.

3. The method of claim 1, wherein the modular operation for determining the intermediate result is a modular multiplication that is based on at least the first operand, the first constant, a second constant, the modulus, and the negative multiplicative inverse of the modulus, and wherein the intermediate result is determined by the computer-implemented steps of:

determining a modified first operand based on the first operand and the first constant;

determining a modular reduction of the modified first operand based on the modified first operand, the negative multiplicative inverse of the modulus, and the second constant; and determining the intermediate result based on the modified first operand, the modular reduction of the modified first operand, the modulus, and the second constant.

4. The method of claim 1, wherein the modular operation for determining the final result is a modular multiplication that is based on at least the second operand, a second constant, the modulus, the negative multiplicative inverse of the modulus, and the intermediate result, and wherein the final result is determined by the computer-implemented steps of:
  determining a modified second operand based on the second operand and the intermediate result;
  determining a modular reduction of the modified second operand based on the modified second operand, the negative multiplicative inverse of the modulus, and the second constant; and
  determining the final result based on the modified second operand, the modular reduction of the modified second operand, the modulus, and the second constant.

5. The method of claim 1, wherein the modular operation for determining the intermediate result is a modular exponentiation that is based on at least the first operand, the first constant, a second constant, the modulus, and the negative multiplicative inverse of the modulus, and wherein the intermediate result is determined by the computer-implemented steps of:
  determining a modified first operand based on the first operand and the intermediate result;
  determining a modular reduction of the modified second operand based on the modified second operand, the negative multiplicative inverse of the modulus, and the second constant; and
  determining the intermediate result based on the modified second operand, the modular reduction of the modified second operand, the modulus, and the second constant.

6. The method of claim 1, wherein the modular operation for determining the final result is a modular exponentiation that is based on at least the second operand, a second constant, the modulus, the negative multiplicative inverse of the modulus, and the intermediate result, wherein the second operand includes a plurality of digits, and wherein the final result is determined by the computer-implemented steps of:
  specifying a previous final result as having a value of one and a previous intermediate result as the intermediate result;
  for each digit of the plurality of digits included in the second operand, performing the computer-implemented steps of:
    when each digit of the plurality of digits has the value of one, then performing the computer-implemented steps of:
      determining an updated final result based on the previous final result and the previous intermediate result;
      determining a modular reduction of the updated final result based on the updated final result, the negative multiplicative inverse of the modulus, and the second constant;
      determining a revised updated final result based on the updated final result, the modular reduction of the final result, the modulus, and the second constant;
      if all digits of the plurality of digits have not been evaluated, specifying the revised updated final result as the previous final result; and
      if all digits of the plurality of digits have been evaluated, specifying the revised updated final result as the final result;
    determining an updated intermediate result based on the previous intermediate result;
    determining a modular reduction of the updated intermediate result based on the updated intermediate result, the negative multiplicative inverse of the modulus, and the second constant;
    determining a revised updated intermediate result based on the updated intermediate result, the modular reduction of the updated intermediate result, the modulus, and the first constant; and
    specifying the revised updated intermediate result as the previous intermediate result.

7. The method of claim 1, further comprising the computer-implemented steps of:
  generating a plurality of residual number system (RNS) representations, wherein the plurality of RNS representations includes at least one RNS representation for each of the first operand, the modulus, and the first constant;
  wherein the step of determining the intermediate result includes the computer-implemented step generating the intermediate result based on Montgomery's method for the modular operation and the plurality of RNS representations; and
  wherein the step of determining the final result includes the computer-implemented step of generating the final result based on Montgomery's method for the modular operation and the plurality of RNS representations.

8. The method of claim 7, wherein:
  the plurality of RNS representations includes a first set of RNS representations in a first RNS base and a second set of RNS representations in a second RNS base;
  the first RNS base extends the second RNS base,
  the first RNS base includes a first group of sixty-four residues and the second RNS base includes a second group of sixty-four residues,
  each residue in both the first group and second group is a seventeen-bit residue;
  each residue in the first group is relatively prime with respect to all other residues in the first group and each residue in the second group is relatively prime with respect to all other residues in the second group;
  each residue in both the first group and the second group are a selected from a range of $2^{16}$ to $2^{17}$; and
  the method further comprises the computer-implemented steps of:
    converting, in eight clock cycles, a first RNS representation of the first set of RNS representations in the first RNS base to a second RNS representation of the second set of RNS representations in the second RNS base;
    performing operations involving each residue in the first group in parallel; and
    performing operations involving each residue in the second group in parallel.

9. The method of claim 1, wherein the modular operation is a modular multiplication and the step of generating the second electronic message further includes the computer-implemented step of:
  while determining the intermediate result and determining the final result, storing results of intermediate computations in a first register file and a second register file, wherein the first register file includes a first set of sixty-four seventeen-bit registers and the second register file includes a second set of sixty-four seventeen-bit registers.

10. The method of claim 1, wherein the modular operation is a modular exponentiation and the step of generating the second electronic message further includes the computer-implemented step of:
  while determining the intermediate result and determining the final result, storing results of intermediate computations, in a first register file a second register file, a third register file, and a fourth register file; and wherein the first register file includes a first set of sixty-four seventeen-bit registers, the second register file includes a second set of sixty-four seventeen-bit registers, the third register file includes a third set of sixty-four seventeen-bit registers, and the fourth register file includes a fourth set of sixty-four seventeen-bit registers.

11. The method of claim 1, wherein the steps of determining the intermediate result and determining the final result use an array of sixty-four seventeen-bit by seventeen-bit modular multiplier circuits, and wherein the array of sixty-four seventeen-bit by seventeen-bit modular multiplier circuits includes a plurality of ratio four to two compressors that are organized into three levels and that are executed in one clock cycle.

12. The method of claim 1, wherein the steps of determining the intermediate result and determining the final result use an array of sixty-four thirty-four-bit to seventeen-bit modular reduction circuits that are executed in one clock cycle.

13. A computer-readable medium carrying one or more sequences of instructions for encryption and decryption of electronic messages based on an encryption protocol, which instructions, when executed by one or more processors, cause the one or more processors to carry out the steps of:

receiving a first electronic message that is encrypted according to the encryption protocol;

generating at least one part of a second electronic message, based on at least the first electronic message, a modular operation that is based on two applications of Montgomery's method, a first operand, a second operand, and a modulus, and a modular reduction using a negative multiplicative inverse of the modulus, and wherein the instructions for generating the second electronic message further comprise instructions which, when executed by one or more processors, cause the one or more processors to carry out the steps of:

generating a first constant (R) based on the modulus (M) by selecting a second constant (W) such that $W \geq 4M$ and determining the first constant (R) according to the expression $R=W^2 \pmod{M}$;

in a first application of Montgomery's method, determining an intermediate result based on at least Montgomery's method for the modular operation, the first operand, and the first constant; and in a second application of Montgomery's method, determining and storing in memory a final result that comprises the at least one part of the second electronic message, based on at least Montgomery's method for the modular operation, the intermediate result, and the second operand.

14. The computer-readable medium of claim 13, wherein the second constant (W) is not a power of two.

15. The computer-readable medium of claim 13, wherein the modular operation for determining the intermediate result is a modular multiplication that is based on at least the first operand, the first constant, a second constant, the modulus, and the negative multiplicative inverse of the modulus, and wherein the instructions for determining the intermediate result further comprise one or more sequences of instructions, which when executed by one or more processors, cause the one or more processors to carry out the steps of:

determining a modified first operand based on the first operand and the first constant;

determining a modular reduction of the modified first operand based on the modified first operand, the negative multiplicative inverse of the modulus, and the second constant; and determining the intermediate result based on the modified first operand, the modular reduction of the modified first operand, the modulus, and the second constant.

16. The computer-readable medium of claim 13, wherein the modular operation for determining the final result is a modular multiplication that is based on at least the second operand, a second constant, the modulus, the negative multiplicative inverse of the modulus, and the intermediate result, and wherein the instructions for determining the final result further comprise one or more sequences of instructions, which when executed by one or more processors, cause the one or more processors to carry out the steps of:

determining a modified second operand based on the second operand and the intermediate result;

determining a modular reduction of the modified second operand based on the modified second operand, the negative multiplicative inverse of the modulus, and the second constant; and determining the final result based on the modified second operand, the modular reduction of the modified second operand, the modulus, and the second constant.

17. The computer-readable medium of claim 13, wherein the modular operation for determining the intermediate result is a modular exponentiation that is based on at least the first operand, the first constant, a second constant, the modulus, and the negative multiplicative inverse of the modulus, and wherein the instructions for determining the intermediate result further comprise one or more sequences of instructions, which when executed by one or more processors, cause the one or more processors to carry out the steps of:

determining a modified first operand based on the first operand and the intermediate result;

determining a modular reduction of the modified second operand based on the modified second operand, the negative multiplicative inverse of the modulus, and the second constant; and determining the intermediate result based on the modified second operand, the modular reduction of the modified second operand, the modulus, and the second constant.

18. The computer-readable medium of claim 13, wherein the modular operation for determining the final result is a modular exponentiation that is based on at least the second operand, a second constant, the modulus, the negative multiplicative inverse of the modulus, and the intermediate result, wherein the second operand includes a plurality of digits, and wherein the instructions for determining the final result further comprise one or more sequences of instructions, which when executed by one or more processors, cause the one or more processors to carry out the steps of:

specifying a previous final result as having a value of one and a previous intermediate result as the intermediate result;

for each digit of the plurality of digits included in the second operand, carrying out the steps of:

when each digit of the plurality of digits has the value of one, then carrying out the steps of:

determining an updated final result based on the previous final result and the previous intermediate result;

determining a modular reduction of the updated final result based on the updated final result, the negative multiplicative inverse of the modulus, and the second constant;

determining a revised updated final result based on the updated final result, the modular reduction of the final result, the modulus, and the second constant;

if all digits of the plurality of digits have not been evaluated, specifying the revised updated final result as the previous final result; and if all digits of the plurality of digits have been evaluated, specifying the revised updated final result as the final result;

determining an updated intermediate result based on the previous intermediate result;

determining a modular reduction of the updated intermediate result based on the updated intermediate result, the negative multiplicative inverse of the modulus, and the second constant;

determining a revised updated intermediate result based on the updated intermediate result, the modular reduction of the updated intermediate result, the modulus, and the first constant; and specifying the revised updated intermediate result as the previous intermediate result.

19. The computer-readable medium of claim 13, further comprising one or more sequences of instructions, which when executed by one or more processors, cause the one or more processors to carry out the step of:

generating a plurality of residual number system (RNS) representations, wherein the plurality of RNS representations includes at least one RNS representation for each of the first operand, the modulus, and the first constant;

wherein the instructions for determining the intermediate result includes one or more sequences of instructions, which when executed by one or more processors, cause the one or more processors to carry out the step of generating the intermediate result based on Montgomery's method for the modular operation and the plurality of RNS representations; and wherein the instructions for determining the final result includes one or more sequences of instructions, which when executed by one or more processors, cause the one or more processors to carry out the step of generating the final result based on Montgomery's method for the modular operation and the plurality of RNS representations.

20. The computer-readable medium of claim 19, wherein:

the plurality of RNS representations includes a first set of RNS representations in a first RNS base and a second set of RNS representations in a second RNS base;

the first RNS base extends the second RNS base;

the first RNS base includes a first group of sixty-four residues and the second RNS base includes a second group of sixty-four residues;

each residue in both the first group and second group is a seventeen-bit residue;

each residue in the first group is relatively prime with respect to all other residues in the first group and each residue in the second group is relatively prime with respect to all other residues in the second group;

each residue in both the first group and the second group are a selected from a range of $2^{16}$ to $2^{17}$; and further comprising one or more sequences of instructions, which when executed by one or more processors, cause the one or more processors to carry out the steps of:

converting, in eight clock cycles, a first RNS representation of the first set of RNS representations in the first RNS base to a second RNS representation of the second set of RNS representations in the second RNS base;

performing operations involving each residue in the first group in parallel; and performing operations involving each residue in the second group in parallel.

21. The computer-readable medium of claim 13, wherein the modular operation is a modular multiplication and the instructions for generating the second electronic message further comprises one or more sequences of instructions, which when executed by one or more processors, cause the one or more processors to carry out the step of:

while determining the intermediate result and determining the final result, storing results of intermediate computations in a first register file and a second register file, wherein the first register file includes a first set of sixty-four seventeen-bit registers and the second register file includes a second set of sixty-four seventeen-bit registers.

22. The computer-readable medium of claim 13, wherein the modular operation is a modular exponentiation and the instructions for generating the second electronic message further comprises one or more sequences of instructions, which when executed by one or more processors, cause the one or more processors to carry out the step of:

while determining the intermediate result and determining the final result, storing results of intermediate computations, in a first register file a second register file, a third register file, and a fourth register file; and wherein the first register file includes a first set of sixty-four seventeen-bit registers, the second register file includes a second set of sixty-four seventeen-bit registers, the third register file includes a third set of sixty-four seventeen-bit registers, and the fourth register file includes a fourth set of sixty-four seventeen-bit registers.

23. The computer-readable medium of claim 13, wherein the instructions for determining the intermediate result and the instructions for determining the final result make use of an array of sixty-four seventeen-bit by seventeen-bit modular multiplier circuits, and wherein the array of sixty-four seventeen-bit by seventeen-bit modular multiplier circuits includes a plurality of ratio four to two compressors that are organized into three levels and that are executed in one clock cycle.

24. The computer-readable medium of claim 13, wherein the instructions for determining the intermediate result and the instructions for determining the final result make use of an array of sixty-four thirty-four-bit to seventeen-bit modular reduction circuits that are executed in one clock cycle.

25. An apparatus for encryption and decryption of electronic messages based on an encryption protocol, comprising:

means for receiving a first electronic message that is encrypted according to the encryption protocol;

means for generating at least one part of a second electronic message, based on at least the first electronic message, a modular operation that is based on two applications of Montgomery's method, a first operand, a second operand, a modulus, and a modular reduction using a negative multiplicative inverse of the modulus, and wherein the means for generating the second electronic message further comprises:

means for generating a first constant (R) based on the modulus (M) by selecting a second constant (W) such that $W \geq 4M$ and determining the first constant (R) according to the expression $R=W^2 \pmod{M}$;

means for determining, in a first application of Montgomery's method, an intermediate result based on at least Montgomery's method for the modular operation, the first operand, and the first constant; and means for determining, in a second application of Montgomery's method, and storing in memory a final result that comprises the at least one part of the second electronic message, based on at least Montgomery's method for the modular operation, the intermediate result, and the second operand.

26. The apparatus of claim 25, wherein the second constant (W) is not a power of two.

27. The apparatus of claim 25, wherein the modular operation for determining the intermediate result is a modular multiplication that is based on at least the first operand, the first constant, a second constant, the modulus, and the negative multiplicative inverse of the modulus, and wherein the means for determining the intermediate result further comprises:

means for determining a modified first operand based on the first operand and the first constant;

means for determining a modular reduction of the modified first operand based on the modified first operand, the negative multiplicative inverse of the modulus, and the second constant; and means for determining the intermediate result based on the modified first operand, the modular reduction of the modified first operand, the modulus, and the second constant.

28. The apparatus of claim 25, wherein the modular operation for determining the final result is a modular multiplication that is based on at least the second operand, a second constant, the modulus, the negative multiplicative inverse of the modulus, and the intermediate result, and wherein the means for determining the final result further comprises:

means for determining a modified second operand based on the second operand and the intermediate result;

means for determining a modular reduction of the modified second operand based on the modified second operand, the negative multiplicative inverse of the modulus, and the second constant; and means for determining the final result based on the modified second operand, the modular reduction of the modified second operand, the modulus, and the second constant.

29. The apparatus of claim 25, wherein the modular operation for determining the intermediate result is a modular exponentiation that is based on at least the first operand, the first constant, a second constant, the modulus, and the negative multiplicative inverse of the modulus, and wherein the means for determining the intermediate result further comprises:

means for determining a modified first operand based on the first operand and the intermediate result;

means for determining a modular reduction of the modified second operand based on the modified second operand, the negative multiplicative inverse of the modulus, and the second constant; and means for determining the intermediate result based on the modified second operand, the modular reduction of the modified second operand, the modulus, and the second constant.

30. The apparatus of claim 25, wherein the modular operation for determining the final result is a modular exponentiation that is based on at least the second operand, a second constant, the modulus, the negative multiplicative inverse of the modulus, and the intermediate result, wherein the second operand includes a plurality of digits, and wherein the means for determining the final result further comprises:

means for specifying a previous final result as having a value of one and a previous intermediate result as the intermediate result;

means for performing, for each digit of the plurality of digits included in the second operand, the following steps:

when each digit of the plurality of digits has the value of one, then performing the computer-implemented steps of:

determining an updated final result based on the previous final result and the previous intermediate result;

determining a modular reduction of the updated final result based on the updated final result, the negative multiplicative inverse of the modulus, and the second constant;

determining a revised updated final result based on the updated final result, the modular reduction of the final result, the modulus, and the second constant;

if all digits of the plurality of digits have not been evaluated, specifying the revised updated final result as the previous final result; and if all digits of the plurality of digits have been evaluated, specifying the revised updated final result as the final result;

determining an updated intermediate result based on the previous intermediate result;

determining a modular reduction of the updated intermediate result based on the updated intermediate result, the negative multiplicative inverse of the modulus, and the second constant;

determining a revised updated intermediate result based on the updated intermediate result, the modular reduction of the updated intermediate result, the modulus, and the first constant; and specifying the revised updated intermediate result as the previous intermediate result.

31. The apparatus of claim 25, further comprising:

means for generating a plurality of residual number system (RNS) representations, wherein the plurality of RNS representations includes at least one RNS representation for each of the first operand, the modulus, and the first constant;

wherein the means for determining the intermediate result includes means for generating the intermediate result based on Montgomery's method for the modular operation and the plurality of RNS representations; and wherein the means for determining the final result includes means for generating the final result based on Montgomery's method for the modular operation and the plurality of RNS representations.

32. The apparatus of claim 31, wherein:
the plurality of RNS representations includes a first set of RNS representations in a first RNS base and a second set of RNS representations in a second RNS base;
the first RNS base extends the second RNS base;
the first RNS base includes a first group of sixty-four residues and the second RNS base includes a second group of sixty-four residues;
each residue in both the first group and second group is a seventeen-bit residue;
each residue in the first group is relatively prime with respect to all other residues in the first group and each residue in the second group is relatively prime with respect to all other residues in the second group;
each residue in both the first group and the second group are a selected from a range of $2^{16}$ to $2^{17}$; and
further comprising:
means for converting, in eight clock cycles, a first RNS representation of the first set of RNS representations in the first RNS base to a second RNS representation of the second set of RNS representations in the second RNS base;
means for performing operations involving each residue in the first group in parallel; and
means for performing operations involving each residue in the second group in parallel.

33. The apparatus of claim 25, wherein the modular operation is a modular multiplication and the means for generating the second electronic message further comprises:
means for storing, while determining the intermediate result and determining the final result, results of intermediate computations in a first register file and a second register file, wherein the first register file includes a first set of sixty-four seventeen-bit registers and the second register file includes a second set of sixty-four seventeen-bit registers.

34. The apparatus of claim 25, wherein the modular operation is a modular exponentiation and the means for generating the second electronic message further comprises:
means for storing, while determining the intermediate result and determining the final result, results of intermediate computations, in a first register file a second register file, a third register file, and a fourth register file; and
wherein the first register file includes a first set of sixty-four seventeen-bit registers, the second register file includes a second set of sixty-four seventeen-bit registers, the third register file includes a third set of sixty-four seventeen-bit registers, and the fourth register file includes a fourth set of sixty-four seventeen-bit registers.

35. The apparatus of claim 25, wherein the means for determining the intermediate result and the means for determining the final result use an array of sixty-four seventeen-bit by seventeen-bit modular multiplier circuits, and wherein the array of sixty-four seventeen-bit by seventeen-bit modular multiplier circuits includes a plurality of ratio four to two compressors that are organized into three levels and that are executed in one clock cycle.

36. The apparatus of claim 25, wherein the means for determining the intermediate result and the means for determining the final result use an array of sixty-four thirty-four-bit to seventeen-bit modular reduction circuits that are executed in one clock cycle.

37. An apparatus for encryption and decryption of electronic messages based on an encryption protocol, comprising:
an interface;
a processor coupled to the interface and receiving information from the interface; and
one or more stored sequences of instructions which, when executed by the processor, cause the processor to carry out the steps of:
receiving a first electronic message that is encrypted according to the encryption protocol;
generating at least one part of a second electronic message, based on at least the first electronic message, a modular operation that is based on two applications of Montgomery's method, a first operand, a second operand, a modulus, and a modular reduction using a negative multiplicative inverse of the modulus, and wherein the instructions for generating the second electronic message further comprise instructions which, when executed by the processors, cause the processor to carry out the steps of:
generating a first constant (R) based on the modulus (M) by selecting a second constant (W) such that $W \geq 4M$ and determining the first constant (R) according to the expression $R=W^2 \pmod{M}$;
in a first application of Montgomery's method, determining an intermediate result based on at least Montgomery's method for the modular operation, the first operand, and the first constant; and
in a second application of Montgomery's method, determining and storing in memory a final result that comprises the at least one part of the second electronic message, based on at least Montgomery's method for the modular operation, the intermediate result, and the second operand.

38. The apparatus of claim 37, wherein the second constant (W) is not a power of two.

39. The apparatus of claim 37, wherein the modular operation for determining the intermediate result is a modular multiplication that is based on at least the first operand, the first constant, a second constant, the modulus, and the negative multiplicative inverse of the modulus, and wherein the instructions for determining the intermediate result further comprise one or more stored sequences of instructions which, when executed by the processor, cause the processor to carry out the steps of:
determining a modified first operand based on the first operand and the first constant;
determining a modular reduction of the modified first operand based on the modified first operand, the negative multiplicative inverse of the modulus, and the second constant; and
determining the intermediate result based on the modified first operand, the modular reduction of the modified first operand, the modulus, and the second constant.

40. The apparatus of claim 37, wherein the modular operation for determining the final result is a modular multiplication that is based on at least the second operand, a second constant, the modulus, the negative multiplicative inverse of the modulus, and the intermediate result, and wherein the instructions for determining the final result further comprise one or more stored sequences of instructions which, when executed by the processor, cause the processor to carry out the steps of:
determining a modified second operand based on the second operand and the intermediate result;
determining a modular reduction of the modified second operand based on the modified second operand, the negative multiplicative inverse of the modulus, and the second constant; and determining the final result based on the modified second operand, the modular reduction of the modified second operand, the modulus, and the second constant.

41. The apparatus of claim 37, wherein the modular operation for determining the intermediate result is a modular exponentiation that is based on at least the first operand, the first constant, a second constant, the modulus, and the negative multiplicative inverse of the modulus, and wherein the instructions for determining the intermediate result further comprise one or more stored sequences of instructions which, when executed by the processor, cause the processor to carry out the steps of:
  determining a modified first operand based on the first operand and the intermediate result;
  determining a modular reduction of the modified second operand based on the modified second operand, the negative multiplicative inverse of the modulus, and the second constant; and
  determining the intermediate result based on the modified second operand, the modular reduction of the modified second operand, the modulus, and the second constant.

42. The apparatus of claim 37, wherein the modular operation for determining the final result is a modular exponentiation that is based on at least the second operand, a second constant, the modulus, the negative multiplicative inverse of the modulus, and the intermediate result, wherein the second operand includes a plurality of digits, and wherein the instructions for determining the final result further comprise one or more stored sequences of instructions which, when executed by the processor, cause the processor to carry out the steps of:
  specifying a previous final result as having a value of one and a previous intermediate result as the intermediate result;
  for each digit of the plurality of digits included in the second operand, carrying out the steps of:
    when each digit of the plurality of digits has the value of one, then carrying out the steps of:
      determining an updated final result based on the previous final result and the previous intermediate result;
      determining a modular reduction of the updated final result based on the updated final result, the negative multiplicative inverse of the modulus, and the second constant;
      determining a revised updated final result based on the updated final result, the modular reduction of the final result, the modulus, and the second constant;
      if all digits of the plurality of digits have not been evaluated, specifying the revised updated final result as the previous final result; and
      if all digits of the plurality of digits have been evaluated, specifying the revised updated final result as the final result;
    determining an updated intermediate result based on the previous intermediate result;
    determining a modular reduction of the updated intermediate result based on the updated intermediate result, the negative multiplicative inverse of the modulus, and the second constant;
    determining a revised updated intermediate result based on the updated intermediate result, the modular reduction of the updated intermediate result, the modulus, and the first constant; and
    specifying the revised updated intermediate result as the previous intermediate result.

43. The apparatus of claim 37, further comprising one or more stored sequences of instructions which, when executed by the processor, cause the processor to carry out the steps of:
  generating a plurality of residual number system (RNS) representations, wherein the plurality of RNS representations includes at least one RNS representation for each of the first operand, the modulus, and the first constant;
  wherein the instructions for determining the intermediate result one or more stored sequences of instructions which, when executed by the processor, cause the processor to carry out the step of generating the intermediate result based on Montgomery's method for the modular operation and the plurality of RNS representations; and
  wherein the instructions for determining the final result includes one or more stored sequences of instructions which, when executed by the processor, cause the processor to carry out the step of generating the final result based on Montgomery's method for the modular operation and the plurality of RNS representations.

44. The apparatus of claim 43, wherein:
  the plurality of RNS representations includes a first set of RNS representations in a first RNS base and a second set of RNS representations in a second RNS base;
  the first RNS base extends the second RNS base;
  the first RNS base includes a first group of sixty-four residues and the second RNS base includes a second group of sixty-four residues;
  each residue in both the first group and second group is a seventeen-bit residue;
  each residue in the first group is relatively prime with respect to all other residues in the first group and each residue in the second group is relatively prime with respect to all other residues in the second group;
  each residue in both the first group and the second group are a selected from a range of $2^{16}$ to $2^{17}$; and
  further comprising one or more stored sequences of instructions which, when executed by the processor, cause the processor to carry out the steps of:
    converting, in eight clock cycles, a first RNS representation of the first set of RNS representations in the first RNS base to a second RNS representation of the second set of RNS representations in the second RNS base;
    performing operations involving each residue in the first group in parallel; and
    performing operations involving each residue in the second group in parallel.

45. The apparatus of claim 37, wherein the modular operation is a modular multiplication and the instructions for generating the second electronic message further comprises one or more stored sequences of instructions which, when executed by the processor, cause the processor to carry out the step of:
  while determining the intermediate result and determining the final result, storing results of intermediate computations in a first register file and a second register file, wherein the first register file includes a first set of sixty-four seventeen-bit registers and the second register file includes a second set of sixty-four seventeen-bit registers.

46. The apparatus of claim 37, wherein the modular operation is a modular exponentiation and the instructions for generating the second electronic message further comprises one or more stored sequences of instructions which, when executed by the processor, cause the processor to carry out the step of:
- while determining the intermediate result and determining the final result, storing results of intermediate computations, in a first register file a second register file, a third register file, and a fourth register file; and
- wherein the first register file includes a first set of sixty-four seventeen-bit registers, the second register file includes a second set of sixty-four seventeen-bit registers, the third register file includes a third set of sixty-four seventeen-bit registers, and the fourth register file includes a fourth set of sixty-four seventeen-bit registers.

47. The apparatus of claim 37, wherein the instructions for determining the intermediate result and the instructions for determining the final result make use of an array of sixty-four seventeen-bit by seventeen-bit modular multiplier circuits, and wherein the array of sixty-four seventeen-bit by seventeen-bit modular multiplier circuits includes a plurality of ratio four to two compressors that are organized into three levels and that are executed in one clock cycle.

48. The apparatus of claim 37, wherein the instructions for determining the intermediate result and the instructions for determining the final result make use of an array of sixty-four thirty-four-bit to seventeen-bit modular reduction circuits that are executed in one clock cycle.

* * * * *